(12) United States Patent
Shishido et al.

(10) Patent No.: US 6,995,228 B2
(45) Date of Patent: Feb. 7, 2006

(54) COPOLYMER OF CONJUGATED CYCLODIENE

(75) Inventors: Junichi Shishido, Fuji (JP); Kenichi Sanechika, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/486,721

(22) PCT Filed: Aug. 16, 2002

(86) PCT No.: PCT/JP02/08315

§ 371 (c)(1),
(2), (4) Date: Feb. 13, 2004

(87) PCT Pub. No.: WO03/016365

PCT Pub. Date: Feb. 27, 2003

(65) Prior Publication Data

US 2004/0242825 A1 Dec. 2, 2004

(30) Foreign Application Priority Data

Aug. 17, 2001 (JP) .............................. 2001-248226

(51) Int. Cl.
*C08F 236/00* (2006.01)
(52) U.S. Cl. ...................... 526/337; 526/347; 526/173; 526/308; 526/335; 526/339
(58) Field of Classification Search ................ 526/173, 526/308, 335, 337, 339, 347
See application file for complete search history.

(56) References Cited

U.S. PATENT DOCUMENTS 4,020,251 A * 4/1977 Hsieh ...................... 525/332.1
4,237,246 A * 12/1980 Hsieh ...................... 525/332.1
5,792,824 A * 8/1998 Natori ......................... 526/266
5,795,945 A * 8/1998 Natori ......................... 526/309

FOREIGN PATENT DOCUMENTS

JP 11-189614 A 7/1999
JP 11-349638 A 12/1999

(Continued)

OTHER PUBLICATIONS

Francois et al., "Substituted PPV block copolymer from anionically prepared precursor", Synthic Metals, 102, 1211-1212(1999).*
Hong et al., "1,3-cyclohexadiene polymers.3. synthesis and characterization of Poly(1,3-cyclohexadiene-block-styrene)", Macromolecules, 34, 3540-3547(2001).*
Hong et al., Polymer Preprints, vol. 42, No. 1, pp. 436-437 (2001).

(Continued)

*Primary Examiner*—Ling-Sui Choi
(74) *Attorney, Agent, or Firm*—Birch, Stewart, Kolasch & Birch, LLP

(57) ABSTRACT

A cyclic conjugated diene copolymer comprising a main chain comprised of (A) cyclic conjugated diene monomer units, (B) monomer units obtained from vinyl aromatic monomers each having a hydrogen atom at the α-position thereof, and optionally (C) monomer units obtained from commoners which are other than the monomers used for obtaining the monomer units A and B and which are copolymerizable with at least one of the monomers used for obtaining the monomer units A and B, wherein all monomer units A and the monomer units B together form one or more polymer chains each having an A/B random sequence, wherein the one or more polymer chains each having an A/B random sequence contain at least one polymer chain having a number average molecular weight of from 20,000 to 500,000 and contain no polymer chain having a number average molecular weight of more than 500,000. A process for producing the above-mentioned cyclic conjugated diene copolymer by living anionic polymerization.

15 Claims, 13 Drawing Sheets

FOREIGN PATENT DOCUMENTS

| | | |
|---|---|---|
| JP | 2001-226503 A | 8/2001 |
| JP | 2001-294724 A | 10/2001 |
| JP | 2002-47310 A | 2/2002 |
| JP | 2002-47311 A | 2/2002 |
| WO | WO 94/28038 A1 | 12/1994 |

OTHER PUBLICATIONS

Hong et al., Macromolecules, vol. 34, pp. 3540-3547 (2001).

Francois et al., Synthetic Metals, vol. 102, pp. 1211-1212 (1999).

* cited by examiner

Time after start of the polymerization (min)

COPOLYMER OF CONJUGATED CYCLODIENE

BACKGROUND OF THE INVENTION

1. Field of the Invention

The present invention relates to a cyclic conjugated diene copolymer. More particularly, the present invention is concerned with a cyclic conjugated diene copolymer comprising a main chain comprised of (A) cyclic conjugated diene monomer units, (B) monomer units obtained from vinyl aromatic monomers each having a hydrogen atom at the α-position thereof, and optionally (C) monomer units obtained from comonomers which are other than the monomers used for obtaining the monomer units A and B and which are copolymerizable with at least one of the monomers used for obtaining the monomer units A and B, wherein all monomer units A and the monomer units B together form one or more polymer chains each having an A/B random sequence, wherein the one or more polymer chains each having an A/B random sequence contain at least one polymer chain having a number average molecular weight of from 20,000 to 500,000 and contain no polymer chain having a number average molecular weight of more than 500,000. The present invention is also concerned with a hydrogenated, cyclic conjugated diene copolymer, a modified, hydrogenated, cyclic conjugated diene copolymer and a crosslinked, hydrogenated, cyclic conjugated diene copolymer which are obtained by subjecting the cyclic conjugated diene copolymers to a hydrogenation treatment, a hydrogenation/modification treatment and a hydrogenation/crosslinking treatment, respectively. The cyclic conjugated diene copolymer of the present invention has excellent properties with respect to heat resistance, transparency, nonhygroscopicity, chemical resistance and molding processability.

2. Prior Art

General-purpose polyolefins, such as polyethylene and polypropylene, have excellent chemical resistance, such as resistance to acids and bases, and have nonhygroscopicity. Further, general-purpose polyolefins (which are thermoplastic resins) have excellent recycling property and have a very high commercial value as a plastic, structural material. However, such general-purpose polyolefins cannot be used in application fields where high heat resistance and high transparency are required at the same time. For example, in the case of a general-purpose, crystalline polypropylene, the melting temperature thereof is only 170° C. at most, and the polypropylene has poor transparency. As a method for improving the heat resistance of general-purpose polyolefins, there can be mentioned a method in which the crystallinity of the polyolefin is increased. However, a general-purpose polyolefin having high crystallinity has poor transparency, as compared to that of a general-purpose polyolefin having low crystallinity. Thus, there has been a problem in that a general-purpose polyolefin cannot be used in application fields where high heat resistance and high transparency are required at the same time.

As an improved polyolefin, a cyclic polyolefin produced using a polycyclic norbornene monomer has been proposed (see Examined Japanese Patent Application Publication No. Hei 2-9612, Unexamined Japanese Patent Application Laid-Open Specification No. Sho 60-168708 and Examined Japanese Patent Application Publication No. Hei 8-26124). Such a cyclic polyolefin produced using a polycyclic norbornene monomer has a bulky 5-membered ring structure in the polymer main chain thereof and, therefore, the cyclic polyolefin has an amorphous structure having a softening temperature of about 160° C. and has a high commercial value as a material having excellent properties with respect to heat resistance and transparency, as compared to those of general-purpose polyolefins. However, the properties (heat resistance, stiffness, hardness and impact resistance) of such a cyclic polyolefin are not satisfactory in view of the high level properties which are required for transparent polyolefins in recent years.

As examples of improvements of a cyclic polyolefin produced using a polycyclic norbornene monomer, there can be mentioned cyclic olefin polymers produced by an anionic polymerization of 1,3-cyclohexadiene monomer (see U.S. Pat. Nos. 5,792,824, 5,795,945, 4,020,251 and 4,237,246). These cyclic olefin polymers which have a contiguous sequence of cyclohexane rings in the polymer main chain thereof, are advantageous not only in that these polymers have an amorphous structure having a softening temperature of more than 220° C., thereby realizing both high heat resistance and high transparency simultaneously, but also in that these polymers have high stiffness and high hardness. Further, in the case of these polymers, the impact resistance is greatly improved without sacrificing the heat resistance, by realizing a polymer block structure comprising a cyclohexane polymer block comprised of a contiguous sequence of cyclohexane rings and a rubber component polymer block comprised of butadiene monomer units or isoprene monomer units, wherein such polymer block structure is achieved utilizing the living polymer-forming property of the anionic polymerization used for producing these polymers.

However, due to the contiguous sequence of cyclohexane rings of the cyclic olefin polymers, the solvent which can dissolve these polymers is substantially limited to decahydronaphthalene which has a high boiling point, thus posing a problem in that, in the solvent cast method which is necessary for producing an optical film which is required to have a high level of properties, the removal of the solvent becomes very difficult, thus posing a big problem on the molding-processability. Also, due to the contiguous sequence of cyclohexane rings, the melt-molding temperature of the cyclic olefin polymers is very high, leading to a large difficulty in the melt-molding in commercial production of shaped articles.

For solving this problem, it has been attempted to effect a so-called randomization, i.e., to effect a random insertion of other monomer units into the contiguous sequence of cyclohexane rings so as to form a random copolymer chain. As an example of such randomization, it is known that recurring units obtained from a styrene monomer are randomly inserted into a polymer chain comprised of recurring units obtained from a cyclohexadiene monomer (see Polymer Preprints 2001, 42 (1), 436, and Synthetic Metals 102 (1999) 1211–1212). However, in such cases, although a randomization can be achieved, the random copolymer chain in the obtained cyclic olefin polymer has a disadvantage in that the number average molecular weight of the random copolymer chain is low, so that the cyclic olefin polymer cannot satisfy the high level properties, especially impact resistance at a high level, which are required for optical films in recent years.

Thus, conventionally, it has never been possible to obtain a cyclic olefin polymer which has excellent properties with respect not only to heat resistance, transparency, nonhygroscopicity and chemical resistance, but also to processability.

SUMMARY OF THE INVENTION

In this situation, the present inventors have made extensive and intensive studies on cyclic olefin polymers with a view toward solving the above-mentioned problems accompanying the prior art. As a result, it has unexpectedly been found that a cyclic conjugated diene copolymer can be obtained by a process comprising reacting a cyclic conjugated diene monomer with a vinyl aromatic monomer having a hydrogen atom at the α-position thereof in the presence of a polymerization initiator in a hydrocarbon solvent, wherein the polymerization initiator comprises an organometallic compound containing a metallic element of Group I of the Periodic Table and an ether compound having a specific structure. It has also been found that the obtained cyclic conjugated diene copolymer comprises a cyclic conjugated diene random copolymer having a very high number average molecular weight. Further, it has also been found that the cyclic conjugated diene copolymer has excellent properties with respect not only to heat resistance, transparency, nonhygroscopicity and chemical resistance, but also to processability. In addition, it has also been found that a hydrogenated, cyclic conjugated diene copolymer and a modified, hydrogenated, cyclic conjugated diene copolymer can be obtained by subjecting the cyclic conjugated diene copolymers to a hydrogenation treatment and a hydrogenation/modification treatment, respectively. The present invention has been completed, based on these findings.

Accordingly, it is an object of the present invention to provide a cyclic conjugated diene copolymer having excellent properties with respect not only to heat resistance, transparency, nonhygroscopicity and chemical resistance, but also to processability.

It is another object of the present invention to provide a hydrogenated, cyclic conjugated diene copolymer, a modified, hydrogenated, cyclic conjugated diene copolymer and a crosslinked, hydrogenated, cyclic conjugated diene copolymer which are obtained by subjecting the above-mentioned cyclic conjugated diene copolymers to a hydrogenation treatment, a hydrogenation/modification treatment and a hydrogenation/crosslinking treatment, respectively.

It is still another object of the present invention to provide a shaped article produced from the above-mentioned hydrogenated, cyclic conjugated diene copolymer, and to provide a microchip comprising the shaped article.

It is a further object of the present invention to provide a process for producing the above-mentioned cyclic conjugated diene copolymer by a living anionic polymerization.

The foregoing and other objects, features and advantages of the present invention will be apparent from the following detailed description taken in connection with the accompanying drawings and the appended claims.

DETAILED DESCRIPTION OF THE INVENTION

Figure 1:
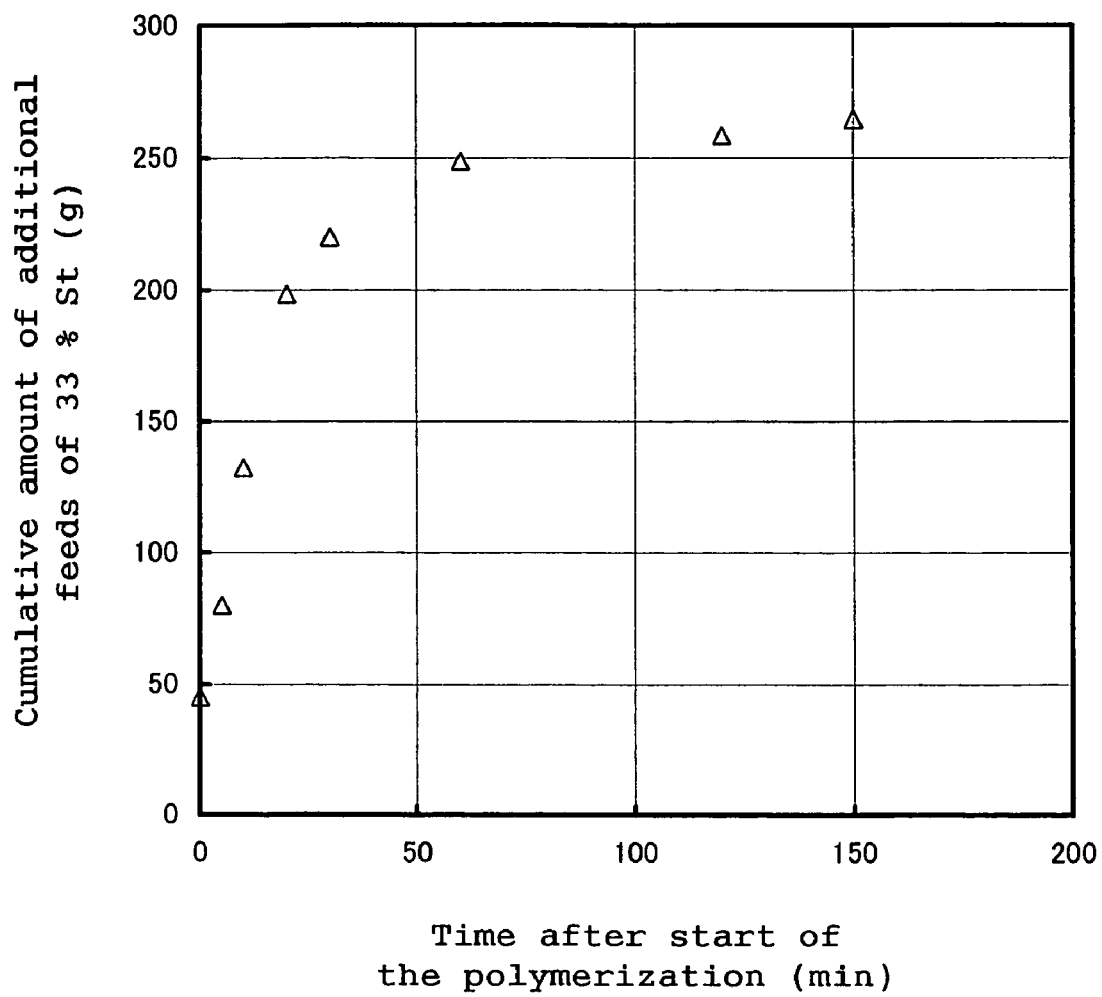
FIG. 1 is a graph showing the change with time in the cumulative amount of additional feeds of a 33% by weight styrene solution in cyclohexane (hereinafter referred to as "33% St") in Example 1.

In one aspect of the present invention, there is provided a cyclic conjugated diene copolymer comprising a main chain represented by the following formula (1):

  (1)

wherein A, B and C are monomer units constituting the main chain in which monomer units A, B and C are arranged in any order, and l, m and n are, respectively, weight percentages of monomer units A, B and C, based on the total weight of monomer units A, B and C;

wherein:
  each A is independently selected from the group consisting of cyclic conjugated diene monomer units,
  each B is independently selected from the group consisting of monomer units obtained from vinyl aromatic monomers each having a hydrogen atom at the α-position thereof, and
  each C is independently selected from the group consisting of monomer units obtained from comonomers which are other than the monomers used for obtaining the monomer units A and B and which are copolymerizable with at least one of the monomers used for obtaining the monomer units A and B;

wherein the cyclic conjugated diene copolymer has a side chain; and wherein:

l, m and n satisfy the following requirements:

$l+m+n=100$, $0.1 \leq l/m \leq 9$, and $0 \leq n \leq 90$, with the proviso that all monomer units A and the monomer units B together form one or more polymer chains each having an A/B random sequence, the one or more polymer chains each having an A/B random sequence containing at least one polymer chain having a number average molecular weight of from 20,000 to 500,000 and containing no polymer chain having a number average molecular weight of more than 500,000.

In another aspect of the present invention, there is provided a partially or completely hydrogenated, cyclic conjugated diene copolymer obtained by partially or completely hydrogenating at least one of the main chain and side chain of the above-mentioned cyclic conjugated diene copolymer.

In still another aspect of the present invention, there is provided a modified, hydrogenated, cyclic conjugated diene copolymer obtained by partially or completely modifying the non-conjugated double bonds present in at least one of the main chain and side chain of the partially hydrogenated, cyclic conjugated diene copolymer which is mentioned above.

In a further aspect of the present invention, there is provided a hydrogenated, modified, cyclic conjugated diene copolymer obtained by subjecting the above-mentioned cyclic conjugated diene copolymer to a modification/hydrogenation treatment, wherein the modification/hydrogenation treatment comprises:

performing at least one modification selected from the group consisting of:

partial or complete modification of the non-conjugated double bonds present in at least one of the main chain and side chain of the abovementioned cyclic conjugated diene copolymer, and modification of at least one terminal of the main chain of the above-mentioned cyclic conjugated diene copolymer, to thereby obtain a modified, cyclic conjugated diene copolymer, and partially or completely hydrogenating at least one of the main chain and side chain of the modified, cyclic conjugated diene copolymer mentioned above to thereby produce a hydrogenated, modified, cyclic conjugated diene copolymer.

In still a further aspect of the present invention, there is provided a crosslinked, hydrogenated, cyclic conjugated diene copolymer produced by crosslinking the hydrogenated, cyclic conjugated diene copolymer mentioned above.

In still a further aspect of the present invention, there is provided a crosslinked, modified, hydrogenated, cyclic conjugated diene copolymer produced by crosslinking the modified, hydrogenated, cyclic conjugated diene copolymer mentioned above.

In still a further aspect of the present invention, there is provided a crosslinked, hydrogenated, modified, cyclic conjugated diene copolymer produced by crosslinking the hydrogenated, modified, cyclic conjugated diene copolymer produced by the modification/hydrogenation treatment of the above-mentioned cyclic conjugated diene copolymer.

In still a further aspect of the present invention, there is provided a shaped article produced by shaping the hydrogenated, cyclic conjugated diene copolymer mentioned above.

In still a further aspect of the present invention, there is provided a microchip comprising the abovementioned shaped article.

In still a further aspect of the present invention, there is provided a process for producing the cyclic conjugated diene copolymer, which comprises reacting a cyclic conjugated diene monomer with a vinyl aromatic monomer having a hydrogen atom at the α-position thereof in the presence of a polymerization initiator in a hydrocarbon solvent, wherein the polymerization initiator comprises:

an organometallic compound containing a metallic element of Group 1 of the Periodic Table, and an ether compound represented by the following formula (3):

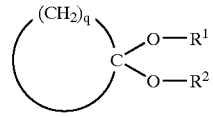

(3)

wherein q is an integer of from 4 to 7, and each of —O—R$^1$ and —O—R$^2$ independently represents an alkoxy group having 1 or more carbon atoms.

For easy understanding of the present invention, the essential features and various preferred embodiments of the present invention are enumerated below.

1. A cyclic conjugated diene copolymer comprising a main chain represented by the following formula (1):

(1)

wherein A, B and C are monomer units constituting the main chain in which monomer units A, B and C are arranged in any order, and l, m and n are, respectively, weight percentages of monomer units A, B and C, based on the total weight of monomer units A, B and C;

wherein:

each A is independently selected from the group consisting of cyclic conjugated diene monomer units, each B is independently selected from the group consisting of monomer units obtained from vinyl aromatic monomers each having a hydrogen atom at the α-position thereof, and each C is independently selected from the group consisting of monomer units obtained from comonomers which are other than the monomers used for obtaining the monomer units A and B and which are copolymerizable with at least one of the monomers used for obtaining the monomer units A and B;

wherein the cyclic conjugated diene copolymer has a side chain; and wherein:

l, m and n satisfy the following requirements:

$l+m+n=100$, $0.1 \leq l/m \leq 9$, and $0 \leq n \leq 90$, with the proviso that all monomer units A and the monomer units B together form one or more polymer chains each having an A/B random sequence, the one or more polymer chains each having an A/B random sequence containing at least one polymer chain having a number average molecular weight of from 20,000 to 500,000 and containing no polymer chain having a number average molecular weight of more than 500,000.

2. The cyclic conjugated diene copolymer according to item 1 above, wherein the one or more polymer chains each having an A/B random sequence contain at least one polymer chain having a number average molecular weight of from more than 30,000 to 500,000.

3. The cyclic conjugated diene copolymer according to item 1 or 2 above, wherein the monomer units A are comprised of at least one cyclic conjugated diene monomer unit selected from the group consisting of units each independently represented by the following formula (2):

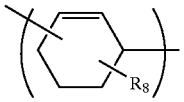
(2)

wherein each R independently represents a hydrogen atom, a halogen atom,
a $C_1$–$C_{20}$ alkyl group, a $C_2$–$C_{20}$ unsaturated aliphatic hydrocarbon group,
a $C_5$–$C_{20}$ aryl group, a $C_3$–$C_{20}$ cycloalkyl group, a $C_4$–$C_{20}$ cyclodienyl group or a 5- to 10-membered heterocyclic group having at least one nitrogen, oxygen or sulfur atom as a heteroatom.

4. A hydrogenated, cyclic conjugated diene copolymer obtained by partially or completely hydrogenating at least one of the main chain and side chain of the cyclic conjugated diene copolymer of any one of items 1 to 3 above.

5. The hydrogenated, cyclic conjugated diene copolymer according to item 4 above, which is partially hydrogenated.

6. A modified, hydrogenated, cyclic conjugated diene copolymer obtained by partially or completely modifying the non-conjugated double bonds present in at least one of the main chain and side chain of the partially hydrogenated, cyclic conjugated diene copolymer of item 5 above.

7. The modified, hydrogenated, cyclic conjugated diene copolymer according to item 6 above, wherein the modification is selected from the group consisting of an epoxidation modification by oxidation and a silane modification by hydrosilylation.

8. A hydrogenated, modified, cyclic conjugated diene copolymer obtained by subjecting the cyclic conjugated diene copolymer of any one of items 1 to 3 above to a modification/hydrogenation treatment,
wherein the modification/hydrogenation treatment comprises:
performing at least one modification selected from the group consisting of:
partial or complete modification of the non-conjugated double bonds present in at least one of the main chain and side chain of the cyclic conjugated diene copolymer, and
modification of at least one terminal of the main chain of the cyclic conjugated diene copolymer,
to thereby obtain a modified, cyclic conjugated diene copolymer, and
partially or completely hydrogenating at least one of the main chain and side chain of the modified, cyclic conjugated diene copolymer to thereby obtain a hydrogenated, modified, cyclic conjugated diene copolymer.

9. The hydrogenated, modified, cyclic conjugated diene copolymer according to item 8 above, wherein:
the partial or complete modification of the non-conjugated double bonds present in at least one of the main chain and side chain of the cyclic conjugated diene copolymer is selected from the group consisting of an epoxidation modification by oxidation and a silane modification by hydrosilylation, and
the modification of at least one terminal of the main chain of the cyclic conjugated diene copolymer is a silane modification by a silyl group introduction reaction which is performed on a living terminal of a cyclic conjugated diene copolymer produced by living anionic polymerization.

10. A crosslinked, hydrogenated, cyclic conjugated diene copolymer obtained by crosslinking the hydrogenated, cyclic conjugated diene copolymer of item 4 above.

11. A crosslinked, modified, hydrogenated, cyclic conjugated diene copolymer obtained by crosslinking the modified, hydrogenated, cyclic conjugated diene copolymer of item 6 or 7 above.

12. A crosslinked, hydrogenated, modified, cyclic conjugated diene copolymer obtained by crosslinking the modified, hydrogenated, cyclic conjugated diene copolymer of item 8 or 9 above.

13. A shaped article obtained by shaping the hydrogenated, cyclic conjugated diene copolymer of item 4 above.

14. A microchip comprising the shaped article of item 13 above.

15. A process for producing the cyclic conjugated diene copolymer of item 1 or 2 above, which comprises reacting a cyclic conjugated diene monomer with a vinyl aromatic monomer having a hydrogen atom at the α-position thereof in the presence of a polymerization initiator in a hydrocarbon solvent,
wherein the polymerization initiator comprises:
an organometallic compound containing a metallic element of Group 1 of the Periodic Table, and
an ether compound represented by the following formula (3):

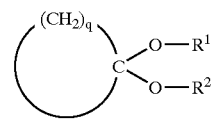
(3)

wherein $q_1$ is an integer of from 4 to 7, and each of —O—$R^1$ and —O—$R^2$ independently represents an alkoxy group having 1 or more carbon atoms.

Hereinbelow, the present invention is described in detail.

In the present invention, the monomer units of the polymer are named in accordance with a nomenclature such that the names of the original monomers from which the monomer units are obtained, as such, are used with the term "unit" attached thereto. For example, the term "cyclic conjugated diene monomer unit" means a monomer unit which is formed in a polymer obtained by the polymerization of a cyclic conjugated diene monomer and which has a molecular structure such that a cycloolefin corresponding to the cyclic conjugated diene monomer is bonded at two carbon atoms of the skeleton thereof.

The cyclic conjugated diene monomer in the present invention is a cyclic conjugated diene having a 6- or more-membered carbocyclic structure constituted by carbon-carbon linkages. It is preferred that the cyclic conjugated diene monomer is a cyclic conjugated diene having 6- to 8-membered carbocyclic structure constituted by carbon-carbon linkages. It is especially preferred that the cyclic conjugated diene monomer is a cyclic conjugated diene having a 6-membered carbocyclic structure constituted by carbon-carbon linkages. Specific examples of cyclic conjugated diene monomers include 1,3-cyclohexadiene, 1,3-cyclooctadiene and derivatives thereof. These cyclic conjugated diene monomers can be used individually or in combination. Especially preferred examples of cyclic conjugated diene monomers are 1,3-cyclohexadiene and a derivative thereof. Specifically, it is especially preferred that the monomer units A are comprised of at least one cyclic conjugated diene monomer unit selected from the group consisting of units each independently represented by the following formula (2):

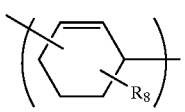

(2)

wherein each R independently represents a hydrogen atom, a halogen atom,
a $C_1$–$C_{20}$ alkyl group, a $C_2$–$C_{20}$ unsaturated aliphatic hydrocarbon group,
a $C_5$–$C_{20}$ aryl group, a $C_3$–$C_{20}$ cycloalkyl group, a $C_4$–$C_{20}$ cyclodienyl group or a 5- to 10-membered heterocyclic group having at least one nitrogen, oxygen or sulfur atom as a heteroatom.

It is preferred that the number of carbon atoms of the alkyl group as an R group in formula (2) above is from 2 to 10. It is preferred that the number of carbon atoms of the unsaturated aliphatic hydrocarbon group as an R group in formula (2) above is from 2 to 10. It is preferred that the number of carbon atoms of the aryl group as an R group in formula (2) above is from 5 to 10. It is preferred that the number of carbon atoms of the cycloalkyl group as an R group in formula (2) above is from 5 to 10. It is preferred that the number of carbon atoms of the cyclodienyl group as an R group in formula (2) above is from 5 to 10. It is preferred that the heterocyclic group is a 5- to 8-membered heterocyclic group.

Specific examples of R groups in formula (2) above include a methyl group, an ethyl group, an n-propyl group, an isopropyl group, an n-butyl group, a sec-butyl group, a tert-butyl group, a pentyl group, a hexyl group, a cyclopentyl group, a cyclohexyl group, a vinyl group, a phenyl group, a tolyl group, a naphthyl group, a cyclopentadienyl group, an indenyl group, a pyridyl group and a piperidyl group.

Examples of vinyl aromatic monomers each having a hydrogen atom at the α-position thereof in the present invention include styrene and derivatives of styrene, such as o-methyl styrene, p-methyl styrene, tert-butyl styrene, 2,5-dimethyl styrene, o-methoxy styrene, m-methoxy styrene, p-methoxy styrene and divinyl benzene; and vinyl naphthalene and vinyl pyridine.

In the present invention, the vinyl aromatic monomer having a hydrogen atom at the α-position thereof cannot be replaced by a vinyl aromatic monomer having no hydrogen atom at the α-position thereof. A random copolymer obtained by copolymerizing a vinyl aromatic monomer having no hydrogen atom at the α-position thereof with a cyclic conjugated diene monomer, has poor heat resistance and cannot be used at high temperatures.

The copolymerizable comonomers used for obtaining optional monomer units C in the present invention are conventional monomers which are polymerizable by an anionic polymerization. Examples of such comonomers include chain conjugated diene monomers, such as 1,3-butadiene, isoprene, 2,3-dimethyl-1,3-butadiene, 1,3-pentadiene and 1,3-hexadiene; polar vinyl monomers, such as methyl methacrylate, methyl acrylate, acrylonitrile, methacrylonitrile, methyl vinyl ketone and methyl α-cyanoacrylate; polar monomers, such as ethylene oxide, propylene oxide, a (cyclic) lactone, a (cyclic) lactam and a cyclosiloxane; and olefin monomers, such as ethylene. These monomers can be used individually or in combination.

Further, the weight ratio (l/m) of the monomer units A obtained from cyclic conjugated diene monomers to the monomer units B obtained from vinyl aromatic monomers each having a hydrogen atom at the α-position thereof is generally in the range of from 0.1 to 9. When the l/m is 0.1 or more, the copolymer has improved heat resistance and can be suitably used as an optical material. When the l/m is 9 or less, an advantage can be obtained in that, in the polymer chain having an A/B random sequence, a segment consisting of monomer units A (obtained from cyclic conjugated diene monomers) has an appropriate length, thereby exhibiting a satisfactory solubility in a solvent. From the viewpoint of obtaining a good balance of heat resistance and solubility in a solvent, it is preferred that $0.6 \leq l/m \leq 6$.

In the cyclic conjugated diene copolymer of the present invention, it is required that all monomer units A (obtained from cyclic conjugated diene monomers) exhibit a random sequence with at least a part of the monomer units B (obtained from vinyl aromatic monomers having a hydrogen atom at the α-position thereof).

That is, in the cyclic conjugated diene copolymer of the present invention, all monomer units A and at least a part of the monomer units B together form one or more polymer chains each having an A/B random sequence. In other words, all monomer units A are present in the form of one or more polymer chains each having an A/B random sequence, wherein the one or more polymer chains are formed by all monomer units A in cooperation with at least a part of the monomer units B.

When some of the monomer units B (obtained from vinyl aromatic monomers each having a hydrogen atom at the α-position thereof) do not form an A/B random sequence in cooperation with the monomer units A, such monomer units B may be block-copolymerized with a polymer chain in which the monomer units A (obtained from cyclic conjugated diene monomers) and the monomer units B (obtained from vinyl aromatic monomers each having a hydrogen atom at the α-position thereof) together form a random sequence (i.e., may be block-copolymerized with the one or more polymer chains each having an A/B random sequence). Further, such monomer units B may also form a random sequence together with the monomer units C obtained from comonomers which are other than the monomers used for obtaining the monomer units A and B and which are copolymerizable with at least one of the monomers used for obtaining the monomer units A and B.

Specifically, for example, the cyclic conjugated diene copolymer of the present invention may be any of the following copolymers:

(1) a random copolymer comprising a polymer chain in which the monomer units A (obtained from cyclic conjugated diene monomers) and the monomer units B (obtained from vinyl aromatic monomers each having a hydrogen atom at the α-position thereof) together form an A/B random sequence (i.e., a random copolymer comprising a polymer chain having an A/B random sequence);

(2) a block copolymer comprising the below-mentioned two polymer chains bonded together: a polymer chain in which the monomer units A (obtained from cyclic conjugated diene monomers) and the monomer units B (obtained from vinyl aromatic monomers each having a hydrogen atom at the α-position thereof) together form an A/B random sequence, and a polymer chain comprised of the monomer units C (obtained from comonomers which are other than the monomers used for obtaining the monomer units A and B and which are copolymerizable with at least one of the monomers used for obtaining the monomer units A and B) (i.e., a block copolymer comprising an A/B random copolymer block and a C monomer unit homopolymer block);

(3) a block copolymer comprising the below-mentioned two polymer chains bonded together: a polymer chain in which the monomer units A (obtained from cyclic conjugated diene monomers) and the monomer units B (obtained from vinyl aromatic monomers each having a hydrogen atom at the α-position thereof) together form an A/B random sequence, and a polymer chain comprised of the monomer units B (obtained from vinyl aromatic monomers each having a hydrogen atom at the α-position thereof) (i.e., a block copolymer comprising an A/B random copolymer block and a B monomer unit homopolymer block);

(4) a block copolymer comprising the below-mentioned three polymer chains bonded together: a polymer chain in which the monomer units A (obtained from cyclic conjugated diene monomers) and the monomer units B (obtained from vinyl aromatic monomers each having a hydrogen atom at the α-position thereof) together form an A/B random sequence, a polymer chain comprised of the monomer units B (obtained from vinyl aromatic monomers each having a hydrogen atom at the α-position thereof), and a polymer chain comprised of the monomer units C (obtained from comonomers which are other than the monomers used for obtaining the monomer units A and B and which are copolymerizable with at least one of the monomers used for obtaining the monomer units A and B) (i.e., a block copolymer comprising an A/B random copolymer block, and a B monomer unit homopolymer block and a C monomer unit homopolymer block);

(5) a block copolymer comprising the below-mentioned two polymer chains bonded together: a polymer chain in which the monomer units A (obtained from cyclic conjugated diene monomers) and the monomer units B (obtained from vinyl aromatic monomers each having a hydrogen atom at the α-position thereof) together form an A/B random sequence, and a polymer chain in which the monomer units B (obtained from vinyl aromatic monomers each having a hydrogen atom at the α-position thereof) and the monomer units C (obtained from comonomers which are other than the monomers used for obtaining the monomer units A and B and which are copolymerizable with at least one of the monomers used for obtaining the monomer units A and B) together form a B/C random sequence (i.e., a block copolymer comprising an A/B random copolymer block and a B/C random comopolymer block); and (6) a copolymer having a structure comprising a combination of at least two structures selected from the group consisting of the structures of the abovementioned copolymers (1) to (5).

A polymer chain having an A/B random sequence may contain a small amount of monomer units C so long as the cast film forming property and melt molding property, which are contributed to by the polymer chain having an A/B random sequence, are not impaired.

In the cyclic conjugated diene copolymer of the present invention, the one or more polymer chains each having an A/B random sequence contain at least one polymer chain having a number average molecular weight of from 20,000 to 500,000 and contain no polymer chain having a number average molecular weight of more than 500,000. Since the one or more polymer chains each having an A/B random sequence contain at least one polymer chain having a number average molecular weight of 20,000 or more, there can be exhibited strength and impact resistance which are satisfactory for a polymer material. On the other hand, since the one or more polymer chains each having an A/B random sequence contain no polymer chain having a number average molecular weight of more than 500,000, the viscosity of a solution obtained by dissolving the cyclic conjugated diene copolymer in a solvent, can be adjusted to an appropriate value.

It is preferred that the one or more polymer chains each having an A/B random sequence contain at least one polymer chain having a number average molecular weight of from 24,000 to 500,000, more advantageously from more than 30,000 to 500,000, still more advantageously from more than 30,000 to 200,000, especially advantageously from 40,000 to 200,000.

In the present invention, the number average molecular weight is measured by gel permeation chromatography (solvent: o-dichlorobenzene), using a calibration curve obtained with respect to standard polystyrene samples.

As mentioned above, in the cyclic conjugated diene copolymer of the present invention, the one or more polymer chains each having an A/B random sequence may have, bonded thereto, an optional polymer chain comprising the monomer units B and/or the monomer units C. As methods for producing the cyclic conjugated diene copolymer of the present invention having an optional polymer chain comprising the monomer units B and/or the monomer units C, there can be mentioned the following two methods: (1) a method in which, first, a block of polymer chain having an A/B random sequence is produced, and then a block of optional polymer chain comprising the monomer units B and/or the monomer units C is bonded thereto by a polymerization, and (2) a method in which, first, a block of optional polymer chain comprising the monomer units B and/or the monomer units C is produced and then a block of polymer chain having an A/B random sequence is bonded thereto by a polymerization. When the method (1) of the above-mentioned production methods is employed, the measurement of the number average molecular weight of the polymer chain having an A/B random sequence is performed by a method in which a sampling of the block of polymer chain having an A/B random sequence is made before the bonding of the block of optional polymer chain comprising the monomer units B and/or the monomer units C, and the obtained sample is subjected to measurement. On the other hand, when the method (2) of the above-mentioned production methods is employed, the number average molecular weight of the polymer chain having an A/B random sequence is measured as follows. First, a sampling of the block of optional polymer chain comprising the monomer units B and/or the monomer units C is made before the bonding of the polymer chain having an A/B random sequence, and the obtained sample is subjected to a measurement of the number average molecular weight. The obtained value is designated as "number average molecular weight I". Next, the block of polymer chain having an A/B random sequence is bonded to the block of optional polymer chain comprising the monomer units B and/or the monomer units C to obtain a block copolymer, and a sampling of the obtained block copolymer is made, whereupon the obtained sample is subjected to a measurement of the number average molecular weight. The obtained value is designated as "number average molecular weight II". By subtracting the "number average molecular weight I" from the "number average molecular weight II", the number average molecular weight of the polymer chain having an A/B random sequence can be obtained.

In the present invention, confirmation of the presence of an A/B random sequence in the polymer chain comprising the monomer units A and the monomer units B can be performed by a method in which a peak ascribed to the bond between the monomer units A and B is measured by $^1$H-NMR and $^{13}$C-NMR, and the measured peak is compared with the peaks ascribed to other bonds (e.g., the peak ascribed to the structure of a polystyrene and the peak ascribed to the structure of a poly 1,3-cyclohexadiene).

In the polymer chain having an A/B random sequence, the average number of monomer units A in segments consisting of monomer units A is generally in the range of from 1 to 12, and the average number of monomer units B in segments consisting of monomer units B is generally in the range of from 1 to 8.

It is preferred that the cyclic conjugated diene copolymer is of the structure of the above-mentioned copolymer (2) (i.e., a block copolymer comprising an A/B random copolymer block and a C monomer unit homopolymer block) and that the monomer units C are obtained from chain conjugated diene monomers, because advantages can be obtained in that the impact resistance of the cyclic conjugated diene copolymer can be greatly improved while maintaining heat resistance and solubility in a solvent. The polymer block structure can be appropriately selected, and may be any of a diblock structure, a triblock structure and the like.

The number average molecular weight of the cyclic conjugated diene copolymer having such a structure is generally in the range of from more than 30,000 to 1,000,000.

The number "n" in formula (1) (i.e., the weight percentage of the monomer units C obtained from comonomers which are copolymerizable with at least one of the monomers used for obtaining the monomer units A and B) varies depending on the desired characteristics of the conjugated diene copolymer and can be selected in the range of from 0 to 90.

When the cyclic conjugated diene copolymer is used in fields where it is important to obtain a good balance of heat resistance and surface hardness, it is preferred that the value of n in formula (1) is selected in the range of from 0 to less than 10. It is more preferred that the value of n in formula (1) is in the range of from 0 to 1, because when the value of n is in this range, the surface hardness of a film formed from such conjugated diene copolymer can be improved to a maximum level, and also the practically important scratch resistance of a film formed from such conjugated diene copolymer can be improved to a maximum level.

When the cyclic conjugated diene copolymer is used in fields where it is more important to obtain a good balance of heat resistance and improved impact resistance than to obtain improved surface hardness, it is preferred that the value of n in formula (1) is selected in the range of from 10 to 90. When the value of n in formula (1) is in the range of from 10 to 90, the compatibility between a polymer chain in which the monomer units A (obtained from cyclic conjugated diene monomers) and the monomer units B (obtained from vinyl aromatic monomers each having a hydrogen atom at the α-position thereof) together form an A/B random sequence (i.e., a polymer chain having an A/B random sequence) and a polymer chain comprising the monomer units C (obtained from comonomers which are other than monomers used for obtaining the monomer units A and B and which are copolymerizable with at least one of the monomers used for obtaining the monomer units A and B), becomes reduced appropriately, so that a phase separation is likely to occur, thereby rendering it easier to obtain a good balance of heat resistance and impact resistance. From the viewpoint of improving the balance of heat resistance and impact resistance, it is more preferred that the value of n in formula (1) is in the range of from 15 to 80. When the value of n in formula (1) is in this range of from 15 to 80, a maximum impact resistance can be obtained while maintaining transparency and necessary heat resistance.

The cyclic conjugated diene copolymer of the present invention has a side chain. Examples of side chains include an aromatic ring in monomer unit B and a vinyl group, wherein the vinyl group is formed when a chain conjugated diene monomer (which is an example of a monomer used for obtaining an optional monomer unit C), such as 1,3-butadiene or isoprene, is polymerized by a 1,2-addition bonding.

With respect to the process of the present invention for producing the cyclic conjugated diene copolymer of the present invention, an explanation is made below.

The process of the present invention for producing the cyclic conjugated diene copolymer of the present invention is an anionic polymerization process which comprises reacting a cyclic conjugated diene monomer with a vinyl aromatic monomer having a hydrogen atom at the α-position thereof in the presence of a polymerization initiator in a hydrocarbon solvent, wherein the polymerization initiator comprises an organometallic compound containing a metallic element of Group 1 of the Periodic Table (hereinafter, this organometallic compound is frequently referred to as "organo(Group 1)metallic compound"), and an ether compound represented by the following formula (3):

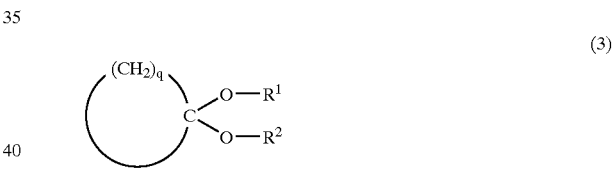

wherein q is an integer of from 4 to 7, and each of —O—R$^1$ and —O—R$^2$ independently represents an alkoxy group having 1 or more carbon atoms, preferably 1 to 6 carbon atoms.

In the present invention, examples of hydrocarbons used as polymerization solvents include $C_4$–$C_{10}$ saturated hydrocarbons, such as butane, n-pentane, n-hexane, n-heptane, n-octane, isooctane, n-nonane, n-decane, cyclopentane, methylcyclopentane, cyclohexane, methylcyclohexane, ethylcyclohexane, cycloheptane, cyclooctane, decalin and norbornane; and $C_6$–$C_{10}$ aromatic hydrocarbons, such as benzene, toluene, xylene, ethylbenzene, cumene and tetralin. An appropriate solvent can be selected from these hydrocarbons, depending on the commercial productivity, the influence on a subsequent reaction, and the like. The above-mentioned hydrocarbons may be used individually or in combination. Of the above-mentioned hydrocarbons, especially preferred are saturated hydrocarbons, such as cyclohexane, methylcyclohexane and decalin.

As mentioned above, an organo(Group 1)metallic compound is used as a part of the polymerization initiator in the polymerization process of the present invention for producing the cyclic conjugated diene copolymer. Examples of metallic elements of Group 1 of the Periodic Table, used in the organo(Group 1)metallic compound, include lithium, sodium and potassium. Of these metallic elements, lithium and sodium are preferred. Organo(Group 1)metallic compounds may be used individually or in combination.

With respect to the organo(Group 1)metallic compound which is used as a part of the polymerization initiator, explanation is made below, taking as examples organolithium compounds and organosodium compounds, which are preferred examples of organo(Group 1)metallic compounds.

The term "organolithium compound" means a conventional organic compound having a structure in which one or more lithium atoms are bonded to an organic residue having at least one carbon atom. Likewise, the term "organosodium compound" means a conventional organic compound having a structure in which one or more sodium atoms are bonded to an organic residue having at least one carbon atom.

Examples of organolithium compounds include methyllithium, ethyllithium, n-propyllithium, isopropyllithium, n-butyllithium, sec-butyllithium, tertbutyllithium, pentyllithium, hexyllithium, allyllithium, cyclohexyllithium, phenyllithium, hexamethylenedilithium, 1,3-bis(1-lithio-1,3,3-trimethylbutyl)benzene, cyclopentadienyllithium, indenyllithium, butadienyldilithium and isoprenyldilithium. Further examples of organolithium compounds include oligomeric or polymeric organolithium compounds each containing a lithium atom in the molecular chain thereof, such as polybutadienyllithium, polyisoprenyllithium and polystyryllithium.

Examples of organosodium compounds include sodium naphthalene, a living tetramer of sodium α-methylstyrene, and n-amylsodium. Further examples of organosodium compounds include oligomeric or polymeric or ganosodium compounds each containing a sodium atom in the molecular chain thereof, such as polybutadienylsodium, polyisoprenylsodium and polystyrylsodium. The above-mentioned term "living tetramer of sodium α-methylstyrene" means a tetrameric dianion which is obtained by contacting α-methylstyrene (concentration: 0.4 to 0.5 M) with an excess amount of metallic sodium in tetrahydrofuran at room temperature (25° C.) for 2 to 6 hours.

Preferred examples of organolithium compounds include n-butyllithium, sec-butyllithium, tert-butyllithium, cyclohexyllithium and 1,3-bis(1-lithio-1,3,3-trimethylbutyl)benzene. Preferred examples of organosodium compounds include sodium naphthalene and a living tetramer of sodium α-methylstyrene. When 1,3-bis(1-lithio-1,3,3-trimethylbutyl)benzene is used, it is preferred to use an amine (capable of serving as a monodentate ligand) in combination with 1,3-bis(1-lithio-1,3,3-trimethylbutyl)benzene, because molecules of 1,3-bis(1-lithio-1,3,3-trimethylbutyl)benzene are likely to associate with each another in a polymer solution in the absence of an amine. That is, the use of an amine is advantageous in that association of molecules of the organo(Group 1)metallic compound (as a polymerization initiator) can be broken in the presence of the amine, so that the initiation reaction between the organo(Group 1)metallic compound and the monomer can be completed in a very short time, thereby rendering it possible to achieve a narrow molecular weight distribution of the cyclic conjugated diene copolymer. A specific example of an amine is triethylamine. It is preferred that the amine is used in a molar ratio of from 0.01 to 1.20, relative to the metallic element of Group 1 of the Periodic Table in the organo(Group 1)metallic compound.

The amount of the organo(Group 1)metallic compound used as a part of the polymerization initiator varies depending on the desired molecular weight and desired structure of the cyclic conjugated diene copolymer. However, the amount of the organo(Group 1)metallic compound is generally from $2.0 \times 10^{-3}$ to $1.0 \times 10^{-1}$ mol, preferably from $5.0 \times 10^{-3}$ to $6.7 \times 10^{-2}$ mol in terms of the amount of the metal atoms, per kg of the total amount of the monomers used.

In the polymerization process of the present invention, an ether compound is used as a part of polymerization initiator in combination with the organo(Group 1)metallic compound. The ether compound is a cyclic ether compound represented by the formula (3) wherein q is an integer of from 4 to 7. The cyclic ether compound of formula (3) has a structure in which two hydrogen atoms bonded to the same carbon atom in a cyclic saturated hydrocarbon compound having 5 to 8 carbon atoms are replaced by two alkoxy groups respectively represented by the formulae: —O—R and —O—R wherein each of the alkoxy groups has 1 or more carbon atoms, preferably 1 to 6 carbon atoms, and $R^1$ and $R^2$ are the same or different. The present inventors presume that, when the polymerization is performed in the presence of the cyclic ether compound of formula (3), the rate of homopolymerization of cyclic conjugated diene monomers and the rate of copolymerization of cyclic conjugated diene monomers with vinyl aromatic monomers each having a hydrogen atom at the α-position thereof, become approximately equal to each other, thereby enabling the production of a desired copolymer comprising one or more polymer chain each having an A/B random sequence.

In the formula (3), q is an integer of from 4 to 7, preferably from 5 to 6. By virtue of this, the ether compound can be satisfactorily dissolved in the solvent. It is preferred that each of the alkoxy groups in the formula (3) has 1 to 6 carbon atoms, since, in this case, the polymerization of the monomers proceeds without causing a side reaction, such as a termination reaction. It is more preferred that each of the alkoxy groups in the formula (3) has 1 to 3 carbon atoms. Specific examples of cyclic ether compounds of formula (3) include 1,1-dimethoxycyclohexane, 1,1-diethoxycyclohexane and 1,1-dipropoxycyclohexane.

In the process of the present invention, it is preferred that the amount of the cyclic ether compound represented by the formula (3) is from 0.025 to 0.25 in terms of the value represented by the formula: $X/(X+Y+Z)$, wherein X represents the weight of the cyclic ether compound of formula (3), Y represents the total weight of the monomers, and Z represents the total weight of components (such as the solvent) other than the cyclic ether compound and the monomers. When the value represented by the formula: $X/(X+Y+Z)$ is 0.025 or more, a desired random copolymer having a high molecular weight can be obtained at a satisfactory high rate. On the other hand, when the value represented by the formula: $X/(X+Y+Z)$ is 0.25 or less, deactivation of the living terminals of polymers being formed during the polymerization reaction can be suppressed, so that the number average molecular weight of the cyclic conjugated diene copolymer can be easily adjusted to a desired level. The value represented by the formula: $X/(X+Y+Z)$ is more preferably from 0.050 to 0.20, most preferably from 0.075 to 0.15.

In the polymerization process of the present invention, the polymerization reaction temperature can be appropriately chosen. From the viewpoint of suppressing the deactivation of the living terminals of polymers being formed during the polymerization reaction so as to easily obtain a high molecular weight copolymer, it is preferred that the polymerization reaction temperature is from −30 to 100° C. On the other hand, from the viewpoint of increasing the polymerization rate so as to easily obtain a high molecular weight copolymer, it is more preferred that the polymerization reaction temperature is from 15 to 80° C.

In the polymerization reaction, the monomer concentration is defined by the formula: Y/(Y+Z), wherein Y represents the total weight of the monomers, and Z represents the total weight of components other than the monomers (such as the solvent and the cyclic ether compound). It is preferred that the monomer concentration defined by the formula: Y/(Y+Z) is from 0.01 to 0.50. From the viewpoint of increasing the polymerization rate, it is preferred that the monomer concentration is 0.01 or more. When the monomer concentration is 0.50 or less, stirring for keeping the reaction mixture homogeneous can be effectively conducted. The monomer concentration is more preferably from 0.10 to 0.35, most preferably from 0.15 to 0.30.

The polymerization reaction time varies depending on the desired properties of the cyclic conjugated diene copolymer and the other polymerization conditions and, hence, cannot be specifically limited. However, the polymerization reaction time is generally within 48 hours, preferably from 30 minutes to 8 hours.

The polymerization reaction is conducted in an atmosphere of an inert gas, such as high purity nitrogen or high purity argon, each of which has a purity of 99.9999%, an oxygen concentration of less than 0.2 ppm, and a carbon dioxide concentration of less than 1.0 ppm. When impurities (such as water, oxygen and carbon dioxide gas) which are likely to deactivate the polymerization initiator and/or anionic living terminals are intruded into the polymerization reaction system, disadvantages are likely to be caused wherein the polymerization rate is greatly lowered, even if the amount of the impurities is only several parts per million. Therefore, during the polymerization reaction, care must be taken so as to prevent the impurities from intruding into the polymerization reaction system. It is preferred that the polymerization reaction pressure is kept higher than atmospheric pressure. Further, the polymerization reaction pressure is kept at a level sufficient to maintain the monomers as raw materials and the hydrocarbon solvent in a liquid state at a temperature within the above-mentioned range of polymerization reaction temperature.

When the degree of polymerization of the anionic living polymers being formed has reached a desired level, a polymerization terminator is introduced into the polymerization reaction system so as to deactivate the anionic living terminals of the polymers, thereby terminating the polymerization reaction. In the present invention, as the polymerization terminator, there can be used any conventional polymerization terminator which is capable of deactivating anionic living terminals of polymers. Preferred examples of polymerization terminators include water, $C_1$–$C_{20}$ alcohols, ketones, phenolic compounds, carboxylic acids, halogenated hydrocarbons, carbon dioxide gas, hydrogen gas and halogen gases. The deactivation of anionic living terminals of polymers can also be performed as follows. Living polymers obtained in the polymerization reaction system are transferred to a deactivation reactor, and then, a polymerization terminator is introduced into the deactivation reactor to deactivate the anionic living terminals of the polymers.

The polymerization reaction can be performed in various manners. For example, the polymerization reaction can be performed in a manner in which, with respect to each of the materials, the whole amount of the material is charged into the reactor at one time. Alternatively, the polymerization reaction can be performed in a manner in which, with respect to each of the materials, the material is portionwise charged into the reactor at two or more times. Further, the polymerization reaction can be performed in a manner in which, with respect to each of some materials, the whole amount of the material is charged into the reactor at one time, and, with respect to each of the other materials, the material is portionwise charged into the reactor at two or more times. Furthermore, the polymerization reaction can be performed in a continuous manner. Thus, the polymerization process of the present invention for producing the cyclic conjugated diene copolymer can be performed in a manner in which, with respect to each of the materials (i.e., the solvent, the polymerization initiator, the amine and the monomers), a part or all of the material is charged into the reactor at the start of the reaction, and all of any remainder of the material is subsequently charged into the reactor at one time or portionwise at two or more times, wherein there can be appropriately chosen the manner of charging of the remainder of the material, i.e., the order of charging of the remainder of the material in relation to the addition of the other materials, and the timing and rate of charging of the remainder of the material.

For obtaining an A/B random sequence having very high randomness so that the cyclic conjugated diene copolymer exhibits a very high solubility in a solvent, it is preferred to additionally charge the vinyl aromatic monomer (having a hydrogen atom at the α-position thereof) into the reactor so as to appropriately control the weight ratio of the cyclic conjugated diene monomer (which remains unreacted in the polymerization reaction system) to the vinyl aromatic monomer having a hydrogen atom at the α-position thereof (which remains unreacted in the polymerization reaction system). Specifically, it is preferred that, when the conversion of the cyclic conjugated diene monomer is in the range of from 1 to 99%, the ratio (M/L) is from 0.001 to 1, wherein L represents the weight percentage of the cyclic conjugated diene monomer remaining unreacted, based on the total weight of all monomers remaining unreacted in the polymerization reaction system, and M represents the weight percentage of the vinyl aromatic monomer having a hydrogen atom at the α-position thereof, which remains unreacted, based on the total weight of all monomers remaining unreacted in the polymerization reaction system. It is more preferred that the ratio (M/L) is from 0.01 to 0.5.

As mentioned above, the cyclic conjugated diene copolymer obtained by the polymerization process of the present invention may be a block copolymer comprising a polymer chain in which the monomer units A (obtained from cyclic conjugated diene monomers) and the monomer units B (obtained from vinyl aromatic monomers each having a hydrogen atom at the α-position thereof) together form an A/B random sequence, and a polymer chain comprised of the monomer units C (i.e., a block copolymer comprising an A/B random copolymer block and a C monomer unit homopolymer block). In such case, it is preferred that the monomer units C are selected from the group consisting of monomer units obtained from chain conjugated diene monomers, such as 1,3-butadiene and isoprene.

In the polymerization of a chain conjugated diene monomer, if desired, an appropriate polar substance can be used which does not adversely affect the random copolymerization of the cyclic conjugated diene monomer with the vinyl aromatic monomer having a hydrogen atom at the α-position thereof. By the use of the polar substance, it becomes possible to break association of the molecules of the organolithium compound so as to smoothly initiate the polymerization of the chain conjugated diene monomer, thereby rendering it possible to achieve a narrow molecular weight distribution of the resultant chain conjugated diene polymer block. An example of an appropriate polar substance is triethylamine. The amount of the polar substance is 1.2 mol or less per mol of the lithium atom used. When 1,3-butadiene is used as the chain conjugated diene monomer, and the cyclic conjugated diene copolymer is subjected to hydrogenation, it is necessary to adjust, by the use of a suitable polar substance, the amount of the 1,2-bonds in the 1,3-butadiene moiety (i.e., chain conjugated diene polymer block) to a value in the range of from 35 mol % to less than 85 mol %, based on the total molar amount of the 1,2-bonds and 1,4-bonds in the 1,3-butadiene moiety. When the amount of the 1,2-bonds in the 1,3-butadiene moiety is within the above-mentioned range, the butadiene moiety of the hydrogenated, cyclic conjugated diene copolymer does not have an ethylene structure which is crystalline, and the glass transition temperature of the butadiene moiety of the hydrogenated copolymer is sufficiently low to achieve high impact resistance of the hydrogenated copolymer. Therefore, from the viewpoint of imparting high impact resistance to the hydrogenated copolymer, it is preferred that the amount of the 1,2-bonds in the 1,3-butadiene moiety is within the above-mentioned range.

It is preferred that the main chain of the cyclic conjugated diene copolymer of the present invention has a tri- or more block structure (i.e., a structure comprising three or more polymer blocks). From the viewpoint of obtaining excellent heat resistance and excellent impact resistance, it is especially preferred that the main chain of the cyclic conjugated diene copolymer has a triblock structure wherein the intermediate polymer block is a block obtained by polymerizing a chain conjugated diene monomer, that is, the main chain has a block configuration of "high glass transition temperature polymer block/low glass transition temperature polymer block/high glass transition temperature polymer block".

For obtaining a polymer chain having the abovementioned triblock structure, it is preferred that an organolithium compound having a bifunctionality, such as 1,3-bis(1-lithio-1,3,3-trimethylbutyl)benzene, is used as the organo(Group 1)metallic compound which is a part of the polymerization initiator. The polymer chain having the desired triblock structure can be easily obtained by subjecting the chain conjugated diene monomer to living polymerization by using a bifunctional organolithium compound to obtain a chain conjugated diene polymer block, followed by formation of two polymer chains (i.e., polymer blocks) in which cyclic conjugated diene monomer units and vinyl aromatic monomer units (obtained from at least one vinyl aromatic monomer having a hydrogen atom at the α-position thereof) are randomly arranged. Specifically, the polymer chain can be produced, for example, by the following method. To a polymerization solvent are added the ether compound of the formula (3), 1,3-bis(1-lithio-1,3,3-trimethylbutyl)benzene as a polymerization initiator and a chain conjugated diene monomer, and a living polymerization of the chain conjugated diene monomer is performed to thereby obtain a polymer block consisting of chain conjugated diene monomer units. (The catalyst (i.e., the polymerization initiator) in the resultant reaction mixture is not deactivated but is used as such in situ for the subsequent reaction.) To the reaction mixture are added a cyclic conjugated diene monomer and a vinyl aromatic monomer having a hydrogen atom at the α-position thereof, and a random copolymerization of the cyclic conjugated diene monomer with the vinyl aromatic monomer is performed to thereby form two polymer chains (i.e., polymer blocks) each having an A/B random sequence, wherein the two polymer chains are bonded to both terminals of the above-obtained polymer block consisting of chain conjugated diene monomer units. Thus, a polymer chain having a desired triblock structure in which two polymer blocks each having an A/B random sequence are bonded to both terminals of a polymer block consisting of chain conjugated diene monomer units, can be easily obtained (this method is used in Example 3 mentioned below).

When a chain conjugated diene monomer, such as 1,3-butadiene or isoprene, is used for forming the monomer unit C (obtained from a comonomer which is copolymerizable with at least one of the monomers used for obtaining the monomer units A and B), the polymerization of the chain conjugated diene monomer is performed at an appropriate temperature chosen in the range of from –20 to 80° C. When the polymerization reaction temperature is –20° C. or higher, it becomes possible to achieve a polymerization rate necessary and sufficient for obtaining a desired chain conjugated diene polymer block. On the other hand, when the polymerization reaction temperature is 80° C. or lower, the anionic terminals of polymers being formed exhibit a livingness sufficient to obtain a polymer block having a desired structure. The polymerization reaction temperature is preferably from 0 to 60° C.

By the polymerization reaction, the cyclic conjugated diene copolymer of the present invention is obtained in the form of a polymer solution as a reaction mixture. As a method for separating and recovering the cyclic conjugated diene copolymer from the reaction mixture, there can be mentioned a conventional method which is generally employed for recovering a polymer from a reaction mixture in the form of a solution. Examples of such conventional methods include a steam-coagulation method comprising directly contacting the reaction mixture with steam to thereby evaporate and remove the polymerization solvent; a method comprising introducing the reaction mixture into a poor solvent for the polymer, wherein the solvent can be mixed with the polymerization solvent, to thereby precipitate the polymer; a method in which the reaction mixture is cast into a thin film, followed by heating to thereby distill off the polymerization solvent; and a method in which the reaction mixture is extruded using an extruder having a vent while distilling off the polymerization solvent through the vent, followed by pelletization. An optimum method for separating and recovering the cyclic conjugated diene copolymer can be selected depending on the properties of the cyclic conjugated diene copolymer and polymerization solvent.

When it is intended to extremely lower the amounts of impurities (e.g., metal derived from the polymerization initiator, amine, and metal as a hydrogenation catalyst) contained in the cyclic conjugated diene copolymer to thereby obtain a high purity cyclic conjugated diene copolymer, the impurities can be removed by various methods. Examples of such methods include a method in which a metal ion contained in the reaction mixture containing the cyclic conjugated diene copolymer is rendered water-soluble by using an appropriate chelator, and the reaction mixture is contacted with high purity ion exchanged water while flowing the reaction mixture and ion exchanged water against each other (i.e., in counter current), thereby removing the metal ion by extraction; a method in which an ionic impurity is removed by using an ion exchange resin column; and a method in which a metal ion and a low molecular weight amine are removed by using carbon dioxide in a supercritical state.

After the cyclic conjugated diene copolymer has been recovered from the reaction mixture, additives may be added to the copolymer for the purpose of enhancing the stability (such as thermal stability or ultraviolet stability) and flame retardancy of the copolymer. Examples of additives include conventional stabilizers, antioxidants and flame retardants. Examples of stabilizers, antioxidants and flame retardants include phenolic compounds, organic phosphates, organic phosphates, amines, sulfur compounds, silicon compounds and halogen compounds. The amount of the additive is generally from 0.001 to 5 parts by weight, relative to 100 parts by weight of the copolymer.

The hydrogenated, cyclic conjugated diene copolymer of the present invention is obtained by partially or completely hydrogenating at least one of the main chain and side chain of the cyclic conjugated diene copolymer in the presence of an appropriate hydrogenation catalyst. The degree of hydrogenation of the hydrogenated, cyclic conjugated diene copolymer is expressed by the hydrogenation ratio defined by the following formula (4):

Hydrogenation ratio=1−(molar amount of unsaturated bonds after hydrogenation/molar amount of unsaturated bonds before hydrogenation)  (4).

As described below in the item "Best Mode For Carrying Out the Invention", the measurement of the hydrogenation ratio is conducted by ultraviolet absorption spectrophotometry and NMR spectroscopy.

In the present invention, it is preferred that, with respect to the unsaturated bonds present in the cyclic conjugated diene monomer units, the hydrogenation ratio is 66% or more. When the hydrogenation ratio is 66% or more, it is possible to satisfactorily prevent the hydrogenated copolymer from suffering clearage even when the hydrogenated copolymer is heated at high temperatures or exposed to ultraviolet rays in the outdoors. With respect to the unsaturated bonds present in the cyclic conjugated diene monomer units, the hydrogenation ratio is more preferably 80% or more, most preferably 90% or more.

On the other hand, with respect to the unsaturated bonds present in the monomer units obtained from the vinyl aromatic monomers each having a hydrogen atom at the α-position thereof, the hydrogenation ratio depends on the desired properties of the hydrogenated copolymer. For example, when it is intended to obtain a hydrogenated copolymer having high resistance to environment, it is preferred that the hydrogenation ratio is 66% or more, more advantageously 80% or more, most advantageously 90% or more. When the hydrogenation ratio is 66% or more, it is possible to satisfactorily suppress clearage of the hydrogenated copolymer. On the other hand, when it is intended to obtain a hydrogenated copolymer used as an optical material having a high refractive index and a small Abbe's number, it is preferred that the hydrogenation ratio is 60% or less, more advantageously 30% or less, most advantageously 15% or less.

When a chain conjugated diene monomer is used as a comonomer for obtaining the monomer unit C, which is copolymerizable with at least one of the monomers used for obtaining the monomer units A and B, it is preferred that, with respect to the unsaturated bonds present in the chain conjugated diene monomer units, the hydrogenation ratio is 66% or more. When the hydrogenation ratio is 66% or more, it is possible to satisfactorily prevent the hydrogenated copolymer from suffering clearage even when the hydrogenated copolymer is heated at high temperatures or exposed to ultraviolet rays in the outdoors. With respect to the unsaturated bonds present in the chain conjugated diene monomer units, the hydrogenation ratio is more preferably 80% or more, most preferably 90% or more.

In the present invention, the hydrogenation reaction of the cyclic conjugated diene copolymer is performed in a diluted system in which the copolymer to be hydrogenated is diluted with a solvent which is capable of satisfactorily dissolving the copolymer to be hydrogenated and which is not susceptible to hydrogenation. In the present invention, it is preferred that the solvent is inert to the hydrogenation catalyst and capable of satisfactorily dissolving the copolymer to be hydrogenated.

Preferred examples of solvents used in the hydrogenation reaction include aliphatic hydrocarbons, such as n-pentane, n-hexane, n-heptane, n-octane, isooctane, n-nonane and n-decane; and alicyclic hydrocarbons, such as cyclopentane, methylcyclopentane, cyclohexane, methylcyclohexane, cycloheptane, cyclooctane, decalin and norbornane. Further examples of solvents include aromatic hydrocarbons, such as benzene, toluene, xylene, ethylbenzene and cumene; halogenated hydrocarbons, such as methylene chloride, dichloroethane, chlorobenzene, dichlorobenzene and trichlorobenzene; ethers, such as diethyl ether and tetrahydrofuran. These solvents may be used individually or in combination.

With respect to a copolymer solution to be subjected to a hydrogenation reaction, the concentration of the unhydrogenated copolymer in the solution is generally in the range of from 5 to 40% by weight. When the concentration of the unhydrogenated copolymer in the solution is 5% by weight or more, the probability for a molecule of the unhydrogenated copolymer to contact with the hydrogenation catalyst is increased, so that the hydrogenation reaction rate becomes satisfactorily high. On the other hand, when the concentration of the unhydrogenated copolymer in the solution is 40% by weight or less, the viscosity of the solution becomes low, so that heat generated during the hydrogenation reaction can be satisfactorily removed. In the present invention, the reaction temperature for hydrogenation can be appropriately selected in the range of from 20 to 180° C. When the hydrogenation reaction temperature is in the above-mentioned range, there are advantages in that a satisfactorily high hydrogenation reaction rate can be achieved and that deactivation of the hydrogenation catalyst can be satisfactorily suppressed. Further, when the hydrogenation reaction temperature is in the above-mentioned range, an advantage can also be obtained in that it is possible to completely hydrogenate both the aromatic rings and non-conjugated, unsaturated double bonds present in the polymer chains, or alternatively, it is possible to selectively hydrogenate only the non-conjugated, unsaturated double bonds present in the polymer chain. The pressure for the hydrogenation reaction depends on the type of the hydrogenation catalyst; however, the hydrogenation reaction pressure can be appropriately selected in the range of from 0.5 to 10 MPa.

With respect to the type and amount of the hydrogenation catalyst used in the present invention, there is no particular limitation so long as the catalyst can provide a desired hydrogenated polymer structure. Examples of hydrogenation catalysts include a homogeneous hydrogenation catalyst and a heterogeneous hydrogenation catalyst, each of which contains at least one metallic element selected from the group consisting of metallic elements belonging to Groups 4, 6, 7, 8, 9 and 10 of the Periodic Table, such as titanium, zirconium, hafnium, molybdenum, iron, cobalt, nickel, rhenium, ruthenium, rhodium, palladium and platinum.

The homogeneous hydrogenation catalyst is an or ganometallic compound or a metal complex, each of which contains such a metal as mentioned above and each of which is soluble in the solvent used for the hydrogenation reaction. Examples of ligands of the metal complex include atoms and inorganic and organic compounds, such as hydrogen, halogens, nitrogen compounds and carboxylic acids. More specific examples of ligands include hydrogen, fluorine, chlorine, bromine, nitrogen monoxide, carbon monoxide, hydroxyl group-containing compounds, ether compounds, amines, thiols, phosphines, carbonyl compounds, olefins and dienes. If desired, the homogeneous hydrogenation catalyst may be used in combination with an organometallic compound (as a reducing agent) containing a metallic element selected from the group consisting of metallic elements belonging to Groups 1, 2 and 13 of the Periodic Table. Examples of such organometallic compounds include an alkyllithium, an alkylmagnesium and an alkylaluminum.

Specific examples of homogeneous hydrogenation catalysts include nickel naphthenate; nickel octanoate; nickel acetyl acetate; nickel chloride; nickel carbonyl; nickelocene; cobalt naphthenate; cobalt octanoate; cobalt acetyl acetate; cobalt chloride; cobalt carbonyl; a titanium complex, such as dicyclopentadienyl titanium dichloride; a ruthenium complex, such as chlorohydridocarbonyltris(triphenylphosphine)ruthenium, dichlorotris(triphenylphosphine)ruthenium or dihydridocarbonyltris(triphenylphosphine) ruthenium.

The amount of the homogeneous hydrogenation catalyst can be appropriately chosen depending on the hydrogenation reaction conditions. However, the amount of the hydrogenation catalyst is preferably in the range of from 1 to 2,000 ppm by weight, more preferably from 10 to 500 ppm by weight, in terms of the parts per million by weight of the metal atom contained in the hydrogenation catalyst, based on the weight of the copolymer to be hydrogenated. When the amount of the hydrogenation catalyst is in the range of from 1 to 2,000 ppm by weight, there are advantages in that a satisfactorily high hydrogenation reaction rate can be achieved, that the hydrogenated copolymer obtained does not suffer discoloration, and that there is no need for making extra efforts in the separation and recovery of the homogeneous hydrogenation catalyst from the reaction mixture after completion of the reaction.

The reaction temperature for hydrogenation varies depending on the type of the homogeneous hydrogenation catalyst used; however, it is preferred that the reaction temperature is in the range of from 60 to 180° C., more advantageously from 80 to 160° C. When the reaction temperature is 60° C. or higher, a satisfactorily high hydrogenation reaction rate can be achieved. On the other hand, when the reaction temperature is 180° C. or lower, deactivation of the hydrogenation catalyst can be satisfactorily suppressed.

In the present invention, the heterogeneous hydrogenation catalyst comprises at least one member selected from the group consisting of the above-mentioned metals and oxides thereof, wherein the above-mentioned metals and oxides thereof may be supported on a carrier, such as alumina, silica, activated carbon, barium sulfate, magnesium oxide or titania; or the abovementioned metals and oxides thereof may be used, as such, in the form of particles. The heterogeneous hydrogenation catalyst is characterized in that it is insoluble in the solvent used for the hydrogenation reaction. The hydrogenation reaction can be conducted, for example, in a manner such that the heterogeneous hydrogenation catalyst in a particulate form is dispersed in the copolymer solution to thereby effect a hydrogenation of the copolymer. Alternatively, the hydrogenation reaction can also be conducted in a manner such that the copolymer solution is continuously introduced into a reaction column filled with the heterogeneous hydrogenation catalyst to thereby continuously effect a hydrogenation of the copolymer.

As the metals which are used in such a form as supported on a carrier, there can be mentioned the socalled "noble metals". Specific examples of noble metals include rhenium, ruthenium, rhodium, palladium and platinum. Of these noble metals, palladium is preferred from the viewpoint of suppressing the occurrence of side reactions, such as clearage of the copolymer to be hydrogenated. As a carrier for the metals, carbon, silica and alumina are preferred from the viewpoint of obtaining a high catalyst activity. Of these carriers, alumina is especially preferred from the viewpoint of obtaining a good balance of various properties, such as ease in recovery of the catalyst from the hydrogenation reaction mixture, the recycling property of the catalyst, and the prevention of discoloration of a shaped article produced from the hydrogenated copolymer. As an example of a heterogeneous hydrogenation catalyst comprising a metal other than noble metals and oxides thereof, there can be mentioned a Raney nickel catalyst.

Specific examples of heterogeneous hydrogenation catalysts comprising a carrier having supported thereon a noble metal includes a particulate "platinum/alumina" containing 2% by weight of platinum (carrier: particulate alumina having a specific surface area of from 80 to 100 m$^2$/g; manufactured and sold by N.E. Chemcat Corporation, Japan); a particulate "palladium/alumina" containing 5% by weight of palladium (carrier: particulate alumina having a specific surface area of from 80 to 100 m$^2$/g; manufactured and sold by N.E. Chemcat Corporation, Japan); a particulate "palladium/carbon" containing 5% by weight of palladium (carrier: particulate carbon having a specific surface area of from 900 to 1,300 m$^2$/g and containing moisture; manufactured and sold by N.E. Chemcat Corporation, Japan); a particulate "palladium/silica-alumina" containing 5% by weight of palladium (carrier: particulate silica-alumina having a specific surface area of from 400 to 600 m$^2$/g; manufactured and sold by N.E. Chemcat Corporation, Japan); a particulate "ruthenium/alumina" containing 5% by weight of ruthenium (carrier: particulate alumina having a specific surface area of from 80 to 100 m$^2$/g; manufactured and sold by N.E. Chemcat Corporation, Japan); and a particulate "rhenium/alumina" containing 5% by weight of rhenium (carrier: particulate alumina having a specific surface area of from 80 to 100 m$^2$/g; manufactured and sold by N.E. Chemcat Corporation, Japan). On the other hand, as a specific example of a heterogeneous hydrogenation catalyst comprising a metal other than noble metals and oxides thereof, there can be mentioned the so-called "Raney nickel catalyst". Examples of Raney nickel catalysts include sponge nickel catalysts R-100 and R-200 (trade name; manufactured and sold by Nikko Rica Corporation, Japan). A Raney nickel catalyst is produced by a method in which a nickel-aluminum alloy is introduced into an aqueous sodium hydroxide solution to thereby dissolve out aluminum from the nickel-aluminum alloy (this method is generally referred to as "development"), thereby obtaining a Raney nickel catalyst in the form of an aqueous dispersion thereof. Subsequently, the water as the dispersion medium is replaced by methanol to obtain a dispersion of the Raney nickel catalyst in methanol. Then, the methanol as the dispersion medium is replaced by tetrahydrofuran to obtain a dispersion of the Raney nickel catalyst in tetrahydrofuran. Finally, the tetrahydrofuran as the dispersion medium is replaced by the hydrogenation solvent to obtain a dispersion of the Raney nickel catalyst in the hydrogenation solvent. The Raney nickel catalyst in the form of the thus obtained dispersion in the hydrogenation solvent, is added to the hydrogenation reaction system.

The amount of the heterogeneous hydrogenation catalyst used in the present invention is in the range of from 0.1 to 1,000% by weight, preferably from 0.5 to 300% by weight, more preferably from 1.0 to 150% by weight, in terms of the weight percentage of the metal atom contained in the catalyst, based on the weight of the copolymer to be hydrogenated. The reaction temperature for hydrogenation is in the range of from 20 to 240° C., preferably from 90 to 180° C. If desired, the reaction temperature may be varied in the course of the hydrogenation reaction. For example, it is possible to perform the hydrogenation reaction as follows. First, the non-conjugated double bonds present in the main chain and side chain of the cyclic conjugated diene copolymer are hydrogenated at a temperature in the range of from 20 ?C to lower than 140° C. Then, if desired, the aromatic rings present in the side chains of the cyclic conjugated diene copolymer are hydrogenated at a temperature in the range of from 140 to 240° C. From the viewpoint of achieving a satisfactorily high reaction rate, it is preferred that the hydrogenation reaction is performed at a temperature of 20° C. or higher. It is also preferred that the hydrogenation reaction is performed at a temperature of 240° C. or lower, because advantages can be obtained not only in that deactivation of the hydrogenation catalyst during the reaction can be satisfactorily suppressed, but also in that, even after the recycling of the hydrogenation catalyst, a satisfactorily high catalyst activity can be obtained. The reaction time for hydrogenation varies depending on the other reaction conditions, such as the concentration of the copolymer in the copolymer solution, the amount of the catalyst and the hydrogenation reaction temperature, as well as on the desired hydrogenation ratio of the hydrogenated copolymer to be produced; however, in general, the hydrogenation reaction can be completed within a period of from 1 to 24 hours. The use of a heterogeneous hydrogenation catalyst is advantageous not only in that a shaped article produced from the hydrogenated copolymer exhibits less discoloration, as compared to the case of using a homogeneous hydrogenation catalyst, but also in that, since a heterogeneous hydrogenation catalyst introduces no poisonous substance containing halogen, sulfur, phosphorus or the like into the hydrogenation reaction system, the hydrogenation catalyst can be easily recovered and recycled. Therefore, from a commercial viewpoint, a heterogeneous hydrogenation catalyst is preferred to a homogeneous hydrogenation catalyst.

The hydrogenated, cyclic conjugated diene copolymer of the present invention can be subjected to a crosslinking reaction using a thermal crosslinking agent, ultraviolet rays or an electron beam. Specific examples of thermal crosslinking agents include organic peroxides, such as t-butyl peroxy 2-ethylhexanoate, t-butyl hydroperoxide, 2,3-dimethyl-2,3-diphenylbutane, 2,4-diphenyl-4-methyl-1-pentene, $\alpha,\alpha'$-bis(t-butyl peroxy)diisopropyl benzene, 2,5-dimethyl-2,5-di(t-butyl peroxy)hexane, and 2,5-dimethyl-2,5-di(t-butyl peroxy)hexyne-3.

Further, in the case of employing the thermal crosslinking, for example, the crosslinking of the hydrogenated, cyclic conjugated diene copolymer can also be performed by a method in which the hydrogenated copolymer is first subjected to a radical addition reaction with a compound having an unsaturated bond in the presence of such an organic peroxide as mentioned above, and the resultant reaction product is subjected to thermal crosslinking. Examples of compounds having an unsaturated bond used in the radical addition reaction include unsaturated carboxylic acid derivatives, such as maleic anhydride; unsaturated epoxy compounds, such as allyl glycidyl ether; allyl compounds, such as triallylisocyanurate and triallylcyanurate; and unsaturated organosilicon compounds, such as $\gamma$-methacryloyloxy-propyltrimethoxysilane.

In accordance with the requirements of the fields in which the cyclic conjugated diene copolymer of the present invention is used, the cyclic conjugated diene copolymer may be subjected to an appropriate modification reaction such as mentioned below, to thereby impart various desired properties to the cyclic conjugated diene copolymer. That is, a modified, cyclic conjugated diene copolymer can be obtained by performing at least one modification selected from the group consisting of: partial or complete modification of the non-conjugated double bonds present in at least one of the main chain and side chain of the cyclic conjugated diene copolymer; and modification of at least one terminal of the main chain of the cyclic conjugated diene copolymer. Further, a hydrogenated, modified, cyclic conjugated diene copolymer can be obtained by partially or completely hydrogenating at least one of the main chain and side chain of the above-obtained modified, cyclic conjugated diene copolymer in substantially the same manner as in the case of the above-mentioned hydrogenation of the cyclic conjugated diene copolymer (hereinafter, the thus obtained hydrogenated, modified, cyclic conjugated diene copolymer is referred to as "hydrogenated, modified, cyclic conjugated diene copolymer obtained by a modification/hydrogenation treatment").

In the above-mentioned "hydrogenated, modified, cyclic conjugated diene copolymer obtained by a modification/hydrogenation treatment", the amount of atoms which are addition-bonded to the cyclic conjugated diene copolymer by the modification is generally in the range of from 0.001% by weight to less than 100% by weight, preferably from 0.005 to 80% by weight, more preferably from 0.01 to 50% by weight, still more preferably from 0.05 to 40% by weight, most preferably from 0.1 to 20% by weight, based on the weight of the "hydrogenated, modified, cyclic conjugated diene copolymer obtained by a modification/hydrogenation treatment".

The hydrogenation ratio of the "hydrogenated, modified, cyclic conjugated diene copolymer obtained by a modification/hydrogenation treatment" is represented by the above-mentioned formula (4), as in the case of the hydrogenated, cyclic conjugated diene copolymer. The hydrogenation ratio of the "hydrogenated, modified, cyclic conjugated diene copolymer obtained by a modification/hydrogenation treatment" can be measured by the same method as employed in the case of the same method as employed in the case of the hydrogenated, cyclic conjugated diene copolymer.

In the "hydrogenated, modified, cyclic conjugated diene copolymer obtained by a modification/hydrogenation treatment", it is preferred that, with respect to the unsaturated bonds present in the cyclic conjugated diene monomer units, the hydrogenation ratio is 66% or more. When the hydrogenation ratio is 66% or more, it is possible to satisfactorily prevent the hydrogenated copolymer from suffering clearage even when the copolymer is heated at high temperatures or exposed to ultraviolet rays in the outdoors. With respect to the unsaturated bonds present in the cyclic conjugated diene monomer units, the hydrogenation ratio is more preferably 80% or more, most preferably 90% or more.

On the other hand, with respect to the unsaturated bonds present in the monomer units obtained from the vinyl aromatic monomers each having a hydrogen atom at the α-position thereof, the hydrogenation ratio of the "hydrogenated, modified, cyclic conjugated diene copolymer obtained by a modification/hydrogenation treatment" depends on the desired properties of the hydrogenated, modified, cyclic conjugated diene copolymer. For example, when it is intended to obtain a hydrogenated, modified, cyclic conjugated diene copolymer having high resistance to environment, it is preferred that the hydrogenation ratio is 66% or more, more advantageously 80% or more, most advantageously 90% or more. When the hydrogenation ratio is 66% or more, it is possible to satisfactorily suppress clearage of the hydrogenated, modified, cyclic conjugated diene copolymer. On the other hand, when it is intended to obtain a hydrogenated, modified, cyclic conjugated diene copolymer used as an optical material having a high refractive index and a small Abbe's number, it is preferred that the hydrogenation ratio is 60% or less, more advantageously 30% or less, most advantageously 15% or less.

When a chain conjugated diene monomer is used as a comonomer for obtaining the monomer unit C, which is copolymerizable with at least one of the monomers used for obtaining the monomer units A and B, it is preferred that, with respect to the unsaturated bonds present in the chain conjugated diene monomer units, the hydrogenation ratio is 66% or more. When the hydrogenation ratio is 66% or more, it is possible to satisfactorily prevent the hydrogenated, modified, cyclic conjugated diene copolymer from suffering clearage even when the hydrogenated, modified, cyclic conjugated diene copolymer is heated at high temperatures or exposed to ultraviolet rays in the outdoors. With respect to the unsaturated bonds present in the chain conjugated diene monomer units, the hydrogenation ratio is more preferably 80% or more, most preferably 90% or more.

By subjecting the partially hydrogenated, cyclic conjugated diene copolymer of the present invention to such an appropriate modification as mentioned below, a modified, hydrogenated, cyclic conjugated diene copolymer can be obtained. That is, a modified, hydrogenated, cyclic conjugated diene copolymer can be obtained by partially or completely modifying the non-conjugated double bonds present in at least one of the main chain and side chain of the partially hydrogenated, cyclic conjugated diene copolymer (hereinafter, the thus obtained modified, hydrogenated, cyclic conjugated diene copolymer is referred to as "modified, hydrogenated, cyclic conjugated diene copolymer obtained by a hydrogenation/modification treatment").

In the above-mentioned "modified, hydrogenated, cyclic conjugated diene copolymer obtained by a hydrogenation/modification treatment", the amount of atoms which are addition-bonded to the partially hydrogenated, cyclic conjugated diene copolymer by the modification is generally in the range of from 0.001% by weight to less than 100% by weight, preferably from 0.005 to 80% by weight, more preferably from 0.01 to 50% by weight, still more preferably from 0.05 to 40% by weight, most preferably from 0.1 to 20% by weight, based on the weight of the "modified, hydrogenated, cyclic conjugated diene copolymer obtained by a hydrogenation/modification treatment".

As mentioned above, in the present invention, for obtaining any of the modified, hydrogenated, cyclic conjugated diene copolymer and the hydrogenated, modified, cyclic conjugated diene copolymer from the cyclic conjugated diene copolymer, a hydrogenation and a modification are performed in either order. However, depending on the type of the modification, it is possible that there is a limitation with respect to the order in which the hydrogenation and the modification are performed. Specifically, for example, when it is intended to perform the below-mentioned epoxidation modification by oxidation in order to introduce an epoxy group into the copolymer, it is necessary that the epoxidation modification by oxidation be performed after the hydrogenation. (The reason for this is that, if the hydrogenation is performed after the epoxidation modification by oxidation, an epoxy ring having been formed in the copolymer by the epoxidation modification is hydrogenated, so that the epoxy ring is converted to a hydroxyl group.) Also, when it is intended to perform the below-mentioned silane modification by a silyl group introduction reaction which is performed on a living terminal (i.e., a terminal having a polymerization activity) of a cyclic conjugated diene copolymer produced by living anionic polymerization, it is necessary that the silane modification be performed before the hydrogenation. (The reason for this is that, if the hydrogenation is performed prior to the silane modification by a silyl group introduction reaction which is performed on a living terminal of a cyclic conjugated diene copolymer, the living terminal is deactivated by hydrogenation, so that it becomes impossible to perform the silane modification.)

As an example of a modification of the copolymer, there can be mentioned a modification in which the non-conjugated double bonds present in at least one of the main chain and side chain of the copolymer are partially or completely modified. Specific examples of such modifications include an epoxidation modification by oxidation, a hydrosilylation, a cycloaddition (i.e., cycloaddition for forming benzocyclobutene, cyclopentadiene, cyclohexadiene or the like), a hydration, an amination, a carbonylation, a carboxylation and an amidation. (The above-mentioned "cycloaddition" means the Diels-Alder reaction, in which a compound having a double bond is addition-bonded to the 1- and 4-positions of a conjugated diene to thereby form a compound having a 6-membered ring structure.) As another example of a modification of the copolymer, there can be mentioned a modification in which a living terminal of a cyclic conjugated diene copolymer produced by living anionic polymerization is modified. Examples of such modifications include a reaction in which a living terminal of the copolymer is modified by using a terminal modifier, such as a silane coupling agent, an alkylene oxide or carbon dioxide gas.

Of the above-mentioned modifications, preferred are an epoxidation modification by oxidation, a silane modification by hydrosilylation, and a silane modification which is performed on a living terminal of a cyclic conjugated diene copolymer by using a silane coupling agent. When the cyclic conjugated diene copolymer or partially hydrogenated, cyclic conjugated diene copolymer of the present invention is subjected to an epoxidation modification or a silane modification to thereby obtain a modified copolymer, a cast film produced from the modified copolymer exhibits an improved surface wetting. By virtue of this, when an organic or inorganic coating material is applied to the surface of such cast film, followed by drying, the cast film exhibits remarkably improved adhesion to the coating material. Further, when the epoxy group or silyl group in the modified copolymer is crosslinked to obtain a crosslinked, modified copolymer, a cast film produced from the crosslinked, modified copolymer exhibits an improved surface hardness (i.e., an improved scratch resistance) and an improved resistance to an organic solvent.

With respect to the above-mentioned preferred modifications (i.e., the epoxidation modification by oxidation, the silane modification by hydrosilylation, and the silane modification which is performed on a living terminal of a cyclic conjugated diene copolymer by using a silane coupling agent), a detailed explanation is made below.

Specific examples of peroxides used in the epoxidation modification by oxidation include aqueous hydrogen peroxide, peracetic acid, perbenzoic acid and m-chloroperbenzoic acid. Of these, especially preferred are peracetic acid and m-chloroperbenzoic acid.

In the reaction of any of the above-mentioned peroxides with the unsaturated double bonds present in the main chain and side chain of the copolymer, the peroxide and the unsaturated double bonds are reacted in amounts equimolar to each other, thereby stoichiometrically converting the unsaturated double bonds into epoxy groups. Therefore, for completely modifying all of the double bonds present in the copolymer into epoxy groups, the peroxide is used in an amount equimolar to the non-conjugated double bonds, or in an amount which is slightly larger than the equimolar amount (i.e., in an amount which is 1.2 to 1.3 times the molar amount of the non-conjugated double bonds). When it is intended to leave some double bonds unreacted for the purpose of utilizing the double bonds in a subsequent thermal crosslinking of the copolymer by heating, the peroxide may be used in an amount equimolar to the double bonds to be epoxidation-modified. When the modified, cyclic conjugated diene copolymer or modified, hydrogenated, cyclic conjugated diene copolymer is subjected to thermal crosslinking to obtain a crosslinked polymer, a film produced from the crosslinked polymer exhibits improved properties with respect to the heat distortion temperature and stiffness.

With respect to the solvent used in the epoxidation modification, there is no particular limitation so long as the solvent is capable of dissolving not only the copolymer to be epoxidation-modified, but also the modified copolymer obtained by the epoxidation modification. Specific examples of solvents include organic solvents containing no halogen atom, such as cyclohexane, decalin and toluene; and halogen-containing organic solvents, such as chloroform, dichloromethane and carbon tetrachloride. Of these solvents, from the viewpoint of safety, it is preferred to use a halogen-containing organic solvent alone or in an appropriate combination with an organic solvent containing no halogen atom. If desired, water, sodium carbonate or the like may be added to the solvent. From the viewpoint of the reaction rate, it is preferred that the modification reaction is performed at a temperature of from 20 to 100° C.

The epoxidation-modified, cyclic conjugated diene copolymer and the epoxidation-modified, hydrogenated, cyclic conjugated diene copolymer can be subjected to thermal crosslinking by heating. The conditions for the thermal crosslinking by heating vary depending on whether a crosslinking initiator is used or not, and on the type of the initiator used. The heating temperature for the thermal crosslinking is generally from 100 to 350° C., preferably from 150 to 300° C. The heating time for the thermal crosslinking is generally from about 30 seconds to 5 hours, preferably from about 1 minute to 3 hours. With respect to the heating pressure, there is no particular limitation, and the thermal crosslinking can be performed under atmospheric pressure, reduced pressure or superatmospheric pressure.

The thermal crosslinking of each of the epoxidation-modified, cyclic conjugated diene copolymer and the epoxidation-modified, hydrogenated, cyclic conjugated diene copolymer, can also be performed by heating the copolymer in the presence of a crosslinking agent, e.g., a dicarboxylic acid anhydride, an amine, a polyamide amine or the below-mentioned monomer which is reactive to the copolymer to be crosslinked (this monomer is hereinafter frequently referred to as "reactive monomer"). The crosslinking agent can be appropriately selected. Further, if desired, a cure accelerating agent, such as a peroxide or an organophosphorus compound, can be used in combination with the crosslinking agent. The above-mentioned cure accelerating agents can be used individually or in combination, depending on the use of the obtained crosslinked copolymer, or for the purpose of adjusting the curing rate.

The amount of the crosslinking agent (such as a dicarboxylic acid anhydride, an amine, a polyamide amine or the reactive monomer (mentioned below)), is not particularly limited, and can be appropriately chosen in accordance with the type of the crosslinking agent and the use of the obtained crosslinked copolymer. However, the amount of the crosslinking agent is generally in the range of from $1/100$ to 1 mol, per mol of the epoxy group contained in the modified copolymer (i.e., the epoxidation-modified, cyclic conjugated diene copolymer or the epoxidation-modified, hydrogenated cyclic conjugated diene copolymer). The amount of the cure accelerating agent is not particularly limited, and can be appropriately chosen in accordance with the type of the cure accelerating agent and the use of the obtained crosslinked copolymer. However, the amount of the cure accelerating agent is appropriately chosen in the range of from 10 to 10,000 ppm by weight, based on the weight of the modified copolymer (i.e., the epoxidation-modified, cyclic conjugated diene copolymer or the epoxidation-modified, hydrogenated, cyclic conjugated diene copolymer).

Specific examples of dicarboxylic acids used as a crosslinking agent include phthalic anhydride, tetrahydrophthalic anhydride, hexahydrophthalic anhydride, methyltetrahydrophthalic anhydride, endomethylenetetrahydrophthalic anhydride, methylendomethylenetetrahydrophthalic anhydride, methylhexahydrophthalic anhydride, maleic anhydride, trimellitic anhydride, chlorendic anhydride and succinic anhydride. When such anhydride is used for the crosslinking, it is preferred that the anhydride is used in combination with an organophosphorus compound as a cure accelerating agent. It is preferred to use triphenylphosphine.

Specific examples of amines include diethylenetriamine, triethylenetetramine, tetraethylenepentamine, dimethylaminopropylamine, dibutylaminopropylamine, hexamethylenediamine, m-phenylenediamine, p,p'-diaminodiphenylethane, p,p'-diaminodiphenyl sulfone and m-xylylenediamine.

Specific examples of polyamide amines include various types of polyamide amines and a polyamide amine adduct.

Specific examples of the above-mentioned reactive monomers (i.e., monomers which are reactive to the copolymer to be crosslinked) include glycidyl methacrylate, glycidyl acrylate, methyl methacrylate, cyclohexyl methacrylate and methyl acrylate. These momoners can be used individually or in combination.

Examples of crosslinking agents other than mentioned above include aluminum tris(ethylacetoacetate), stannous octanoate and polymercaptan.

When the crosslinking of the copolymer is performed using a crosslinking agent other than an acid anhydride, it is preferred to use the crosslinking agent in combination with a cure accelerating agent. Examples of such cure accelerating agents include organophosphorus compounds, such as triphenylphosphine; and peroxides, such as t-butyl peroxy 2-ethylhexanoate, t-butyl hydroperoxide, and 2,3-dimethyl-2,3-diphenylbutane.

As a specific example of a method for the hydrosilylation of the copolymer (i.e., the cyclic conjugated diene copolymer or the hydrogenated, cyclic conjugated diene copolymer), there can be mentioned a method in which the copolymer is dissolved in an organic solvent, and to the resultant solution is added a silylation agent, whereupon a reaction is performed between the silylation agent and the non-conjugated double bonds present in at least one of the main chain and side chain of the copolymer, at a temperature of from 70 to 140° C. in the presence of a platinum catalyst.

Specific examples of platinum catalysts used in the hydrosilylation reaction include chloroplatinic acid, $PtCl_2(C_2H_4)_2$, $PtCl_2$(pyridine) $(C_2H_4)$, $PtCl_2(PEt_3)_2$ (wherein Et represents an ethyl group), $Pt(PPh_3)_2(C_2H_4)$ (wherein Ph represents a phenyl group), $Pt(PPh_3)_4$ (wherein Ph represents a phenyl group) and $Pt(C_2H_4)_2Si_2(O) (CH_3)_4$.

Examples of silylation gents used in the hydrosilylation reaction include trichlorosilane, methyldichlorosilane, dimethylchlorosilane, triethoxysilane and methyldiethoxysilane.

The amount of the platinum catalyst used in the hydrosilylation reaction is generally chosen in the range of from 10 to 1,000 ppm by weight, based on the weight of the copolymer to be hydrosilylated. When the amount of the platinum catalyst is 10 ppm by weight or more, the silylation reaction rate becomes satisfactorily high. On the other hand, when the amount of the platinum catalyst is less than 1,000 ppm, there is an advantage in that side reactions are not likely to occur, thereby achieving a satisfactory selectivity for the hydrosilylation.

The amount of the silylation agent used in the hydrosilylation reaction varies depending on the amount of silyl groups to be introduced into the copolymer; however, the amount of the silylation agent is generally chosen in the range of from 1 to 10 in terms of the molar ratio, relative to the non-conjugated double bonds present in the main chain and side chain of the copolymer.

With respect to the solvent used in the hydrosilylation reaction, there is no particular limitation so long as the solvent is capable of dissolving not only the copolymer to be hydrosilylated (i.e., cyclic conjugated diene copolymer or partially hydrogenated, cyclic conjugated diene copolymer of the present invention), but also the hydrosilylated copolymer (i.e., the modified, cyclic conjugated diene copolymer or modified, hydrogenated, cyclic conjugated diene copolymer). Specific examples of solvents include organic solvents, such as cyclohexane, decalin and toluene.

The silane modification reaction by a silyl group introduction reaction which is performed on a living terminal of the copolymer by using a silane coupling agent, is conducted by a method in which a silane coupling agent having a bi or more-functionality is added to the cyclic conjugated diene copolymer having a living terminal, and a reaction is effected between the silane coupling agent and the living terminal of the copolymer. The amount of the silane coupling agent varies depending on the amount of the living Li terminals and, hence, on the molecular weight of the cyclic conjugated diene copolymer; however, it is preferred that the silane coupling agent is used in a molar amount which is twice or more the molar amount of the living Li terminal of the copolymer. The molar amount of the silane coupling agent is more preferably 2.5 times or more the molar amount of the living Li terminal of the copolymer. The molar amount of the silane coupling agent is still more preferably from 4 to 10 times the molar amount of the living Li terminal of the copolymer. When the molar amount of the silane coupling agent is less than 2.5 times the molar amount of the living Li terminal, a disadvantage is likely to be caused wherein a reaction occurs between anionic terminals of the copolymer, resulting in the formation of a gel-like polymer. By contrast, especially when the molar mount of the silane coupling agent is 4 times or more the molar amount of the living Li terminal, the obtained modified copolymer is substantially free from gelation. On the other hand, when the molar amount of the silane coupling agent is more than 10 times the molar amount of the living Li terminal, a disadvantage is likely to be caused wherein the silane coupling agent reacts with water which intrudes into the reaction system in a subsequent step. Specific examples of silane coupling agents include dimethyldichlorosilane, methyltrichlorosilane, dimethyldibromosilane and methyltribromosilane.

With respect to the reaction temperature for the silyl group introduction reaction which is performed on a living terminal of the copolymer, the reaction temperature is generally in the range of from 25 to 100° C. When the reaction temperature is 25° C. or higher, a satisfactorily high reaction rate can be achieved. On the other hand, when the reaction temperature is 100° C. or lower, substantially no side reaction occurs.

The determination of the amount of the silyl groups introduced into the copolymer by the hydrosilylation reaction can be conducted by determining, by $^1$HNMR, the amount of the methyl groups bonded directly to the silicon atoms present in the silyl groups in the copolymer. Likewise, the determination of the amount of the silyl groups introduced into the copolymer by the reaction between a living terminal of the copolymer and a silane coupling agent, can be conducted by determining, by $^1$H-NMR, the amount of the methoxy groups bonded directly to the silicon atoms present in the silyl groups in the copolymer.

With respect to the crosslinking of the modified, cyclic conjugated diene copolymer obtained by a silane modification by hydrosilylation, or by a reaction performed between a living terminal of the copolymer and a silane coupling agent, the crosslinking proceeds in the presence of the moisture in the air. For promoting the crosslinking reaction, it is effective to use a catalyst, such as an organotin compound (e.g., di-n-butyltin dilaurylate) or a tertiary amine (e.g., N,N,N',N'-tetramethylethylenediamine), in an amount of about 1,000 ppm by weight, based on the weight of the cyclic conjugated diene copolymer. These catalysts can be used individually or in combination, depending on the use of the obtained crosslinked copolymer and the desired curing rate.

A hydrogenated, modified, cyclic conjugated diene copolymer having a hydrogenation ratio of 90% or more can be obtained by hydrogenating, by the abovementioned method, the unsaturated bonds present in the modified, cyclic conjugated diene copolymer which is obtained by subjecting the cyclic conjugated diene copolymer to the above-mentioned epoxidation modification, the above-mentioned silane modification by hydrosilylation, or the above-mentioned silane modification by a silyl group introduction reaction which is performed on a living terminal of the copolymer by using a silane coupling agent.

The modified, cyclic conjugated diene copolymer, the modified, hydrogenated, cyclic conjugated diene copolymer, or the hydrogenated, modified, cyclic conjugated diene copolymer can be subjected to a crosslinking reaction using ultraviolet rays or an electron beam.

Each of the hydrogenated, cyclic conjugated diene copolymer, the modified, hydrogenated, cyclic conjugated diene copolymer, and the hydrogenated, modified, cyclic conjugated diene copolymer is obtained in the form of a polymer solution as a reaction mixture. As a method for separating and recovering the copolymer from the reaction mixture, there can be mentioned a conventional method which is generally employed for recovering a polymer from a reaction mixture in the form of a solution. Examples of such conventional methods include a steam-coagulation method comprising directly contacting the reaction mixture with steam to thereby evaporate and remove the polymerization solvent; a method comprising introducing the reaction mixture into a poor solvent for the polymer, wherein the solvent can be mixed with the polymerization solvent, to thereby precipitate the polymer; a method in which the reaction mixture is rendered a thin film, followed by heating to thereby distill off the polymerization solvent; and a method in which the reaction mixture is extruded using an extruder having a vent while distilling off the polymerization solvent through the vent, followed by pelletization. An optimum method for separating and recovering the cyclic conjugated diene copolymer can be selected depending on the properties of the copolymer (i.e., the hydrogenated, cyclic conjugated diene copolymer, the modified, hydrogenated, cyclic conjugated diene copolymer, or the hydrogenated, modified, cyclic conjugated diene copolymer) and polymerization solvent.

When it is intended to extremely lower the amounts of impurities (e.g., a metal derived from the polymerization initiator, an amine, and a metal as a hydrogenation catalyst) contained in the above-mentioned copolymer (i.e., the hydrogenated, cyclic conjugated diene copolymer, the modified, hydrogenated, cyclic conjugated diene copolymer, or the hydrogenated, modified, cyclic conjugated diene copolymer) to thereby obtain a high purity copolymer, the impurities can be removed by various methods. Examples of such methods include a method in which a metal ion contained in the reaction mixture containing the copolymer is rendered water-soluble by using an appropriate chelator, and the reaction mixture is contacted with high purity ion exchanged water while flowing the reaction mixture and ion exchanged water against each other (i.e., in counter current), thereby removing the metal ion by extraction; a method in which an ionic impurity is removed by using an ion exchange resin column; and a method in which a metal ion and a low molecular weight amine are removed by using carbon dioxide in a supercritical state.

After the above-mentioned copolymer (i.e., the hydrogenated, cyclic conjugated diene copolymer, the modified, hydrogenated, cyclic conjugated diene copolymer, or the hydrogenated, modified, cyclic conjugated diene copolymer) has been recovered from the reaction mixture, additives may be added to the copolymer for the purpose of enhancing the stability (such as thermal stability or ultraviolet stability) and flame retardancy of the copolymer. Examples of additives include conventional stabilizers, antioxidants and flame retardants. Examples of stabilizers, antioxidants and flame retardants include phenolic compounds, organic phosphates, organic phosphates, amines, sulfur compounds, silicon compounds and halogen compounds. The amount of the additive is generally from 0.001 to 5 parts by weight, relative to 100 parts by weight of the copolymer.

Each of the hydrogenated, cyclic conjugated diene copolymer, modified, hydrogenated, cyclic conjugated diene copolymer, and hydrogenated, modified, cyclic conjugated diene copolymer of the present invention can be shaped by any conventional methods. Examples of conventional methods for shaping the copolymer include melt molding, such as injection molding or extrusion molding, and a cast film forming method.

By subjecting the copolymer to an appropriate melt molding, a shaped article having a predetermined morphology, such as the morphology of a film, a sheet or a lens, can be produced at a low cost. For example, by subjecting the copolymer to an extrusion molding, a film having a thickness of from 0.1 to 500 µm or a sheet having a thickness of from more than 0.5 mm to 10 mm can be produced. In the present invention, a sheet is distinguished from a film only by the thickness. Specifically, a sheet has a thickness of from more than 0.5 mm to 10 mm, while a film has a thickness of from 0.1 to 500 µm.

Each of the hydrogenated, cyclic conjugated diene copolymer, modified, hydrogenated, cyclic conjugated diene copolymer, and hydrogenated, modified, cyclic conjugated diene copolymer of the present invention can be shaped into a film by a conventional cast film forming method. Specifically, the copolymer can be shaped into a film by a method in which the copolymer is dissolved in a solvent, and the resultant solution is applied onto a substrate by an appropriate coating method, such as spin coating, dip coating, blade coating, roll coating or the like, followed by drying, thereby obtaining a film. Examples of solvents for the copolymer include $C_4$–$C_{10}$ hydrocarbons, ether compounds, halogen atom-containing organic compounds, and $C_6$–$C_{10}$ ketones. These solvents may be used individually or in combination. Preferred examples of solvents include cyclohexane, toluene, decalin, tetrahydrofuran, chloroform, cyclohexanone, 1,1-dimethoxycyclohexarie, xylene and mesitylene. Especially preferred examples of solvents include a mixed solvent of cyclohexane and 1,1-dimethoxycyclohexane.

By the above-mentioned cast film forming method in which a solution of the copolymer in a solvent is formed into a film by casting, there can be obtained a film having a thickness of from 0.1 to 500 µm and having excellent surface smoothness and low double defraction. In the case of the cast film forming method, when the thickness of the obtained film is smaller than 0.1 µm, a disadvantage is likely to be caused wherein the strength of the film becomes low, thus rendering it difficult to handle the film. On the other hand, when the thickness of the obtained film is larger than 500 µm, a disadvantage is likely to be caused wherein it takes a long period of time to dry the solvent.

A crosslinked film or sheet can be obtained from each of the above-mentioned copolymers by the following method. During the formation of the above-mentioned film or sheet, the copolymer is mixed with the abovementioned crosslinking agent (i.e., a dicarboxylic acid anhydride, an amine, a polyamide amine or the abovementioned reactive monomer), a crosslinking agent other than the above-mentioned crosslinking agent, a cure accelerating agent, a catalyst, a thermal crosslinking agent or the like, to form a sheet or a film. The formed film or sheet is treated with heat, ultraviolet rays, an electron beam or the like, thereby effecting a crosslinking reaction to obtain a crosslinked film or sheet. The crosslinked film or sheet exhibits improved properties with respect to surface hardness (such as scratch resistance) and resistance to an organic solvent.

Each of the cyclic conjugated diene copolymer; hydrogenated, cyclic conjugated diene copolymer; modified, hydrogenated, cyclic conjugated diene copolymer; hydrogenated, modified, cyclic conjugated diene copolymer; crosslinked, modified, hydrogenated, cyclic conjugated diene copolymer; and crosslinked, hydrogenated, modified, cyclic conjugated diene copolymer of the present invention (especially the hydrogenated, cyclic conjugated diene copolymer; crosslinked, modified, hydrogenated, cyclic conjugated diene copolymer; and crosslinked, hydrogenated, modified, cyclic conjugated diene copolymer of the present invention) exhibits a high transmission to a light having a wave length of from 230 to 400 nm, exhibits a good balance of heat resistance, surface hardness, impact resistance and solvent resistance, and exhibits a dielectric constant as low as 2.3. Therefore, the copolymer can be advantageously used in various fields. For example, by virtue of the excellent transparency, the copolymer can be used as materials for lenses, magneto-optical disks, optical disks, DVD's, LED's (light-emitting diodes), optical processing elements, laser diodes, optical fibers, photo diodes, semiconductor lasers, protection layers for solar cells, transparent vessels and window materials. Also, by virtue of the low dielectric constant, the copolymer can be used as materials for interlayer insulation films for semiconductors, materials for mounting substrates, electric wire coating materials, parts for power outlets, coating materials for signal transmission cables, coating materials for coaxial cables, and electronic elements or devices (such as transistors, IC's, LSI's, HEMT's, MMIC's, recording media, and parts for communications equipments). Each of the crosslinked, modified, hydrogenated, cyclic conjugated diene copolymer and crosslinked, hydrogenated, modified, cyclic conjugated diene copolymer of the present invention has excellent properties with respect to heat resistance, solvent resistance and the like, so that the copolymer can be very advantageously used as materials for mounting substrates and materials for interlayer insulation films for semiconductors, wherein, in the process for producing semiconductors, the mounting substrates and interlayer insulation films are required to have excellent heat resistance and excellent solvent resistance. The copolymer can also be used for producing a film or sheet which is required to have excellent optical properties. Such film and sheet are used in the fields of electronic materials. For example, the film and sheet can be used as a substitute for a glass substrate for a liquid crystal, a touch panel substrate, an organic electroluminescence substrate, an optical waveguide, a material for a substrate for an electronic paper, a substrate for an organic semiconductor, a polarizing plate, a phase retarding plate, a light guiding plate, a protection plate for a plasma display panel, a protection plate for an FED, a magnetic tape, a magneto-optical disk substrate, an optical disk substrate, a DVD, a wide viewing angle film, a prism sheet, a diffuser panel, a transparent conductive film or sheet, a substrate for a solar cell, and an organic electroluminescence substrate. The abovementioned film and sheet can also be used in the field of medical materials used in operations which require an optical detection. For example, the film and sheet can be used as substrates for various types of microchips which are used for a genetic diagnosis, the separation and analysis of a protein, the analysis of a chemical substance, or the production of a chemical substance in a very small amount.

As mentioned above, the hydrogenated, cyclic conjugated diene copolymer of the present invention can be used for producing the above-mentioned microchip. In general, a microchip can be produced as follows. Two substrates (which are referred to as "upper substrate" and "lower substrate", respectively) are provided, wherein at least one of the upper substrate and the lower substrate has a groove in only one surface thereof. The upper substrate and the lower substrate are attached to each other so that the above-mentioned surface having a groove is positioned in the interface between the upper and lower substrates, thereby obtaining a microchip comprising two substrates. Alternatively, a microchip can also be produced by the following method. Three substrates (which are referred to as "upper substrate", "intermediate substrate" and "lower substrate", respectively) are provided, wherein the intermediate substrate has a through-hole. The three substrates are attached to each other so that the intermediate substrate is interposed between the upper substrate and the lower substrate, thereby obtaining a microchip comprising three substrates. With respect to a detailed explanation on the abovementioned methods for producing a microchip, reference can be made to Anal. Chem., Vol. 69 (1997), pp. 3451–3457.

In the present invention, the morphologies of the abovementioned upper substrate, intermediate substrate and lower substrate are not specifically limited; however, these substrates generally have a planar form. The lower substrate generally has a thickness of from 10 to 5,000 $\mu$m. On the other hand, each of the upper substrate and intermediate substrate generally has a thickness of from 1 to 100 $\mu$m. It is preferred that each of the upper substrate and lower substrate comprises the hydrogenated, cyclic conjugated diene copolymer of the present invention. However, since each of the upper substrate and intermediate substrate is thinner than the lower substrate, the upper substrate may comprise a polymer other than the hydrogenated, cyclic conjugated diene copolymer of the present invention so long as the lowering of the detection sensitivity due to background fluorescence does not become very large. Examples of such polymers include polyethylene terephthalate (PET), polycarbonate (PC), poly(methyl methacrylate) (PMMA) and polystyrene (PS).

Generally, in the microchip produced from the copolymer of the present invention, which comprises an upper substrate and a lower substrate, at least one of the upper substrate and the lower substrate has on one surface thereof a fine groove in which a liquid sample or a liquid raw material for a chemical reaction can flow. With respect to the morphology of the cross section of the fine groove, there is no particular limitation. For example, the morphology of the cross section of the fine groove may be any of a polygon (such as a quadrangle, a trapezoid or a triangle), a semicircle, and a semiellipse. It is preferred that the morphology of the cross section of the fine groove is a quadrangle or a trapezoid. With respect to the size of the fine groove, it is preferred that the maximum width of the fine groove is in the range of from 1 to 5,000 $\mu$m, the maximum depth of the fine groove is in the range of from 0.1 to 2,000 $\mu$m, and the cross-sectional area of the fine groove is in the range of from 1 to 10,000,000 $\mu$m$^2$. It is more preferred that the maximum width of the fine groove is from 2 to 500 $\mu$m, the maximum depth of the fine groove is from 1 to 200 $\mu$m, and the cross-sectional area of the fine groove is from 2 to 100,000 $\mu$m$^2$.

In a microanalysis and a quantitative microanalysis, the precision of operation and the reproducibility of measurement are required to be high. For meeting such requirements, it is preferred that the dimensional precision of the fine groove is high. Specifically, it is preferred that, with respect to the width and depth, the fine groove has a dimensional precision within±5%, in terms of the percentage of deviation, based on the designed dimension; and, with respect to the cross-sectional area, the fine groove has a dimensional precision within ±7%, in terms of the percentage of deviation, based on the designed dimension. From the viewpoint of a high precision quantitative analysis, it is more preferred that, with respect to the width and depth, the fine groove has a dimensional precision within ±2%, in terms of the percentage of deviation, based on the designed dimension; and, with respect to the cross-sectional area, the fine groove has a dimensional precision within ±4%, in terms of the percentage of deviation, based on the designed dimension.

With respect to the method for forming a fine groove in a substrate, there is no particular limitation. Examples of methods for forming a fine groove in a substrate include injection molding, emboss processing and laser processing. Of these, it is preferred to employ an injection molding method using a mold cavity having been pressurized with carbon dioxide to have a pressure of from more than atmospheric pressure to 15 MPa, since, by this method, the dimensional precision of the fine groove transferred to a substrate for a microchip is remarkably improved.

As examples of methods for attaching an upper substrate and a lower substrate to each other, or attaching an upper substrate, an intermediate substrate and a lower substrate to each other, thereby forming a microchip, there can be mentioned ultrasonic fusing, thermal fusing, an adhesion by using an adhesive (such as a hot melt adhesive or a UV adhesive), a tacking by using a tackifier, and a pressure-bonding in which the substrates are pressure-bonded to each other directly or through a thin elastic sheet.

BEST MODE FOR CARRYING OUT THE INVENTION

Hereinbelow, the present invention will be described in more detail with reference to the following Examples and Comparative Examples, which should not be construed as limiting the scope of the present invention.

Raw materials, solvents and reagents used in the Examples and Comparative Examples are as follows.

Cyclic Conjugated Diene Monomer and Hydrocarbon Solvent:

Prior to use, each of the above-mentioned compounds was subjected to a purification treatment in which the compound was refluxed in the presence of calcium hydride in an atmosphere of high purity argon for 12 hours, followed by purification by distillation, thereby obtaining a purified compound. The thus obtained purified compound was used in the Examples and Comparative Examples.

Vinyl Aromatic Monomer Having a Hydrogen Atom at the α-position Thereof:

A commercially available vinyl aromatic monomer having a hydrogen atom at the α-position thereof contains a polymerization inhibitor. Therefore, prior to use, a commercially available vinyl aromatic monomer having a hydrogen atom at the α-position thereof was subjected to the following purification treatment. The commercially available vinyl aromatic monomer was subjected to an extraction with a 0.5 N aqueous sodium hydroxide solution to remove the polymerization inhibitor contained in the monomer. The thus treated vinyl aromatic monomer was washed with water until waste water produced by the washing exhibited a neutral pH. The washed vinyl aromatic monomer was dehydrated by using sodium sulfate anhydride. The resultant dehydrated vinyl aromatic monomer was subjected to a distillation under reduced pressure in a stream of high purity argon, thereby obtaining a purified vinyl aromatic monomer. The thus obtained purified vinyl aromatic monomer was used in the Examples and Comparative Examples.

Ether Compounds:

With respect to the ether compound represented by the formula (3) above, prior to use, this ether compound was subjected to a distillation under reduced pressure in an atmosphere of high purity argon, thereby obtaining a purified ether compound. The thus obtained purified ether compound of formula (3) was used in the Examples and Comparative Examples. With respect to the ether compound other than the ether compound represented by the formula (3) above, prior to use, the ether compound was subjected to the following purification treatment. The ether compound was refluxed for a whole day in the presence of metallic sodium and benzophenone in an atmosphere of high purity argon. The thus treated ether compound was purified by distillation, thereby obtaining a purified ether compound. The thus obtained purified ether compound was used in the Examples and Comparative Examples.

Amine:

Prior to use, the amine was subjected to a purification treatment in which the amine was refluxed for a half day in the presence of calcium hydride, followed by distillation purification, thereby obtaining a purified amine. The thus obtained purified amine was used in the Examples and Comparative Examples.

n-Hexane Solution of n-butyllithium and Cyclohexane Solution of sec-butyllithium:

As the n-hexane solution of n-butyllithium and the cyclohexane solution of sec-butyllithium, commercially available solutions (manufactured and sold by Kanto Chemical Co., Ltd., Japan) were used in the Examples and Comparative Examples.

0.82 N cyclohexane Solution of an Equimolar Mixture of 1,3-bis(1-lithio-1,3,3-trimethyl-butyl)benzene and Triethylamine:

To dehydrated triethylamine was dropwise added a cyclohexane solution of sec-butyllithium over an hour, wherein the amount of the sec-butyllithium was equimolar to the trietylamine, thereby obtaining a mixture. Dehydrated m-diisopropylbenzene obtained by distillation under reduced pressure, was added to the above-obtained mixture at 0° C. over an hour, and the resultant mixture was aged at 25° C. for 12 hours, thereby obtaining a solution. The thus obtained solution was used in the Examples and Comparative Examples.

Sec-butanol:

Prior to use, sec-butanol was subjected to the following treatment. Sec-butanol was refluxed for a half day in the presence of calcium hydride, followed by purification by distillation. The resultant purified sec-butanol was diluted with dehydrated cyclohexane, to thereby obtain a diluted sec-butanol. The thus obtained diluted sec-butanol was used in the Examples and Comparative Examples.

The measurements conducted in the Examples and Comparative Examples are as follows.

<Measurement of Conversion and Measurement of Composition of Polymer, Each by Gas Chromatography (GC)>

Gas chromatography was conducted using a GC apparatus (trade name: GC-14; manufactured and sold by Shimadzu Corporation, Japan) under conditions wherein: a packed column filled with β, β'-oxydipropyonitrile was used; helium was used as a carrier gas (mobile phase); the column temperature was 90° C.; the temperature in the injection and detector parts was 200° C.; and ethylbenzene was used as an internal standard. By the above-mentioned GC, with respect to each monomer as a raw material, the amount of the monomer remaining unreacted in the polymerization reaction mixture was measured. From the found value of the amount of each monomer remaining unreacted in the polymerization reaction mixture, the conversion of each monomer and the composition of polymer were calculated, wherein the calculation was made, based on the assumption that, with respect to each monomer, all amount of the reacted monomer was converted to the monomer units of the polymer.

<Measurements of the Molecular Weights BY Gel Permeation Chromatography (GPC)>

The number average molecular weight (Mn) and the weight average molecular weight (Mw) were measured by gel permeation chromatography (GPC) using a high temperature GPC apparatus (trade name: PL-210; manufactured and sold by Polymer Laboratories Ltd., U.K.) under conditions wherein o-dichlorobenzene was used as a carrier (mobile phase) and the column temperature was 130° C.

<Measurement of the Hydrogenation Ratio>

The hydrogenation ratio was measured by a method using, in combination, ultraviolet spectrophotometry and nuclear magnetic resonance (NMR) spectrometry. The ultraviolet spectrophotometry was conducted using an ultraviolet-visible spectrophotometer (trade name: UV-2550; manufactured and sold by Shimadzu Corporation, Japan). The NMR spectrophotometry was conducted using an NMR spectrometer (trade name: JEOL-EX270; manufactured and sold by JEOL LTD., Japan) under conditions wherein: o-dichlorobenzene-d4 as a solvent was used in an amount of 0.5 cm$^3$, relative to 12.5 mg of a sample of the polymer; and the temperature was 135° C. The composition of the polymer before the hydrogenation was determined by gas chromatography (GC) in substantially the same manner as mentioned above. Specifically, with respect to monomers as raw materials, the ratios of the monomers remaining unreacted in the polymerization reaction mixture were measured by GC. From the found values of the ratios of the monomers remaining unreacted in the polymerization reaction mixture and the amounts of the monomers charged into the reactor, the composition of the polymer (namely, the ratios of the monomer units in the polymer) before the hydrogenation was calculated.

In the Examples and Comparative Examples, styrene was used as the above-mentioned vinyl aromatic monomer having a hydrogen atom at the α-position thereof. Therefore, with respect to the styrene monomer units as the vinyl aromatic monomer units, the hydrogenation ratio (%) was obtained from the amount of benzene rings remaining in the hydrogenated polymer, wherein the amount was measured by the ultraviolet spectrophotometry.

In the Examples and Comparative Examples, 1,3-cyclohexadiene was used as the cyclic conjugated diene monomer. Therefore, with respect to the 1,3-cyclohexadiene monomer units as the cyclic conjugated diene monomer units, the hydrogenation ratio was calculated from the composition of the polymer (i.e., the ratios of the monomer units in the polymer) and the hydrogenation ratios of the monomer units other than the 1,3-cyclohexadiene monomer unit. This calculation was made, based on the assumption that the hydrogenation ratio of the 1,3-cyclohexadiene monomer units bonded to the polymer main chain through a 1,2-bond is the same as the hydrogenation ratio of the 1,3-cyclohexadiene monomer units bonded to the polymer main chain through a 1,4-bond.

<Measurement of the Glass Transition Temperature>

The glass transition temperature of the polymer was measured by differential scanning calorimetry (DSC) using a DSC apparatus (trade name: DSC 200; manufactured and sold by Seiko Instruments Inc., Japan). Specifically, using a sample of 10 to 15 mg of the polymer, the differential scanning calorimetry was conducted under a stream of nitrogen gas (60 ml/min) at a temperature elevation rate of 10° C./min.

<Measurement of the Epoxidation Ratio>

The epoxidation ratio of the polymer was measured by NMR spectrometry using an NMR spectrometer (trade name: JEOL-EX270; manufactured and sold by JEOL LTD., Japan) under conditions wherein deuterated chloroform as a solvent was used in an amount of 0.5 cm$^3$, relative to 12.5 mg of a sample of the polymer. The epoxidation ratio (%) is defined by the following formula: the epoxidation ratio (%) {(the number of protons ascribed to the epoxy groups)/(the total number of the protons ascribed to the non-conjugated double bonds and the protons ascribed to the epoxy groups) }×100.

<Method for Obtaining NMR Charts>

The $^1$H-NMR and $^{13}$C-NMR charts of the polymer were obtained by NMR spectrometry using an NMR spectrometer (trade name: JNM-A500; manufactured and sold by JEOL LTD., Japan) under conditions wherein o-dichlorobenzene-d4 as a solvent was used in an amount of 0.6 cm$^3$, relative to 0.15 g of a sample of the polymer.

<Measurement of the Electroosmosis Flow>

The electroosmosis flow was measured by the method of Huang et al. (see Anal. Chem., 60, 1837–1838 (1988)), using a high voltage generator (trade name: SMT Model NV 30-1; manufactured and sold by Seefeld, Germany) under conditions wherein, as phosphate buffer solutions having different electric conductivities, there were used an 18 mM solution of a phosphate and a 20 mM solution of a phosphate.

EXAMPLE 1

A 5 dm$^3$ high pressure reactor was fully purged with dried nitrogen gas to remove oxygen contained in the reactor and dry the reactor. 2,219 g of cyclohexane as a reaction solvent and 346 g of 1,1-dimethoxycyclohexane (hereinafter frequently referred to as "CHDA") were charged into the reactor, followed by stirring. Then, into the reactor were charged 600 g of 1,3-cyclohexadiene (hereinafter frequently referred to as "CHD") and 31.54 g (40.44 cm$^3$) of a 0.82 N cyclohexane solution of an equimolar mixture of 1,3-bis(1-lithio-1,3,3-trimethyl-butyl)benzene and triethylamine (hereinafter, this solution is frequently referred to as "DiLi"), and a polymerization reaction was started. The polymerization temperature at the time of the start of the polymerization reaction was 21° C. Immediately after the start of the polymerization reaction, 45 g of a cyclohexane solution of styrene wherein the solution had a styrene concentration of 33% by weight (hereinafter, this solution is frequently referred to as "33% St"), was charged into the reactor. 3 Minutes after the start of the polymerization reaction, additional feeding of a 33% St was started, wherein the 33% St was intermittently fed in the manner as shown in Table 2, by using a precision pump. During the reaction, at six points in time, namely, after 5 minutes, 10 minutes, 20 minutes, 30 minutes, 60 minutes and 120 minutes from the start of the reaction, the reaction mixtures were sampled in amounts as shown in Table 1. Immediately after confirming the color of each sample of the reaction mixture, methanol was added to the sample, to thereby terminate the polymerization reaction in the sample. The color of the sample obtained 5 minutes after the start of the reaction was an anionic color of strong red ascribed to styrene, and the color of the sample obtained 10 minutes after the start of the reaction was a yellowish orange color. From the sample obtained 20 minutes after the start of the reaction to the sample obtained 120 minutes after the start of the reaction, the yellow color of the samples gradually became stronger. The color of the reaction mixture at a point in time which is 240 minutes after the start of the reaction was a little weaker than the color of the sample obtained 120 minutes after the start of the reaction. However, the anionic color of the reaction mixture remained at a satisfactory level and therefore it was found that the livingness of the anionic living terminal was relatively high. Thereafter, 1.39 g of methanol was added to the reaction mixture to terminate the reaction, to thereby obtain a polymer solution.

Thereafter, about 30 cm$^3$ of each of the samples of reaction mixture obtained during the polymerization and 30 cm$^3$ of the reaction mixture (polymer solution) obtained after completion of the polymerization, were taken, and individually diluted with cyclohexane to a 2-fold volume to obtain mixtures. The mixtures were individually added to 500 cm$^3$ of acetone, and the resultant mixtures were individually vigorously stirred to thereby effect precipitation of the polymers. The polymers were individually isolated by filtration under reduced pressure using a PTFE membrane (trade name: T020 A, manufactured and sold by TOYO ROSHI KAISHA, LTD., Japan; pore diameter: 0.2 $\mu$m) and then individually washed again with the same volume of acetone as used above. The washed polymers were individually dried in a vacuum drier, to thereby obtain polymer powders. The polymer powders were individually analyzed by GPC to thereby obtain the number average molecular weights (Mn), weight average molecular weights (Mw) and molecular weight distributions (Mw/Mn) of the polymers, i.e., the polymers recovered from the samples obtained during the polymerization as well as the polymer recovered from the reaction mixture (polymer solution) obtained after completion of the polymerization. The number average molecular weight of the polymer recovered from the reaction mixture (polymer solution) obtained after completion of the polymerization was about 63,600.

The composition of each reaction mixture obtained at each time of sampling of a reaction mixture is shown in Table 1. The amounts of the components of the reaction mixture were calculated as follows. During the time between the start of the polymerization and the time of the first sampling (performed 5 minutes after the start of the polymerization), 91 g of a 33% St was charged into the reactor. Before the sampling, the weight of the reaction mixture in the reactor was 3,288 g. At the first sampling, 66 g of the reaction mixture was withdrawn as a sample from the reactor, so that the weight of the reaction mixture in the reactor was decreased to 3,222 g. As a result, the remaining ratio of the reaction mixture just after the first sampling was 98.0% (=3222/3288×100). Therefore, just before the second sampling (performed 10 minutes after the start of the polymerization), the weight of each component of the reaction mixture, except the 33% St, was 98.0% by weight, based on the weight of the component of the reaction mixture just before the first sampling (performed 5 minutes after the start of the polymerization). The weight of the 33% St is calculated as follows. During the 5 minutes from the start of the polymerization, 91 g of a 33% St was charged into the reactor. The product of 91 g multiplied by 98.0% (which was the remaining ratio of the reaction mixture) is obtained (91 g×98.0%). The weight of the 33% St which was charged into the reactor during the time between the 5 minute point and 10 minute point from the start of the polymerization, was 58 g (calculated by the formula: 149 g−91 g=58 g; see Table 2). Thus, just before the second sampling (performed 10 minutes after the start of the polymerization), the weight of the 33% St contained in the reaction mixture is calculated and found to be 147 g (i.e., 91 g×98.0%+58 g=147 g). In this way, a calculation was conducted for each sampling, and, based on the calculation, the amounts of the components of the reaction mixture were calculated to thereby obtain the composition of the reaction mixture. In FIG. 1, there is provided a graph showing the change with time in the cumulative amount of additional feeds of the 33% St, wherein the data of FIG. 1 has been corrected to reflect the weight decrease due to the sampling.

With respect to each reaction mixture at each time of sampling of a reaction mixture and to the reaction mixture (polymer solution) obtained after completion of the polymerization, the conversions of CHD and St were calculated from the amounts of CHD and St remaining unreacted in the reaction mixture and the amounts of CHD and St which had been charged into the reactor, wherein the amounts of CHD and St remaining unreacted in the reaction mixture were measured by gas chromatography, and the amounts of CHD and St which had been charged into the reactor were corrected to reflect the weight decrease due to the sampling. Next, the ratio of CHD in the polymer was obtained by the following formula: ratio of CHD in the polymer (% by weight)=[{(actual weight of CHD charged into the reactor)×(conversion of CHD)}/{(actual weight of CHD charged into the reactor)×(conversion of CHD)+(actual weight of St charged into the reactor)×(conversion of St)}]×100 (wherein the actual weight means a value which has been corrected to reflect the weight decrease due to the sampling).

Further, the total conversion of all monomers was obtained by the following formula: total conversion of all monomers={(actual weight of CHD charged into the reactor)×(conversion of CHD)+(actual weight of St charged into the reactor)×(conversion of St)}/[(actual weight of CHD charged into the reactor)+{(actual weight of St charged into the reactor up to completion of polymerization)/(actual weight of CHD charged into the reactor up to completion of polymerization)}×(actual weight of CHD charged into the reactor)] (wherein the actual weight means a value which has been corrected to reflect the weight decrease due to the sampling).

From the change with time in the total conversion of all monomers and the change with time in the ratio of CHD (% by weight) in the polymer, it is found that the rates at which St and CHD were incorporated into the polymer chain were almost equal to each other from the start to the end of the polymerization, indicating that the polymer obtained was not a block copolymer. That is, it can be easily understood that the copolymer obtained in this Example 1 had a structure in which CHD monomer units and St monomer units are randomly arranged, i.e., the CHD monomer units and St monomer units together form a CHD/St random sequence. Further, in view of the fact that there is a linear relationship between the total conversion of all monomers and the number average molecular weight of the polymer (see Table 1) and that, as mentioned above, the livingness of the anionic living terminal of the polymer was high (judging from the color of the reaction mixture), it is found that a high molecular weight polymer having an A/B random sequence can be easily obtained by using the polymerization initiator used in this Example 1.

Next, to 1,200 g of the reaction mixture (polymer solution) obtained after completion of the polymerization (wherein, in the polymer solution, the polymerization reaction had been terminated by adding methanol) was added 1,200 g of decalin in an atmosphere of dried nitrogen, to thereby dilute the polymer solution to obtain a mixture. The obtained mixture was mixed with 480 g of alumina particles having supported thereon 5% by weight of palladium (average particle diameter of alumina particles: 40 μm) (manufactured and sold by N.E. CHEMCAT CORPORATION, Japan), and the resultant mixture was charged into a 5 dm³ high pressure reactor. The gas in the reactor was fully purged first with high purity nitrogen gas and next with high purity hydrogen gas, and the internal pressure of the reactor was adjusted to 7.85 MPa. While maintaining the hydrogen gas pressure, the internal temperature of the reactor was gradually elevated to 180° C., and a reaction was performed at 180° C. for 4 hours. Then, the internal temperature of the reactor was decreased to 40° C., and the alumina particles having supported thereon 5% by weight of palladium were removed from the resultant reaction mixture in a nitrogen gas atmosphere by using a pressure filter (using a PTFE membrane having a pore diameter of 0.2 μm) to thereby obtain a transparent polymer solution. The obtained polymer solution was poured into acetone having a volume which was 4 times the volume of the polymer solution, to thereby precipitate the polymer. The precipitated polymer was recovered by filtration, and the recovered polymer was washed with acetone having a volume which was 4 times the volume of the above-mentioned transparent polymer solution. The polymer was then dried in a vacuum drier while evaporating a residual solvent, thereby obtaining a dried polymer powder. The hydrogenation ratio of the obtained dried polymer powder was measured and it was found that the hydrogenation ratio of the CHD monomer units was 98.2% and the hydrogenation ratio of the St monomer units was 96.8%.

Next, with respect to each of the polymer before the hydrogenation and the polymer after the hydrogenation, the solubility thereof in a solvent was evaluated by the following solubility test. As a test solvent, solvents shown in Table 9 were used. First, 0.1 g of the polymer was taken in a sample bottle having a 10 cm³ volume, and 0.4 g of a solvent was added to the bottle so as to prepare a polymer/solvent mixture having a polymer content of 20% by weight. Next, the bottle was immersed in a water bath of 50° C., and the contents of the bottle were agitated and shaken by hand in the water bath for about 30 minutes. Thereafter, the bottle was allowed to cool to room temperature, and the state of dissolution of the polymer in the solvent was evaluated. When a gelation, a white turbid state or a solid residue was observed, it was judged that the polymer could not be dissolved in the solvent. When such judgment was made, the polymer/solvent mixture having a polymer content of 20% by weight in the bottle was diluted with the same solvent as used above, so as to prepare a polymer/solvent mixture having a polymer content of 10% by weight, and the contents of the bottle were agitated and shaken at 50° C., whereupon the polymer/solvent mixture in the bottle was evaluated in accordance with the same standard as mentioned above. When it was again judged that the polymer could not be dissolved in the solvent, the polymer/solvent mixture having a polymer content of 10% by weight in the bottle was further diluted with the same solvent as used above, so as to prepare a polymer/solvent mixture having a polymer content of 5% by weight, and the contents of the bottle were agitated and shaken at 50° C., whereupon the polymer/solvent mixture in the bottle was evaluated in accordance with the same standard as mentioned above. From the obtained results of the evaluation, the solubility of the polymer in a solvent was classified as follows. A polymer which could be completely dissolved in a polymer/solvent mixture having a polymer content of 20% by weight was evaluated with the symbol ⊙. A polymer which could be completely dissolved in a polymer/solvent mixture having a polymer content of 10% by weight was evaluated with the symbol ○. A polymer which could be completely dissolved in a polymer/solvent mixture having a polymer content of 5% by weight was evaluated with the symbol Δ. A polymer which could not be completely dissolved in a polymer/solvent mixture having a polymer content of 5% by weight was evaluated with the symbol x. The results are shown in Table 1. As is apparent from Table 1, the polymer obtained in this Example 1 is very soluble in various solvents.

Next, for use in the evaluation of the surface smoothness and impact resistance which are important properties for an optical film, a sample film was produced by a solvent cast method as follows. First, 0.5 g of the polymer before the hydrogenation and 0.5 g of the polymer after the hydrogenation were individually dissolved in 2.0 g of toluene. The resultant two polymer solutions were individually cast into a frame of a 3 cm×6 cm size which was disposed on a glass plate and the resultant liquid coatings in the frames were covered. The liquid coatings in the frames were dried at room temperature (25° C.) for 3 days, to thereby obtain dry coatings. The coatings were peeled off from the glass plate and further dried at 160° C. in a vacuum drier for 8 hours to thereby obtain cast films for the evaluation, each having a thickness of 280 μm. The obtained cast films were visually observed, and the surface smoothness of the cast films was evaluated to be very excellent.

In general, in the manufacture of an optical product from a film for optical uses, the film is subjected to various working processes for the formation of a multi-layer film and/or a composite film. Therefore, if the impact resistance of such a film is unsatisfactory, the film is unlikely to be able to endure the various working processes and hence the yield of the production becomes very poor. Thus, the impact resistance of such film is important and it is especially important that cracking do not occur even when the film sustains the impact caused by the cutting of the film. As a method for evaluating the impact resistance of the film, there was employed a method in which the film was cut by means of a cutter, and then an examination was made to confirm whether or not the resultant cross section of the film exhibited a crack. Specifically, a dried film was cut by means of a cutter along a line which was parallel to the longitudinal axis of the film, and then an examination was made to confirm whether or not the resultant cross section of the film exhibited a crack.

With respect to any of the cast film produced from the unhydrogenated polymer and the cast film produced from the hydrogenated polymer, the cross section of the film exhibited no crack. Thus, it was found that these two films had good impact resistance.

EXAMPLE 2

Figure 2:
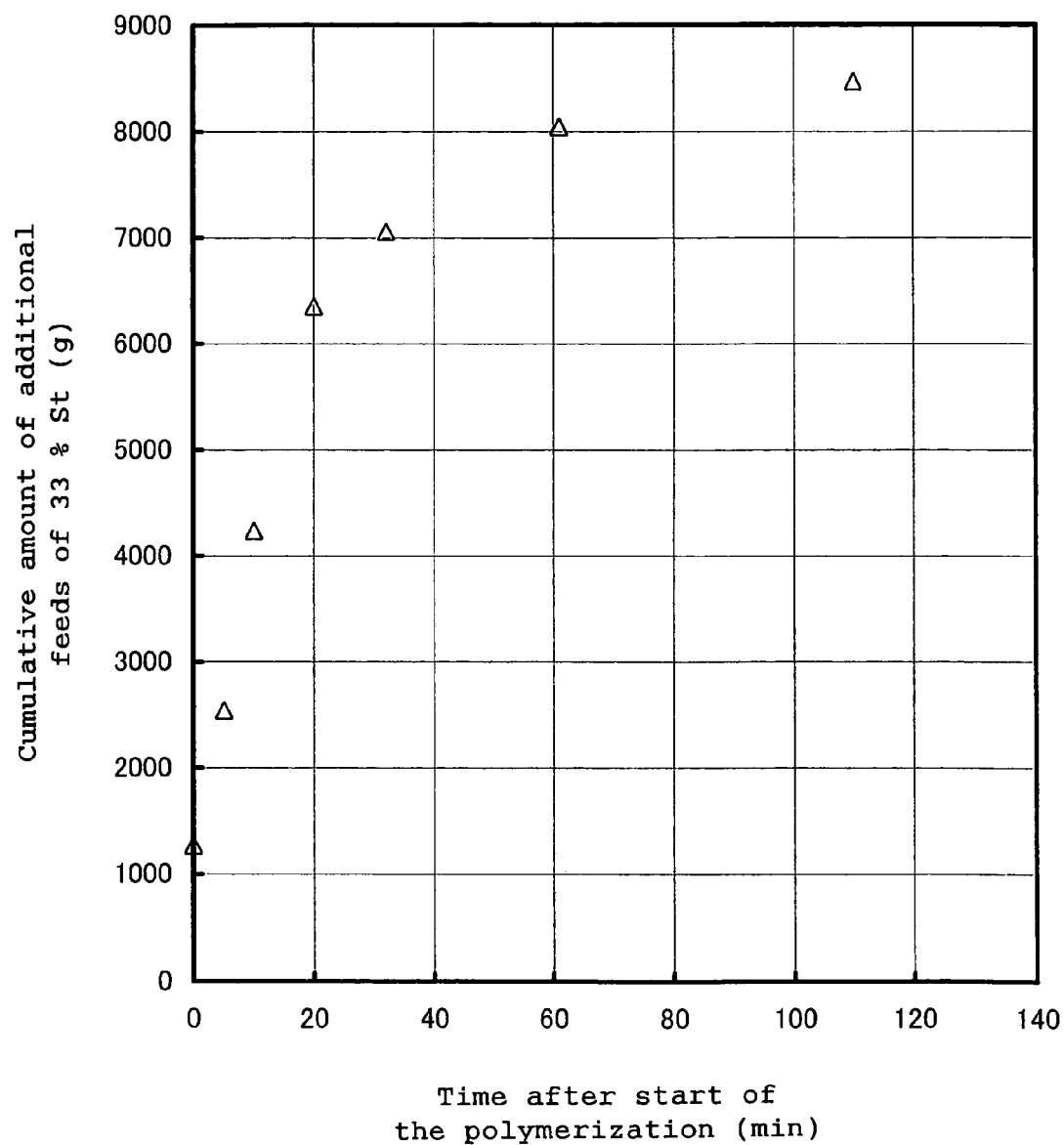
FIG. 2 is a graph showing the change with time in the cumulative amount of additional feeds of a 33% St in Example 2.

A 60 dm³ high pressure reactor was fully purged with dried nitrogen gas to remove oxygen contained in the reactor and dry the reactor. 18,278 g of cyclohexane as a reaction solvent and 4,608 g of CHDA were charged into the reactor, followed by stirring. Then, into the reactor were charged 6,720 g of CHD and 1,309 g of a 33% St. Then, into the reactor was charged 76.93 g (95.68 cm³) of a 2.34 N n-hexane solution of n-butyllithium (hereinafter, this solution is frequently referred to as "NBL"), and a polymerization reaction was started. At the time of the start of the polymerization reaction, the internal temperature of the reactor was 21° C. After the start of the polymerization reaction, additional feeding of a 33% St was started, wherein the 33% St was intermittently fed in the manner as shown in Table 4. In FIG. 2, there is provided a graph showing the change with time in the cumulative amount of additional feeds of the 33% St, wherein the data of FIG. 2 has been corrected to reflect the weight decrease due to the sampling.

During the reaction, at six points in time, namely, after 5 minutes, 10 minutes, 20 minutes, 32 minutes, 61 minutes and 120 minutes from the start of the reaction, the reaction mixtures were sampled in amounts as shown in Table 3. Immediately after confirming the color of each sample of the reaction mixture, methanol was added to the sample, to thereby terminate the polymerization reaction in the sample.

From the sample obtained 5 minutes after the start of the reaction to the sample obtained 120 minutes after the start of the reaction, the samples exhibited almost the same color of a strongly yellowish orange. This color of a strongly yellowish orange was substantially maintained even at a point in time which is 240 minutes after the start of the reaction. From these facts, it was found that the livingness of the anionic living terminal was high. After confirming the color of the reaction mixture at the 240 minute point from the start of the reaction, 11.85 g of methanol was added to the reaction mixture to terminate the polymerization reaction, to thereby obtain a polymer solution.

The composition of each reaction mixture obtained at each time of sampling of a reaction mixture is shown in Table 3. With respect to each reaction mixture at each time of sampling of a reaction mixture and to the reaction mixture (polymer solution) obtained after completion of the polymerization reaction, the conversions of CHD and St, the ratio of CHD (% by weight) in the polymer, and the total conversion of all monomers were obtained in substantially the same manner as in Example 1. From the change with time in the total conversion of all monomers and the change with time in the ratio of CHD (% by weight) in the polymer, it is found that the rates at which St and CHD were incorporated into the polymer chain were almost equal to each other from the start to the end of the polymerization, as in the case of Example 1. That is, it can be easily understood that, as in the case of the copolymer obtained in Example 1, the copolymer obtained in this Example 2 was not a block copolymer, but had a structure in which CHD monomer units and St monomer units are randomly arranged.

About 30 cm$^3$ of each of the samples of reaction mixture obtained during the polymerization and 30 cm$^3$ of the reaction mixture (polymer solution) obtained after completion of the polymerization, were taken, and individually diluted with cyclohexane to a 2-fold volume to obtain mixtures. The mixtures were individually added to 500 cm$^3$ of acetone, and the resultant mixtures were individually vigorously stirred to thereby effect precipitation of the polymers. The polymers were individually isolated by filtration under reduced pressure using a PTFE membrane (pore diameter: 0.2 μm) and then individually washed with 500 cm$^3$ of acetone. The washed polymers were individually dried in a vacuum drier, to thereby obtain polymer powders. The polymer powders were individually analyzed by GPC to thereby obtain the number average molecular weights, weight average molecular weights and molecular weight distributions of the polymers, i.e., the polymers recovered from the samples obtained during the polymerization as well as the polymer recovered from the reaction mixture (polymer solution) obtained after completion of the polymerization. The number average molecular weight of the polymer recovered from the reaction mixture (polymer solution) obtained after completion of the polymerization was about 49,900. This shows that a polymer having a satisfactorily high molecular weight can be easily obtained, even when the ratio of CHD in the polymer is different from that in the polymer obtained in Example 1.

Figure 6:
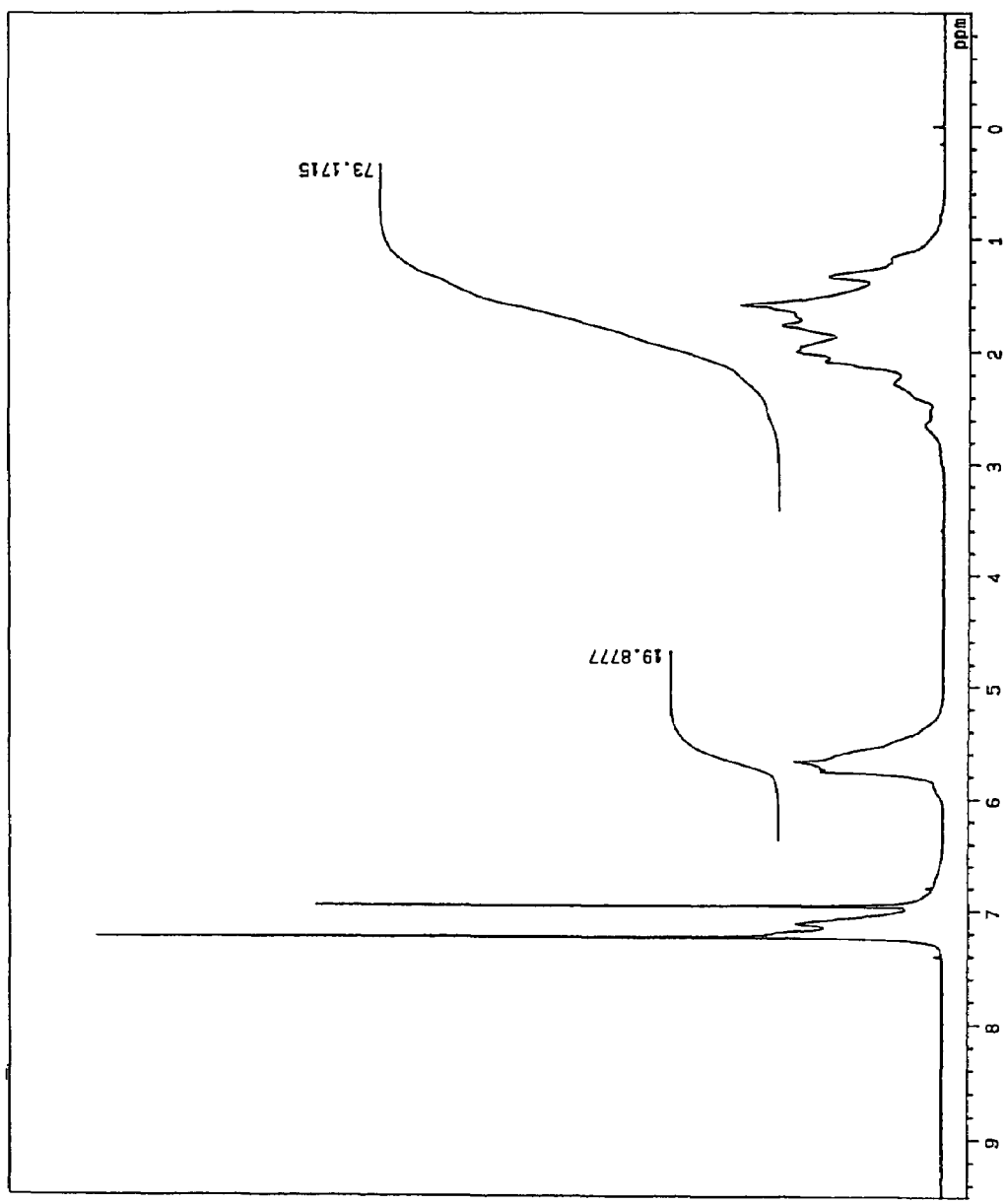
FIG. 6 is the $^1$H-NMR chart of the cyclic conjugated diene copolymer obtained in Example 2.
Figure 7:
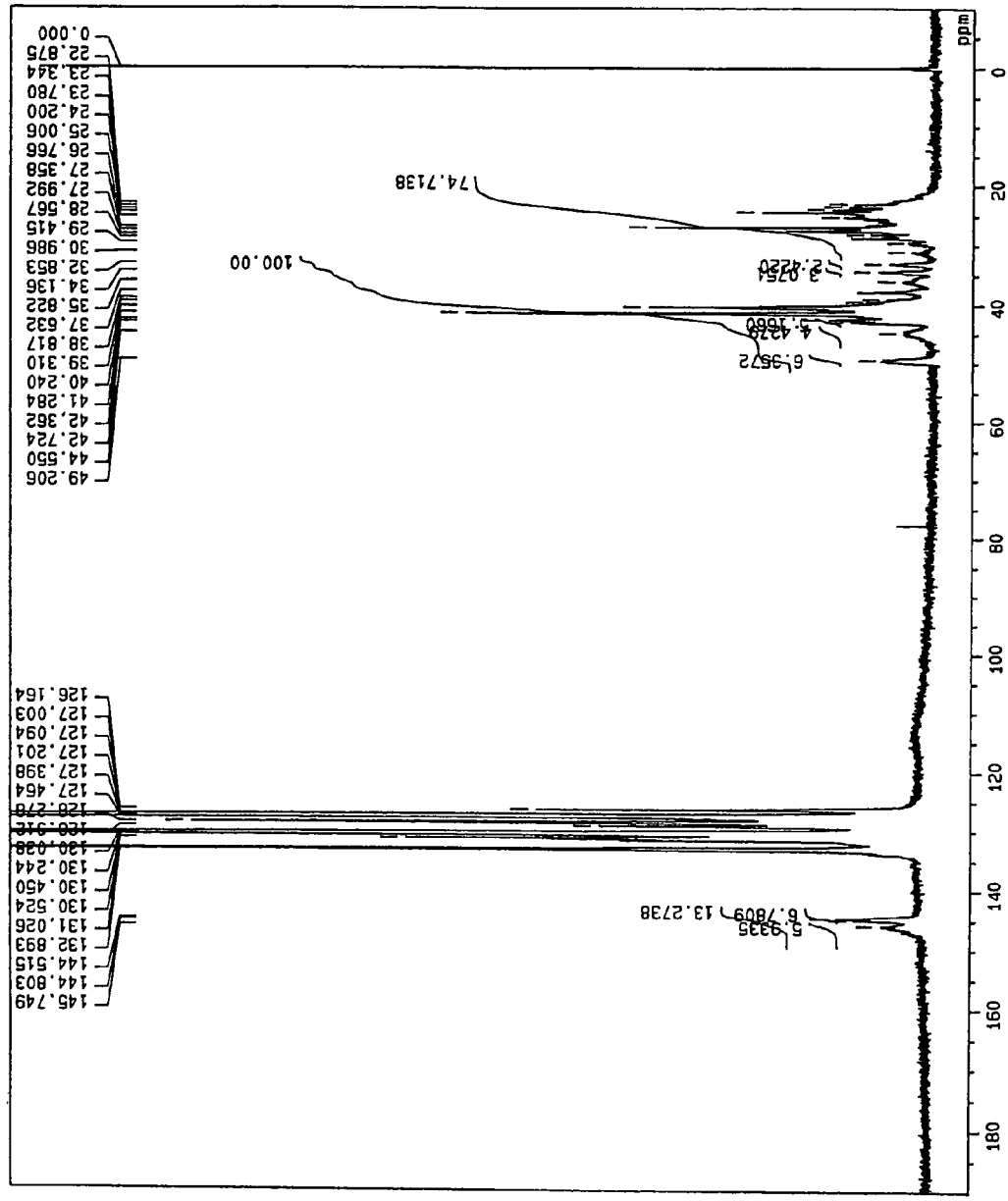
FIG. 7 is the $^{13}$C-NMR chart of the cyclic conjugated diene copolymer obtained in Example 2.

The $^1$H-NMR and $^{13}$C-NMR charts of the polymer obtained in this Example 2 are shown in FIGS. 6 and 7, respectively.

Next, in an atmosphere of dried nitrogen, 9,600 g of the reaction mixture (polymer solution) obtained after completion of the polymerization (wherein, in the polymer solution, the polymerization reaction had been terminated by adding methanol) was mixed with a dispersion obtained by dispersing a sponge nickel catalyst (trade name: R-100; manufactured and sold by NIKKO RICA CORPORATION, Japan) in 14,400 g of cyclohexane, wherein the amount of the catalyst was 1,200 g as measured in water (the weight of the catalyst was measured in water, because the catalyst is likely to catch fire in the air). The resultant mixture was charged into a 50 dm$^3$ high pressure reactor. The gas in the reactor was fully purged first with high purity nitrogen gas and next with high purity hydrogen gas, and the internal pressure of the reactor was adjusted to 7.85 MPa. While maintaining the hydrogen gas pressure, the internal temperature of the reactor was gradually elevated to 160° C., and a reaction was performed at 160° C. for 4 hours. Then, the internal temperature of the reactor was decreased to room temperature, and the sponge nickel catalyst was removed from the resultant reaction mixture in a nitrogen gas atmosphere by using a pressure filter (using a PTFE membrane having a pore diameter of 0.2 μm) to thereby obtain a transparent polymer solution. The obtained polymer solution was poured into isopropanol having a volume which was 4 times the volume of the polymer solution, to thereby precipitate the polymer. The precipitated polymer was recovered by filtration, and the recovered polymer was washed with isopropanol having the same volume as the volume of the above-mentioned transparent polymer solution. The polymer was then dried in a conical vacuum drier having a volume of 100 dm$^3$ while evaporating a residual solvent, thereby obtaining a dried polymer powder. The hydrogenation ratio of the obtained dried polymer powder was measured and it was found that the hydrogenation ratio of the CHD monomer units was 99.7% and the hydrogenation ratio of the St monomer units was 98.6%.

With respect to each of the polymer before the hydrogenation and the polymer after the hydrogenation, the solubility thereof in a solvent was evaluated in substantially the same manner as in Example 1. Further, the production of a cast film from the polymer and the evaluation of the surface smoothness and impact resistance of the cast film were performed in substantially the same manner as in Example 1. The results of all evaluations were satisfactory. The results of the evaluations are shown in Table 9.

From the results of Examples 1 and 2, it is apparent that, by virtue of the A/B random sequence, the polymer of the present invention has a high solubility in various solvents and, hence, a cast film having excellent surface smoothness can be produced from the polymer of the present invention. It is also apparent that, by virtue of the satisfactorily large number average molecular weight, the polymer of the present invention has excellent impact resistance and, hence, can be easily processed.

Comparative Example 1

There were provided six pressure resistant glass bottles, each of which had a volume of 100 cm$^3$ and contained a Teflon®-coated stirrer (hereinafter, these six glass bottles are referred to as "glass bottle No. 1", "glass bottle No. 2", "glass bottle No. 3", "glass bottle No. 4", "glass bottle No. 5" and "glass bottle No. 6", respectively). The six glass bottles were individually heated at 120° C. for a whole day to dry the bottles. The dried glass bottles were individually sealed with a Viton® rubber (manufactured and sold by DuPont Dow Elastomers L.L.C., U.S.A.) which had been immersed in cyclohexane for a week for removing a plasticizer contained in the rubber. The sealed bottles were individually capped with a crown, and a vacuum line was introduced into each bottle through the crown. Subsequently, the internal pressure of each glass bottle was lowered to 2.67 Pa by using the vacuum line, and the glass bottle was purged with high purity argon gas 5 times, so that the glass bottle was fully purged with argon gas. Thereafter, benzene, St and CHD in predetermined amounts as shown in Table 5 were charged into each of the six glass bottles using a well dried, glass syringe purged with nitrogen gas, and the contents of the glass bottle were mixed well. The glass bottles were individually immersed in a water bath at 25° C., and 0.125 cm$^3$ of a 1.0 N cyclohexane solution of sec-butyllithium (hereinafter, this solution is frequently referred to as "sec-BuLi") was charged into each of the six glass bottles while stirring the contents of the glass bottle, thereby starting a polymerization reaction. The polymerization reactions in the glass bottles were individually terminated by charging a 1 mol/dm$^3$ cyclohexane solution of sec-butanol into each of the glass bottles, wherein the operations for charging the 1 mol/dm$^3$ cyclohexane solution of sec-butanol into the glass bottle Nos. 1, 2, 3, 4, 5 and 6 were, respectively, performed at six points in time, namely, after 2.5 minutes, 5 minutes, 10 minutes, 20 minutes, 40 minutes and 80 minutes from the start of the polymerization reactions, respectively.

During the polymerization reaction, the polymerization reaction mixture in each of the glass bottles was visually observed, and it was confirmed that the color of the reaction mixture was orange color immediately after the start of the polymerization reaction. From this fact, it was judged that both an St anion and a CHD anion were present as the living terminals of the living polymers in the reaction mixture. The anionic color of the reaction mixture became yellowish with the lapse of time, and became almost lemon yellow at a point in time which is 20 minutes after the start of the reaction. However, the yellowish hue of the anionic color became very weak at two points in time, namely, 40 minutes and 80 minutes after the start of the reaction.

From each glass bottle after the termination of the polymerization reaction, about 1 g of the polymerization reaction mixture (polymer solution) was taken out as a sample for use in an analysis by gas chromatography. The remainder of the reaction mixture (polymer solution) in each glass bottle was added to 800 cm$^3$ of methanol to effect precipitation of a polymer. The polymers were individually isolated by filtration under reduced pressure using a PTFE membrane having a pore diameter of 0.2 μm. The isolated polymers were individually washed with 800 cm$^3$ of methanol. The washed polymers were individually dried in a vacuum dryer, to thereby obtain polymer powders.

Figure 3:
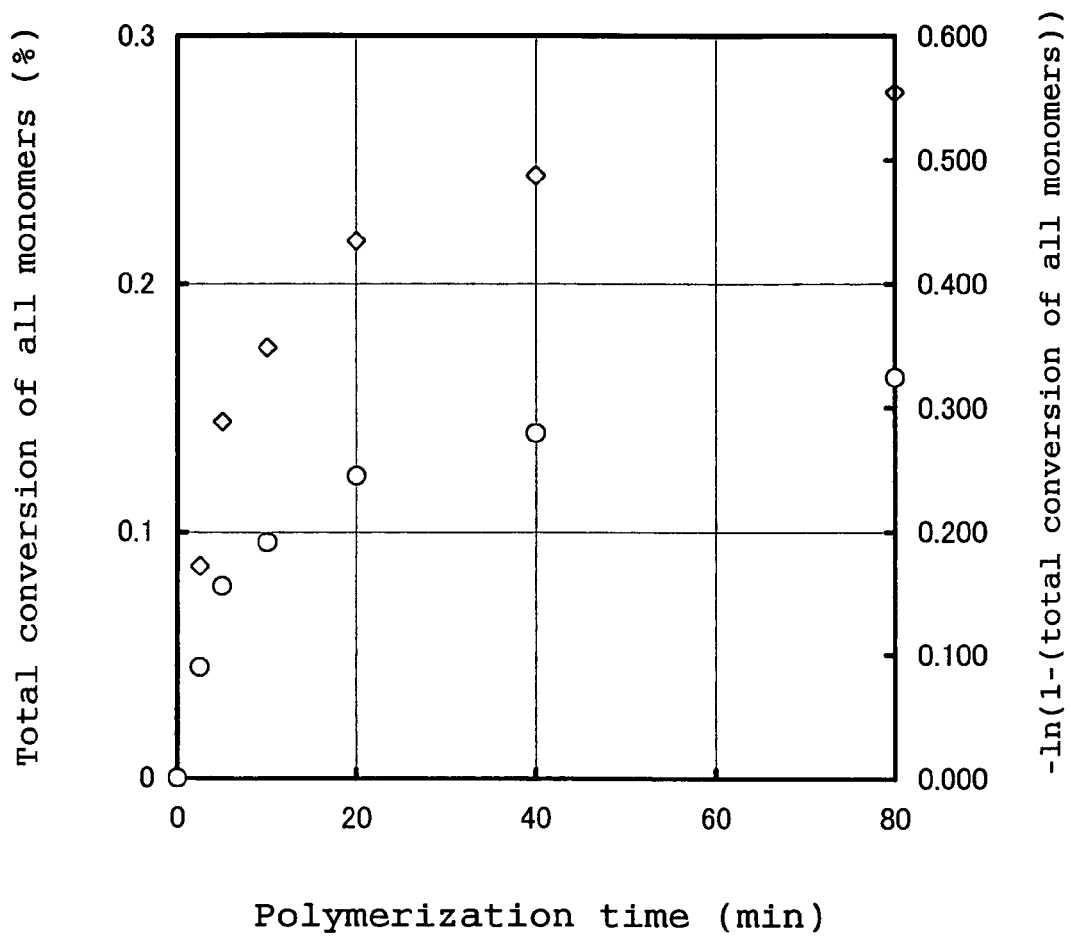
FIG. 3 is a graph showing the change with time in the total conversion of all monomers and the change with time in the −ln(1−(total conversion of all monomers)) in Comparative Example 1, wherein the total conversion of all monomers is represented by the symbol ◊, and the −ln(1−(total conversion of all monomers)) is represented by the symbol ○ (ln means natural logarithm)

With respect to each of the polymerization reaction mixtures taken as a sample, the conversions of CHD and St were measured by gas chromatography, and, based on the conversions of CHD and St, the total conversion of all monomers and the ratio of CHD in the polymer were calculated. Also, samples of the above-obtained dried polymers in powdery form were individually analyzed by GPC. As a result of the GPC, it was found that the maximum of the number average molecular weights (Mn) of the polymers was about 17,000. The results of the polymerization reactions are shown in Table 5. From the change in the ratio of CHD (% by weight) in the polymer in accordance with the change in the total conversion of all monomers, it was confirmed that a random copolymer was produced by the polymerization reaction, and this was in agreement with the above-mentioned results of the visual observation of the polymerization reaction mixtures in the glass bottles. On the other hand, the total conversion of all monomers was only 27.7% at a point in time which is 80 minutes after the start of polymerization reaction, and this showed that the polymerization rate was extremely low. Further, from the above-mentioned fact that the anionic color of the reaction mixture during the polymerization reaction became markedly weak with the lapse of time, and the fact that the change with time in the −ln(1−(total conversion of all monomers)), was not linear (see FIG. 3), it was apparent that the polymer growth reaction of the monomers occurred as a competitive reaction against the deactivation reaction of the monomers. Therefore, it is considered that a random copolymer having a number average molecular weight (Mn) as high as 20,000 or more cannot be produced by the use of sec-BuLi (which was used in this Comparative Example 1) as a polymerization initiator and, therefore, a copolymer obtained using sec-BuLi as a polymerization polymer obtained using sec-BuLi as a polymerization initiator exhibits poor impact resistance and hence is not suitable for a commercial use in the field of optical materials.

Using the sample of polymer which had the highest number average molecular weight (Mn) of the six polymer samples (i.e., using the sample of polymer obtained from the reaction mixture wherein the polymerization reaction was terminated at the 40 minute point from the start of the polymerization), a test for evaluating the solubility of the polymer in a solvent was conducted in substantially the same manner as in Example 1. As a result, it was found that the polymer exhibited excellent solubility in any solvent used in the test. Subsequently, the production of a cast film from the polymer and the evaluation of the properties of the cast film were performed in substantially the same manner as in Example 1. As a result, it was found that the cast film was so fragile that the cast film suffered cracking during the drying of the film at room temperature, and this showed that the film was not suitable for use in the field of optical materials. Further, a test for evaluating the impact resistance of the film was conducted by a method in which a broken piece of the film was cut by means of a cutter. As a result, it was found that the resultant cross section of the film exhibited a number of cracks. As apparent from these results, the obtained cast film had extremely poor impact resistance. The reason for such poor impact resistance of the cast film is presumed to be as follows. The polymer had a number average molecular weight (Mn) of only less than 20,000 and, hence, did not achieve a satisfactory polymer chain entanglement, thus causing a disadvantage that the cast film obtained from the polymer had extremely poor impact resistance. The abovementioned results of evaluations are shown in Table 9.

Comparative Example 2

There were provided six pressure resistant glass bottles, each of which had a volume of 100 cm$^3$ and contained a Teflon®-coated stirrer (hereinafter, these six glass bottles are referred to as "glass bottle No. 1", "glass bottle No. 2", "glass bottle No. 3", "glass bottle No. 4", "glass bottle No. 5" and "glass bottle No. 6", respectively). Each of the glass bottles was treated in substantially the same manner as in Comparative Example 1. Specifically, the glass bottle was dried, sealed and capped. Then, a vacuum line was introduced into the bottle. The internal pressure of the glass bottle was lowered, and the glass bottle was purged with high purity argon gas 5 times, so that the glass bottle was fully purged with argon gas. The thus treated six glass bottles were used in this Comparative Example 2. Benzene, St and CHD in predetermined amounts as shown in Table 6 were charged into each of the six glass bottles using a well dried, glass syringe purged with nitrogen gas, and the contents of the glass bottle were mixed well. The glass bottles were individually immersed in a water bath at 25° C. Then, 0.150 cm$^3$ of a 1.0 N sec-BuLi was charged into each of the six glass bottles while stirring the contents of the glass bottle, thereby starting a polymerization reaction. The polymerization reactions in the glass bottles were individually terminated by charging a 1 mol/dm$^3$ cyclohexane solution of sec-butanol into each of the glass bottles, wherein the operations for charging the 1 mol/dm$^3$ cyclohexane solution of sec-butanol into the glass bottles Nos. 1, 2, 3, 4, 5 and 6 were, respectively, performed at six points in time, namely, after 2.5 minutes, 5 minutes, 10 minutes, 20 minutes, 40 minutes and 80 minutes from the start of the polymerization reaction, respectively. From each glass bottle after the termination of the polymerization reaction, about 1 g of the polymerization reaction mixture (polymer solution) was taken out as a sample for use in an analysis by gas chromatography. The remainder of the reaction mixture (polymer solution) in each glass bottle was added to 800 cm$^3$ of methanol to effect precipitation of a polymer. The polymers were individually isolated by filtration under reduced pressure using a PTFE membrane having a pore diameter of 0.2 μm. The isolated polymers were individually washed with methanol. The washed polymers were individually dried in a vacuum dryer, to thereby obtain polymer powders.

With respect to each of the polymerization reaction mixtures taken as a sample, the conversions of CHD and St were measured by gas chromatography, and, based on the conversions of CHD and St, the total conversion of all monomers and the ratio of CHD (% by weight) in the polymer were calculated. Also, samples of the above-obtained dried polymers in powdery form were individually analyzed by GPC. As a result of the GPC, it was found that the maximum of the number average molecular weights (Mn) of the polymers was about 12,400. The results of the polymerization reactions are shown in Table 6. During the polymerization reaction, the polymerization reaction mixture in the glass bottles was visually observed, and it was confirmed that, as in the case of Comparative Example 1, the color of the reaction mixture was orange color immediately after the start of the polymerization reaction. From this fact, it was judged that both an St anion and a CHD anion were present as the living terminals of the living polymers in the reaction mixture. The anionic color of the reaction mixture became more yellowish with the lapse of time, and became almost lemon yellow at a point in time which is 20 minutes after the start of the reaction. However, the yellowish hue of the anionic color became very weak both an St anion and a CHD anion were present as the living terminals of the living polymers in the reaction mixture. The anionic color of the reaction mixture became more yellowish with the lapse of time, and became almost lemon yellow at a point in time which is 20 minutes after the start of the reaction. However, the yellowish hue of the anionic color became very weak at two points in time, namely, 40 minutes and 80 minutes after the start of the reaction.

Figure 4:
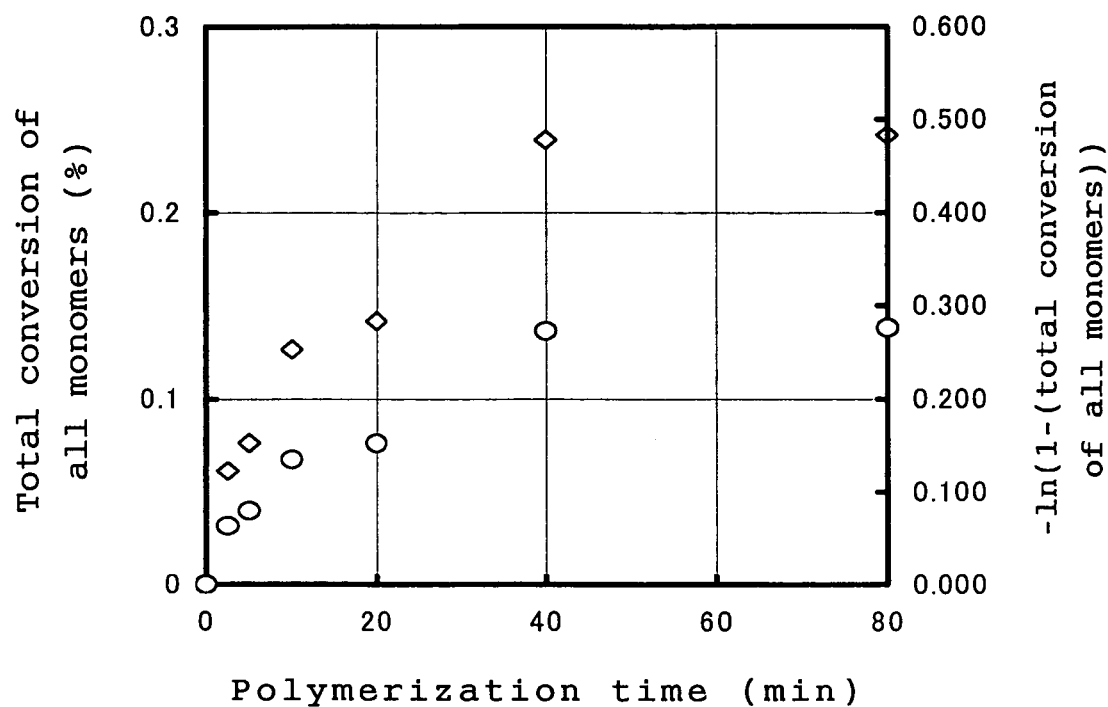
FIG. 4 is a graph showing the change with time in the total conversion of monomers and the change with time in the −ln(1−(total conversion of all monomers)) in Comparative Example 2, wherein the total conversion of all monomers is represented by the symbol ◊, and the −ln(1−(total conversion of all monomers)) is represented by the symbol ○.

The total conversion of all monomers was 24.2% at a point in time which is 80 minutes after the start of the reaction. It was confirmed that, as in the case of Comparative Example 1, the polymerization reaction performed in this Comparative Example 2 was a random copolymerization reaction. However, from the above-mentioned fact that the anionic color of the reaction mixture during the polymerization reaction became markedly weak with the lapse of time, and the fact that the change with time in the −ln(1−(total conversion of all monomers)), was not linear (see FIG. 4), it was apparent that the polymer growth reaction of the monomers occurred as a competitive reaction against the deactivation reaction of the monomers. Therefore, this Comparative Example 2 also shows that a random copolymer having a number average molecular weight (Mn) as high as 20,000 or more cannot be produced by the use of secBuLi as a polymerization initiator.

Using the sample of polymer which had the highest number average molecular weight (Mn) of the six polymer samples (i.e., using the sample of polymer obtained from the reaction mixture wherein the polymerization reaction was terminated at the 40 minute point from the start of the polymerization), a test for evaluating the solubility of the polymer in a solvent was conducted in substantially the same manner as in Example 1. As a result, it was found that the polymer exhibited excellent solubility in any solvent used in the test. Subsequently, the production of a cast film from the polymer and the evaluation of the properties of the cast film were performed in substantially the same manner as in Example 1. As a result, it was found that the cast film suffered cracking during the drying of the film at 160° C. for 8 hours, and this showed that the film was not suitable for use in the field of optical materials. From this fact, it was judged that the cast film exhibited poor impact resistance. Further, a test for evaluating the impact resistance of the film was conducted by a method in which a broken piece of the film was cut by means of a cutter. As a result, it was found that the resultant cross section of the film exhibited a number of cracks in the direction perpendicular to the cross section. This also showed that the film did not have an impact resistance sufficient for use in the field of optical materials.

From these results, it is apparent that, from the viewpoint of impact resistance, the polymers obtained in this Comparative Examples 1 and 2 are not suitable for use in producing an optical film. The above-mentioned results of evaluations are shown in Table 9.

Comparative Example 3

A 5 dm$^3$ high pressure reactor was fully purged with dried nitrogen gas to remove oxygen contained in the reactor and dry the reactor. 3,150 g of decalin as a reaction solvent and 2.54 g of N,N,N',N'-tetramethylethylenediamine were charged into the reactor. Then, 16.66 g of 0.82 N DiLi was charged into the reactor at room temperature. The internal temperature of the reactor was elevated to 40° C. 350 g of CHD was charged into the reactor, and a polymerization reaction was started. 6 Hours after the start of the polymerization reaction, 2 cm$^3$ of methanol was added to the reaction mixture to terminate the reaction, to thereby obtain a polymer solution. With respect to the reaction mixture (polymer solution) obtained after completion of the polymerization reaction, the conversion of CHD was 94.9%.

Next, in an atmosphere of dried nitrogen, 1,300 g of the reaction mixture (polymer solution) was mixed with a dispersion obtained by dispersing a sponge nickel catalyst (trade name: R-100; manufactured and sold by NIKKO RICA CORPORATION, Japan) in 1,350 g of decalin, wherein the amount of the catalyst was 390 g as measured in water. The resultant mixture was charged into a 5 $dm^3$ high pressure reactor. The gas in the reactor was fully purged first with high purity nitrogen gas and next with high purity hydrogen gas, and the internal pressure of the reactor was adjusted to 7.85 MPa. While maintaining the hydrogen gas pressure, the internal temperature of the reactor was gradually elevated to 160° C., and a reaction was performed at 160° C. for 8 hours. Then, the internal temperature of the reactor was decreased to room temperature, and the sponge nickel catalyst was removed from the resultant reaction mixture in a nitrogen gas atmosphere by using a pressure filter (using a PTFE membrane having a pore diameter of 0.2 µm) to thereby obtain a transparent polymer solution. The obtained polymer solution was poured into acetone having a volume which was 4 times the volume of the polymer solution, to thereby precipitate the polymer. The precipitated polymer was recovered by filtration, and the recovered polymer was washed with acetone having a volume which was 4 times the volume of the above-mentioned transparent polymer solution. The polymer was then dried in a vacuum drier while evaporating a residual solvent, thereby obtaining a dried polymer powder. The hydrogenation ratio of the obtained dried polymer powder was 98.0%.

With respect to each of the polymer before the hydrogenation and the polymer after the hydrogenation, the solubility thereof in a solvent was evaluated in substantially the same manner as in Example 1. It was found that each of the polymer before the hydrogenation and the polymer after the hydrogenation had poor solubility in solvents. Such poor solubility of the polymer is characteristic of a polymer having a contiguous sequence of cyclohexane rings. The results of the evaluations are shown in Table 9.

From each of the polymer before the hydrogenation and the polymer after the hydrogenation, a cast film was produced as follows. 0.5 g of the polymer before the hydrogenation and 0.5 g of the polymer after the hydrogenation were individually added to 4.5 g of toluene, and the resultant mixtures were individually heated to 100° C. to thereby obtain polymer solutions. It was found that the polymer after the hydrogenation had especially poor solubility in toluene, and the toluene solution of the polymer after the hydrogenation contained a small amount of gel. The toluene solution of the polymer before the hydrogenation and the toluene solution of the polymer after the hydrogenation were individually cast into a frame disposed on a glass plate, wherein the frame had the same size as in Example 1 and had been preheated to 80° C. The resultant liquid coatings in the frames were quickly covered to prevent direct exposure to wind. The liquid coatings were dried at room temperature for 3 days to thereby obtain two dry coatings. The obtained dry coatings were visually observed, and it was found that the dry coatings had suffered whitening, and the surfaces of the dry coatings had wave-like bumps and dents. The coatings were peeled off from the glass plate and further dried at 160° C. in a vacuum drier for 8 hours to thereby obtain cast films. The obtained cast films were visually observed, and it was found that the cast films exhibited whitening, and the surfaces of the cast films had small, wave-like bumps and dents, i.e., the surface smoothness was poor. This showed that the cast films obtained in this Comparative Example 3 were not suitable for use as optical films. A test for evaluating the impact resistance of the films was not conducted. The results of the evaluations are shown in Table 9.

Comparative Example 4

There was provided a pressure resistant glass bottle having a volume of 100 $cm^3$. The drying, sealing and capping of the glass bottle, the lowering of the internal pressure of the glass bottle, and the purging of the glass bottle with argon gas were performed in substantially the same manner as in Comparative Example 1. Into the glass bottle were charged 7.35 g of CHD and 9.54 g of a 33% St, and the contents of the glass bottle were mixed well, to thereby obtain a liquid mixture containing monomers.

There was provided a pressure resistant glass bottle having a volume of 500 $cm^3$ and containing a Teflon®-coated stirrer. The glass bottle was dried. Subsequently, the internal pressure of the glass bottle was lowered, and the glass bottle was fully purged with argon gas. Thereafter, 134 g of cyclohexane as a reaction solvent and 0.47 $cm^3$ of a 1.00 mol/$dM^3$ cyclohexane solution of N,N,N',N'-tetramethylethylenediamine were charged into the glass bottle. Subsequently, 0.25 $cm^3$ of a 1.62 N n-hexane solution of n-butyllithium was charged into the glass bottle at room temperature. The internal temperature of the glass bottle was elevated to 40° C. while stirring the contents of the glass bottle. Then, 15.1 g of the above-mentioned liquid mixture containing monomers was charged into the 500 $cm^3$ glass bottle using a well dried, glass syringe, thereby starting a polymerization reaction. The polymerization reaction mixture in the glass bottle was visually observed, and it was confirmed that, immediately after the start of the polymerization reaction, the color of the reaction mixture was an anionic color of purplish red ascribed to styrene. The anionic color of the polymerization reaction mixture rapidly changed from purplish red to lemon yellow at a point in time which is about 20 minutes from the start of the polymerization reaction. This showed that the living terminals quickly changed from terminal St anions to terminal CHD anions at a point in time which is about 20 minutes from the start of the polymerization reaction. It was also found that the turbid state of the polymerization reaction mixture gradually increased as the polymerization reaction proceeded. This showed that the polymer being formed contained a contiguous sequence of CHD monomer units which exhibited poor solubility in the reaction solvent. The polymerization reaction in the glass bottle was terminated by charging 0.1 $cm^3$ of methanol into the glass bottle at a point in time which is 6 hours from the start of the polymerization reaction, thereby obtaining a polymer solution. From the glass bottle after the termination of the polymerization reaction, a predetermined amount of the polymerization reaction mixture (polymer solution) was taken as a sample for use in an analysis by gas chromatography. A half of the remainder of the reaction mixture (polymer solution) in the glass bottle was taken out and diluted with decalin having the same volume as the volume of the taken-out reaction mixture, and the resultant liquid mixture was poured into acetone having a volume which was 4 times the volume of the liquid mixture, to thereby effect precipitation of a polymer. The polymer was isolated by filtration, and the isolated polymer was dried in a vacuum dryer, to thereby obtain a polymer powder. With respect to the reaction mixture (polymer solution), the conversions of CHD and St were 93.4% and 100%, respectively. The number average molecular weight of the polymer was 31,000.

Next, to 75 g of the reaction mixture (polymer solution) was added 75 g of decalin, to thereby dilute the polymer solution to obtain a mixture. The obtained mixture was mixed with 15 g of alumina particles having supported thereon 5% by weight of palladium (average particle diameter of alumina particles: 40 μm) (manufactured and sold by N.E. CHEMCAT CORPORATION, Japan), and the resultant mixture was charged into a 0.6 dm³ high pressure reactor. The reactor was fully purged first with high purity nitrogen gas and next with high purity hydrogen gas, and the internal pressure of the reactor was adjusted to 7.85 MPa. While maintaining the hydrogen gas pressure, the internal temperature of the reactor was gradually elevated to 180° C., and a reaction was performed at 180° C. for 4 hours. Then, the internal temperature of the reactor was decreased to room temperature, and the alumina particles having supported thereon 5% by weight of palladium were removed from the resultant reaction mixture by using a pressure filter (using a PTFE membrane having a pore diameter of 0.2 μm) to thereby obtain a polymer solution. The obtained polymer solution was poured into acetone having a volume which was 4 times the volume of the polymer solution, to thereby precipitate the polymer. The precipitated polymer was recovered by filtration, and the recovered polymer was washed with acetone having a volume which was 4 times the volume of the above-mentioned polymer solution obtained by the filtration. The polymer was then dried in a vacuum drier while evaporating a residual solvent, thereby obtaining a dried polymer powder. The hydrogenation ratio of the CHD monomer units was 98.0%, and the hydrogenation ratio of the St monomer units was 97.5%.

Next, with respect to each of the polymer before the hydrogenation and the polymer after the hydrogenation, the solubility thereof in a solvent was evaluated in substantially the same manner as in Example 1. As a result, it was found that each of the polymers had poor solubility in solvents. The reason for such poor solubility is that the polymer obtained by the polymerization reaction performed in this Comparative Example 4 comprised an St polymer block (formed at the early stage of the polymerization reaction) and a CHD polymer block (formed at the late stage of the polymerization reaction). Such molecular structure of the polymer can be seen from the above-mentioned facts that the color of the polymerization reaction mixture quickly changed from purplish red (ascribed to terminal St anions) to lemon yellow (ascribed to terminal CHD anions), and that the turbid state of the reaction mixture quickly increased after the above-mentioned change of the anionic color. From the above, it is apparent that the copolymer of the present invention having an A/B random sequence cannot be produced by the use of the polymerization initiator used in this Comparative Example 4.

Subsequently, the production of a cast film and the evaluation of the properties of the film were performed as follows. First, 0.5 g of the polymer before the hydrogenation and 0.5 g of the polymer after the hydrogenation were individually dissolved in 4.5 g of toluene, followed by heating to 100° C., thereby obtaining two polymer solutions. The obtained two polymer solutions were individually cast into a frame disposed on a glass plate, wherein the frame had the same size as in Example 1 and had been preheated to 80° C. The resultant liquid coatings in the frames were quickly covered to prevent direct exposure to wind. The liquid coatings in the frames were dried at room temperature for 3 days, to thereby obtain two dry coatings. The obtained dry coatings were visually observed, and it was found that the dry coatings had suffered whitening, and the surfaces of the dry coatings had wave-like bumps and dents. The coatings were peeled off from the glass plate and further dried at 160° C. in a vacuum drier for 8 hours to thereby obtain cast films for the evaluation. The obtained cast films were visually observed, and it was found that the cast films exhibited whitening and the surfaces of the cast films had small, wave-like bumps and dents, i.e., the surface smoothness was poor, as in the case of the film obtained in Comparative Example 3. This showed that the cast films obtained in this Comparative Example 4 were not suitable for use as optical films. A test for evaluating the impact resistance of the films was not conducted. The results of the evaluations are shown in Table 9.

Comparative Example 5

A round bottom flask having a volume of 2,000 cm³ was treated as follows. The flask was heated at 120° C. for a whole day to dry the flask. The internal pressure of the dried flask was lowered. Then, the flask was purged with high purity argon gas 5 times. The thus treated flask was used in this Comparative Example 5. Into the flask were charged 936 g of cyclohexane, 2.40 g of tetrahydrofuran, 72.0 g of styrene and 48.0 g of CHD (wherein the weight ratio of the tetrahydrofuran to the total of the monomers (i.e., the styrene and CHD) was 0.02). 3.40 cm³ of 1.06 N sec-BuLi was charged into the flask at room temperature (20° C.) while stirring the contents of the flask, and a polymerization reaction was started. Immediately after the start of the polymerization reaction, the color of the reaction mixture was purplish red ascribed to terminal styrene anions. After the start of the polymerization reaction, the flask was immersed in a water bath at 25° C. 4 Minutes after the start of the polymerization reaction, the color of the reaction mixture rapidly changed from purplish red (ascribed to terminal styrene anions) to lemon yellow (ascribed to terminal CHD anions). Thereafter, the turbid state of the reaction mixture gradually increased and, at the same time, the lemon yellow color of the reaction mixture became weaker. 40 Minutes after the start of the polymerization reaction, the color of the reaction mixture was white turbid. Then, the polymerization reaction was terminated by adding 0.2 cm³ of methanol to the reaction mixture, thereby obtain a polymer solution. Immediately after the termination of the polymerization reaction, a predetermined amount of the reaction mixture (polymer solution) was taken as a sample. Using the sample, the conversions of St and CHD in the reaction mixture (polymer solution) were measured. As a result, it was found that the conversion of St was 100% and the conversion of CHD was 69.7%. The remainder of the reaction mixture (polymer solution) in the flask was poured into isopropyl alcohol to thereby effect precipitation of the polymer. The polymer was isolated, and the isolated polymer was washed with isopropyl alcohol and then well dried in a vacuum drier, to thereby obtain a dried polymer powder. The obtained polymer powder was analyzed by GPC. As a result, it was found that the polymer in powdery form had a number average molecular weight of 39,100 and a molecular weight distribution of 1.27, and the molecular weight distribution of the polymer exhibited a single peak.

Figure 8:
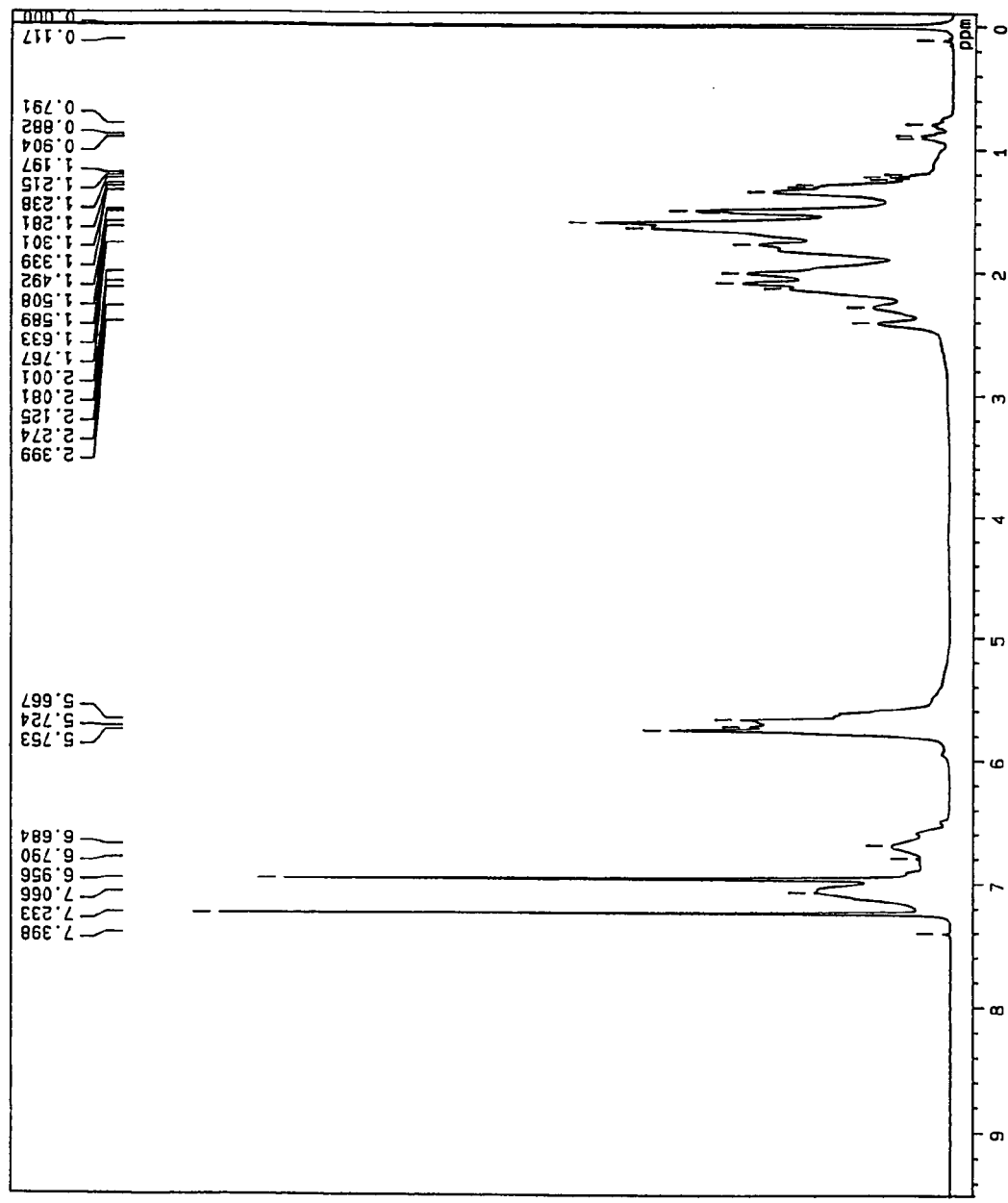
FIG. 8 is the $^1$H-NMR chart of the styrene/1,3-cyclohexadiene block copolymer obtained in Comparative Example 5 (hereinafter, 1,3-cyclohexadiene is frequently referred to as "CHD")
Figure 9:
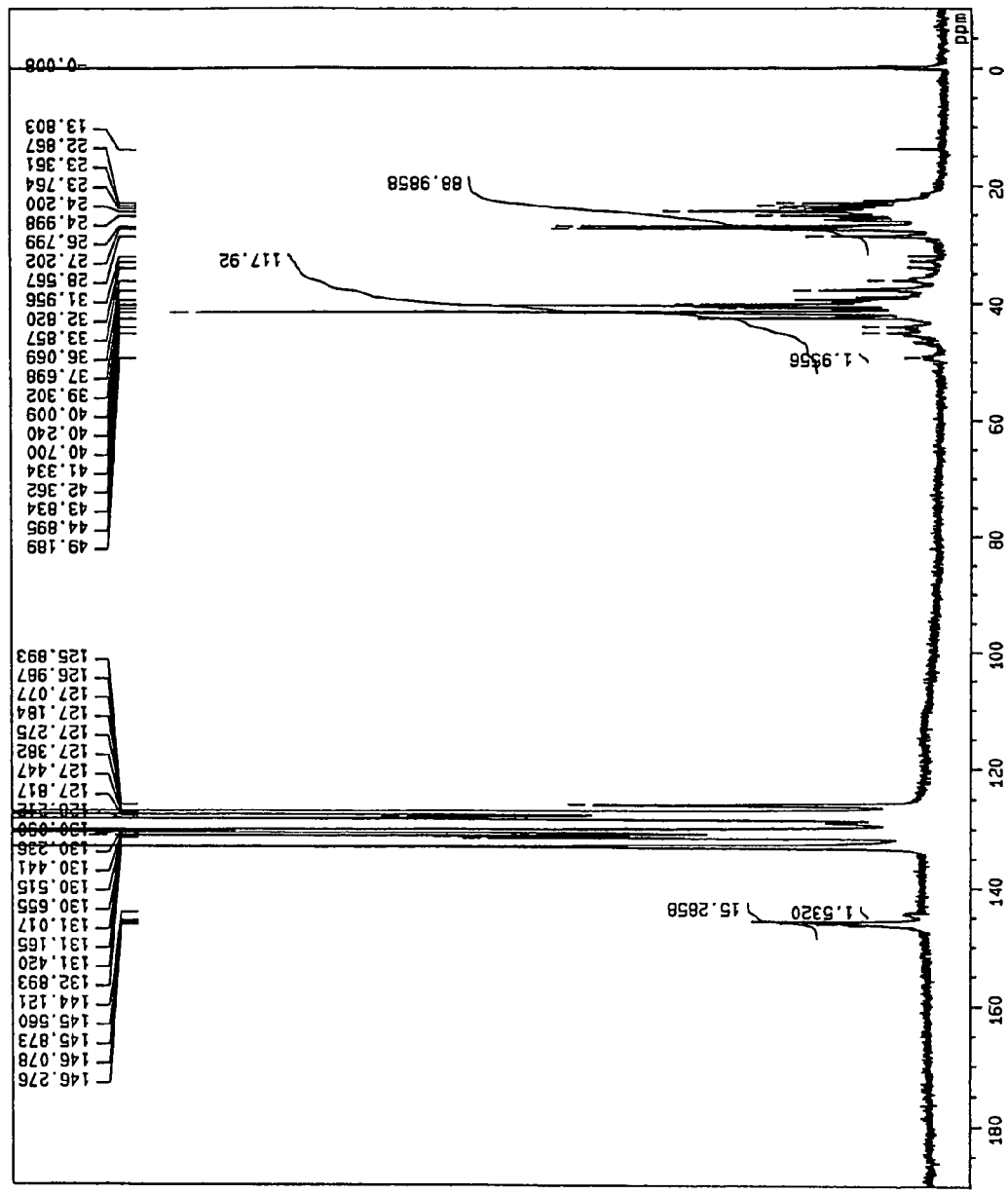
FIG. 9 is the $^{13}$C-NMR chart of the styrene/CHD block copolymer obtained in Comparative Example 5.

The $^1$H-NMR and $^{13}$C-NMR charts of the polymer are shown in FIGS. 8 and 9, respectively.

The solubility of the polymer in a solvent was evaluated in substantially the same manner as in Example 1. The results are shown in Table 9. The polymer obtained in this Comparative Example 5 had a poor solubility, as compared to those of the polymers obtained in Examples 1 and 2 and Comparative Examples 1 and 2. It is considered that the reason for the poor solubility of the polymer obtained in this Comparative Example 5 is that the polymer obtained in this Comparative Example 5 comprised a St polymer block and a CHD polymer block, as in the case of the polymer obtained in Comparative Example 4.

Next, a cast film was produced from the polymer in substantially the same manner as in Comparative Examples 3 and 4. The produced cast film exhibited slight whitening, and the surface of the cast film had small, wave-like bumps and dents, i.e., the surface smoothness was very poor. A test for evaluating the impact resistance of the films was not conducted. The results of the evaluations are shown in Table 9.

From the above, it is apparent that a high molecular weight polymer having an St/CHD random sequence cannot be produced by using an initiator comprising an organo (Group 1)metallic compound and an ether compound (such as tetrahydrofuran) having one oxygen atom in the molecule thereof.

On the other hand, in the polymerization process of the present invention, there is used a polymerization initiator comprising an organo(Group 1)metallic compound and an ether compound represented by the above-mentioned formula (3), i.e., a polymerization initiator which is different from the polymerization initiator used in the conventional method. In the polymerization process of the present invention, by virtue of the use of such a polymerization initiator, the polymerization rates of CHD and St can be controlled to be at substantially the same level, so that a desired copolymer having not only high randomness of the arrangement of CHD and St monomer units, but also a high molecular weight, can be produced.

EXAMPLE 3

A 5 dm$^3$ high pressure reactor was fully purged with dried nitrogen gas to remove oxygen contained in the reactor and dry the reactor. 2,016 g of cyclohexane as a reaction solvent and 365 g of CHDA were charged into the reactor, followed by stirring. Next, into the reactor was charged 447 g of a cyclohexane solution of 1,3-butadiene wherein the solution had a 1,3-butadiene concentration of 33% by weight (hereinafter, 1,3-butadiene is frequently referred to as "BD", and the cyclohexane solution of 1,3-butadiene is referred to as "33% BD"). The internal temperature of the reactor was adjusted to 40° C. Further, 31.00 g (39.80 cm$^3$) of a 0.82 N DiLi was charged into the reactor, and a polymerization reaction was started. The internal temperature of the reactor immediately began to increase and reached 65° C. at a point in time which is 10 minutes after the start of the polymerization reaction. Then, the internal temperature of the reactor was adjusted to 50° C., and the polymerization reaction was continued while maintaining the internal temperature of the reactor at 50° C. At a point in time which is 50 minutes after the start of the polymerization reaction, a sample was taken from the reaction mixture, and the sample was charged into a sampling bottle which had been cooled in a dry ice/ethanol mixture. The color of the reaction mixture sample in the sampling bottle was a lemon yellow color ascribed to butadiene anions. Immediately after the sampling, methanol was charged into the sampling bottle to thereby terminate the polymerization reaction in the sample. The obtained sample was analyzed by gas chromatography to measure the amount of BD monomers remaining unreacted in the sample. By the GC, no BD monomer was detected. Therefore, it was confirmed that the conversion of BD was 100%. Also, the sample was analyzed by GPC. As a result of the GPC, it was found that the BD chain (i.e., polybutadiene) in the reaction mixture had a number average molecular weight of 13,910 and a molecular weight distribution of 1.10.

Figure 5:
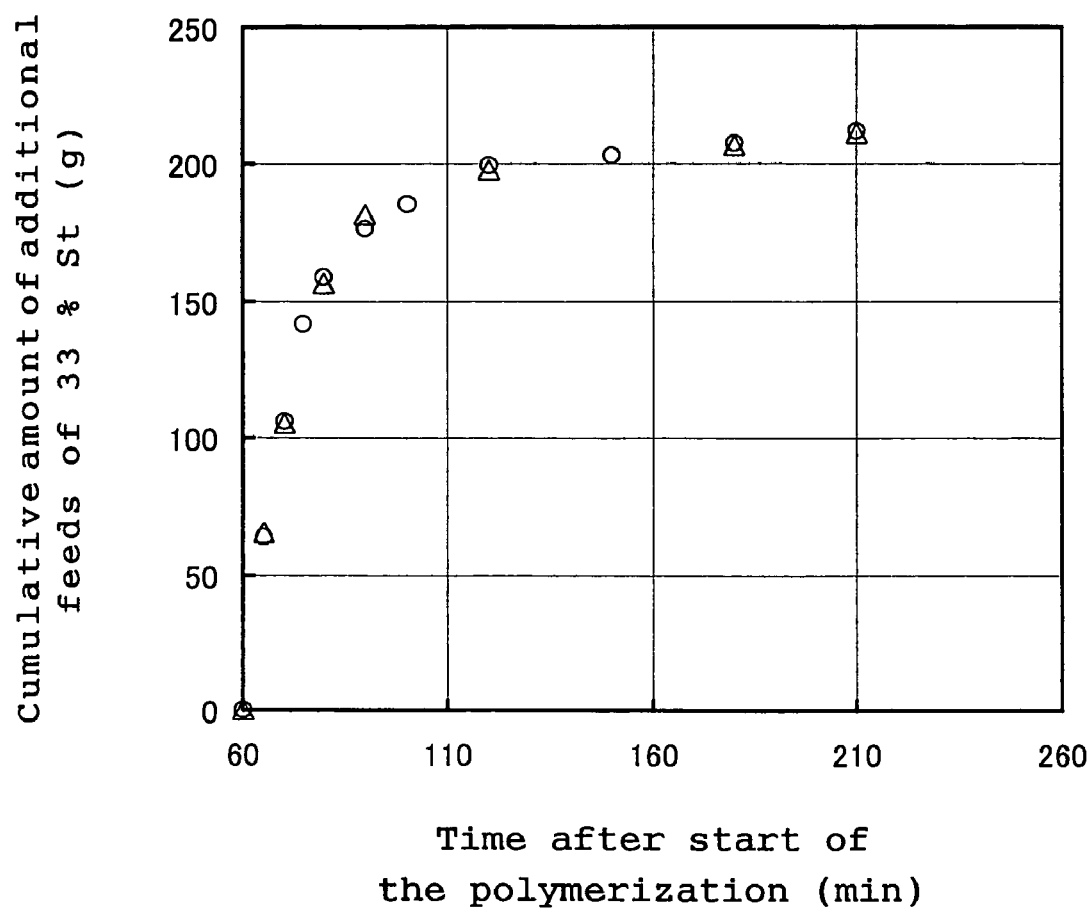
FIG. 5 is a graph showing the change with time in the cumulative amount of additional feeds of a 33% St in Example 3, wherein the symbol ○ represents the set amount, and the symbol Δ represents the measured amount)

Immediately after the above-mentioned sampling of the reaction mixture (which contained polybutadiene), the reactor was cooled so that the internal temperature of the reactor became 20.5° C. 60 Minutes after the start of the polymerization reaction of BD, 482 g of CHD and 74 g of a 33% St were charged into the reactor and a random copolymerization of CHD and St was started. 63 Minutes after the start of the polymerization of BD, additional feeding of a 33% St was started, wherein the 33% St was intermittently fed in the manner as shown in Table 8. In FIG. 5, there is provided a graph showing the change with time in the cumulative amount of additional feeds of the 33% St, wherein the data of FIG. 5 has been corrected to reflect the weight decrease due to the sampling.

During the reaction, at seven points in time, namely, after 65 minutes, 70 minutes, 80 minutes, 90 minutes, 120 minutes, 180 minutes and 300 minutes from the start of the reaction, the reaction mixtures were sampled in amounts as shown in Table 7. Immediately after confirming the color of each sample of the reaction mixture, methanol was added to the sample, to thereby terminate the polymerization reaction in the sample.

The color of the sample obtained 65 minutes after the start of the reaction was an orange color, and this showed that the living terminals were changed from terminal butadiene anions to a mixture of terminal CHD anions and terminal St anions. From the sample obtained 70 minutes after the start of the reaction to the sample obtained 300 minutes after the start of the reaction, the yellow color of the samples gradually became stronger. However, the anionic color of the reaction mixture remained at a satisfactory level and therefore it was found that the livingness of the anionic living terminal was high.

Before the termination of the polymerization reaction, 30 g of the reaction mixture containing the living polymer was withdrawn from the reactor and charged into a 200 cm$^3$ pressure resistant glass bottle which had been fully purged with argon gas. (More specifically, this glass bottle had been treated as follows. A Teflon®-coated stirrer was placed in the 200 cm$^3$ pressure resistant glass bottle. The glass bottle was heated at 120° C. for a whole day to dry the glass bottle. The dried glass bottle was sealed with a Viton® rubber which had been treated to remove a plasticizer contained in the rubber. The sealed glass bottle was capped with a crown, and a vacuum line was introduced into the bottle through the crown. The internal pressure of the glass bottle was lowered to 2.67 Pa by using the vacuum line, and the glass bottle was purged with high purity argon gas 5 times, thereby fully purging the glass bottle with argon gas.)

Thereafter, 1.42 g of methanol was added to the reaction mixture in the 5 dm$^3$ high pressure reactor to terminate the reaction, thereby obtaining a polymer solution. About 30 cm$^3$ of each of the samples of reaction mixture obtained during the polymerization and 30 cm$^3$ of the reaction mixture (polymer solution) obtained after completion of the polymerization, were taken, and individually diluted with cyclohexane to a 2-fold volume to obtain mixtures. The mixtures were individually added to 500 cm$^3$ of acetone, and the resultant mixtures were individually vigorously stirred to thereby effect precipitation of the polymers. The polymers were individually isolated by filtration under reduced pressure using a PTFE membrane (pore diameter: 0.2 μm) and then individually washed again with 500 cm³ of acetone. The washed polymers were individually dried in a vacuum drier, to thereby obtain polymer powders. The polymer powders were individually analyzed by GPC to thereby obtain the number average molecular weights, weight average molecular weights and molecular weight distributions of the polymers, i.e., the polymers recovered from the samples obtained during the polymerization as well as the polymer recovered from the reaction mixture (polymer solution) obtained after completion of the polymerization. The polymer recovered from the reaction mixture (polymer solution) obtained after completion of the polymerization had a number average molecular weight of 62,660 and a molecular weight distribution of 1.43.

The composition of each reaction mixture obtained at each time of sampling of a reaction mixture is shown in Table 7. With respect to each reaction mixture at each time of sampling of a reaction mixture and to the reaction mixture (polymer solution) obtained after completion of the polymerization reaction, the conversions of CHD and St, the ratio of CHD (% by weight) in the polymer chain having a CHD/St random sequence, and the total conversion of all monomers were obtained in substantially the same manner as in Examples 1 and 2. From the change with time in the total conversion of all monomers and the change with time in the ratio of CHD (% by weight) in the polymer chain having a CHD/St random sequence, it is found that the rates at which St and CHD were incorporated into the polymer chain were almost equal to each other from the start to the end of the copolymerization of CHD with St, as in the cases of Examples 1 and 2. That is, it can be understood that the copolymer obtained in this Example 3 contained a copolymer block in which CHD monomer units and St monomer units are randomly arranged. Further, since DiLi used in this Example 3 as a part of the polymerization initiator is bifunctional, it can be understood that the copolymer obtained in this Example 3 is a triblock copolymer comprising a butadiene polymer block (i.e., butadiene polymer chain) which has, bonded to both terminals thereof, two CHD/St random copolymer blocks (i.e., two CHD/St random sequences).

Next, to 1,200 g of the reaction mixture (polymer solution) obtained after completion of the polymerization (wherein, in the polymer solution, the polymerization reaction had been terminated by adding methanol) was added 1,200 g of cyclohexane in an atmosphere of dried nitrogen, to thereby dilute the polymer solution to obtain a mixture. The obtained mixture was mixed with 480 g of alumina particles having supported thereon 5% by weight of palladium (average particle diameter of alumina particles: 40 μm) (manufactured and sold by N.E. CHEMCAT CORPORATION, Japan), and the resultant mixture was charged into a 5 dm³ high pressure reactor. The gas in the reactor was fully purged first with high purity nitrogen gas and next with high purity hydrogen gas, and the internal pressure of the reactor was adjusted to 7.85 MPa. While maintaining the hydrogen gas pressure, the internal temperature of the reactor was gradually elevated to 180° C., and a reaction was performed at 180° C. for 4 hours. Then, the internal temperature of the reactor was decreased to 40° C., and the alumina particles having supported thereon 5% by weight of palladium were removed from the resultant reaction mixture in a nitrogen gas atmosphere by using a pressure filter (using a PTFE membrane having a pore diameter of 0.2 μm) to thereby obtain a polymer solution. The obtained polymer solution was poured into acetone having a volume which was 4 times the volume of the polymer solution, to thereby precipitate the polymer. The precipitated polymer was recovered by filtration, and the recovered polymer was washed with acetone having a volume which was 4 times the volume of the above-mentioned polymer solution obtained by the filtration. The polymer was then dried in a vacuum drier while evaporating a residual solvent, thereby obtaining a dried polymer powder. The hydrogenation ratio of the obtained dried polymer powder was measured and it was found that the hydrogenation ratio of the BD monomer units was 100%, the hydrogenation ratio of the CHD monomer units was 99.5% and the hydrogenation ratio of the St monomer units was 99.8%.

The evaluation of the solubility of the polymer in a solvent was performed in substantially the same manner as in Examples 1 and 2. Further, the evaluation of the surface smoothness and impact resistance of the cast film was performed in substantially the same manner as in Examples 1 and 2. The results of all evaluations were satisfactory. The results of the evaluations are shown in Table 9.

EXAMPLE 4

A polymerization of CHD and St was performed in substantially the same manner as in Example 2. Next, in an atmosphere of dried nitrogen, 9,600 g of the reaction mixture (polymer solution) obtained after completion of the polymerization was mixed with a dispersion obtained by dispersing a sponge nickel catalyst (trade name: R-100; manufactured and sold by NIKKO RICA CORPORATION, Japan) in 14,400 g of cyclohexane, wherein the amount of the catalyst was 1,200 g as measured in water. The resultant mixture was charged into a 50 dm³ high pressure reactor. The gas in the reactor was fully purged first with high purity nitrogen gas and next with high purity hydrogen gas, and the internal pressure of the reactor was adjusted to 7.85 MPa. While maintaining the hydrogen gas pressure, the internal temperature of the reactor was gradually elevated to 110° C., and a reaction was performed at 110° C. for 4 hours. Then, the internal temperature of the reactor was decreased to room temperature, and the sponge nickel catalyst was removed from the resultant reaction mixture in a nitrogen gas atmosphere by using a pressure filter (using a PTFE membrane having a pore diameter of 0.2 μm) to thereby obtain a transparent polymer solution. The obtained polymer solution was poured into isopropanol having a volume which was 4 times the volume of the polymer solution, to thereby precipitate the polymer. The precipitated polymer was recovered by filtration, and the recovered polymer was washed with isopropanol having the same volume as the volume of the above-mentioned transparent polymer solution. The polymer was then dried in a conical vacuum drier having a volume of 100 dm³ while evaporating a residual solvent, thereby obtaining a dried polymer powder. The hydrogenation ratio of the obtained dried polymer powder was measured and it was found that the hydrogenation ratio of the CHD monomer units was 96.1% and the hydrogenation ratio of the St monomer units was 9.8%. From these results, it was found that, by selecting an appropriate temperature for performing the hydrogenation, the non-conjugated double bonds present in the main chain or side chain can be preferentially hydrogenated, relative to the aromatic rings present in the side chain. Further, the glass transition temperature of the polymer after hydrogenation was 187° C.

30 g of the dried polymer powder (amount of remaining non-conjugated double bonds: $10.2 \times 10^{-3}$ mol) was charged into a 500 cm$^{-3}$ three-necked flask which contained a stirrer and which was equipped with a condenser and a 200 cm$^3$ dropping funnel. The atmosphere in the three-necked flask was fully purged with argon, and 200 g of chloroform was charged into the three-necked flask, followed by stirring using the stirrer, to thereby completely dissolve the polymer in chloroform. Then, m-chloroperbenzoic acid (moisture-containing product; purity: from 69 to 75%) having a weight of 3.0 g (corresponding to from $12.0 \times 10^{-3}$ to $13.0 \times 10^{-3}$ mol of m-chloroperbenzoic acid) was dissolved in 117 g of chloroform, to thereby prepare a chloroform solution of m-chloroperbenzoic acid. During this operation to prepare a chloroform solution of m-chloroperbenzoic acid, water absorbed by m-chloroperbenzoic acid was separated from m-chloroperbenzoic acid and got mixed with the chloroform solution. The chloroform solution of m-chloroperbenzoic acid, as well as the separated water, was, as such, charged into the above-mentioned 200 cm$^3$ dropping funnel.

Thereafter, the reaction system of the 500 cm$^3$ three-necked flask was cooled on ice, and the chloroform solution of m-chloroperbenzoic acid, as well as the separated water, was dropwise charged into the three-necked flask over 30 minutes. The reaction system was then heated to 60° C., and the contents of the flask were refluxed for 2 hours. Then, the heating was stopped, thereby obtaining a reaction mixture.

The reaction system was allowed to cool to room temperature. Then, the obtained reaction mixture was added to 3,000 cm$^3$ of methanol to effect precipitation of the polymer. The polymer was isolated by filtration under reduced pressure using a PTFE membrane (having a pore diameter of 0.2 μm), and then dissolved in 500 cm$^3$ of chloroform, followed by precipitation with 5,000 cm$^3$ of methanol, thereby obtaining a polymer. The obtained polymer was dried under reduced pressure at room temperature, to thereby obtain an epoxidation-modified, hydrogenated cyclic conjugated diene copolymer.

With respect to the obtained epoxidation-modified, hydrogenated cyclic conjugated diene copolymer, it was found that the epoxidation ratio was 100% and the glass transition temperature was 196.1° C. From these results, it was found that the heat resistance of the hydrogenated, cyclic conjugated diene copolymer was improved by the epoxidation modification.

With respect to each of the selectively hydrogenated, cyclic conjugated diene copolymer and the epoxidation-modified, hydrogenated cyclic conjugated diene copolymer obtained above, the solubility thereof in a solvent was evaluated in substantially the same manner as in Examples 1, 2 and 3. With respect to sample films produced using these polymers individually, the surface smoothness and impact resistance of the sample films were evaluated in substantially the same manner as in Examples 1, 2 and 3. The results of all evaluations were excellent. The results are shown in Table 9.

Then, with respect to the epoxidation-modified, hydrogenated cyclic conjugated diene copolymer, a curing test was performed. A cast film for the evaluation was produced as follows. 0.5 g of the epoxidation-modified, hydrogenated cyclic conjugated diene copolymer was charged into a 30 cm$^3$ sample bottle and then 2.0 g of toluene was charged into the sample bottle to dissolve the copolymer in toluene. Into the sample bottle containing the resultant solution was charged 0.005 g of triphenylphosphine. On the other hand, a reagent bottle containing 1,2-cyclohexane dicarboxylic anhydride was heated on a hot plate to 70° C. to thereby melt the 1,2-cyclohexane dicarboxylic anhydride. 0.03 g of the 1,2-cyclohexane dicarboxylic anhydride was quickly charged into the sample bottle (wherein the quick charging was intended to prevent the moisture in the atmosphere from influencing the contents of the sample bottle), and the resultant mixture was vigorously stirred to thereby obtain a curable polymer composition.

Thereafter, a film made of polyethylene terephthalate (hereinafter referred to as "PET film") was placed on a glass plate, and then a frame of a 3 cm×6 cm size was disposed on the PET film, whereupon the above-obtained curable polymer composition was cast into the frame. Then, the polymer composition in the frame was preliminarily dried in a drier at 80° C. for 1 hour in a nitrogen atmosphere, and then further dried at 130° C. for 6 hours, to thereby obtain a coating. The obtained coating was cooled and peeled off from the PET film, whereupon the resultant film was further dried at 160° C. in a vacuum drier for 8 hours to thereby obtain a cast film for the evaluation, having a thickness of 280

The obtained cast film was visually observed, and the surface smoothness of the cast film was evaluated to be very excellent. Also, a test for evaluating the impact resistance was performed, and the impact resistance of the film was evaluated to be very excellent. Then, the cast film was cut into pieces, and the solubility of the film pieces in a solvent was examined. As a result, it was found that a gel-like insoluble residue remained in cyclohexane and toluene. Therefore, it was confirmed that a crosslinking of the epoxidated copolymer had occurred. The results of the evaluations are shown in Table 9.

EXAMPLE 5

As mentioned above, in Example 3, before the termination of the polymerization reaction, 30 g of the reaction mixture containing the living polymer was taken out and charged into a 200 cm$^3$ pressure resistant glass bottle which had been fully purged with argon gas (wherein the reaction mixture had a living terminal Li content of $0.27 \times 10^{-3}$ mol). This pressure resistant glass bottle as well as the contents thereof was used as follows. 31.0 g of dehydrated cyclohexane was added to the pressure resistant glass bottle, and the resultant mixture was stirred, to thereby obtain a homogeneous diluted solution.

Subsequently, 0.24 g ($1.57 \times 10^{-3}$ mol) of methyltrichlorosilane was introduced into a syringe at 25° C. From the syringe, the methyltrichlorosilane was added to the contents of the pressure resistant glass bottle, and the resultant mixture in the glass bottle was vigorously stirred immediately. The resultant reaction mixture in the glass bottle was visually observed, and it was confirmed that the anionic color of the reaction mixture had disappeared, and this showed that the methyltrichlorosilane had completely reacted with the anionic terminals of the living polymer. Further, the pressure resistant glass bottle was immersed in a water bath at 40° C., followed by stirring of the contents of the glass bottle using a stirrer for 30 minutes. Subsequently, 90 g of cyclohexane was charged into the glass bottle to thereby dilute the contents thereof, and a hydrogenation reaction was performed in substantially the same manner as in Example 3.

Thereafter, the glass bottle was uncapped, and the reaction mixture in the glass bottle was subjected to a filtration by using a high pressure filter (using a PTFE membrane having a pore diameter of 0.2 μm). As a result of the filtration, a slightly gel-like polymer was isolated and removed. Immediately after the filtration, the filtered reaction mixture recovered as a filtrate was immediately added to 2,000 cm$^3$ of a mixture of methanol and acetone (methanol content: 200 cm$^3$), to thereby recover a polymer by precipitation. The recovered polymer was dissolved in 400 cm$^3$ of cyclohexane, followed by precipitation with 5,000 cm$^3$ of acetone, to thereby recover a polymer which was a hydrogenated, silane-modified, cyclic conjugated diene copolymer (hereinafter, this copolymer is frequently referred to as "terminal silane-modified copolymer"). The thus obtained terminal silane-modified copolymer was dried in a vacuum drier at room temperature while evaporating a residual solvent.

The obtained terminal silane-modified copolymer was subjected to an analysis by $^1$H-NMR spectroscopy. From the $^1$H-NMR chart, it was confirmed that a stoichiometric amount of methyldimethoxysilane groups had been introduced to both terminals of the copolymer.

With respect to the terminal silane-modified copolymer, the solubility thereof in a solvent was evaluated in substantially the same manner as in Example 1. Further, using the copolymer, a cast film for evaluation was produced in substantially the same manner as in Example 1, except that a solution of the terminal silane-modified copolymer was cast into a frame of a 3 cm×6 cm size which was disposed on a PET film placed on a glass plate. With respect to the thus obtained cast film, the surface smoothness and impact resistance thereof were evaluated. As a result, the surface smoothness and impact resistance were very excellent. The results of the evaluations are shown in Table 9.

Then, with respect to the terminal silane-modified copolymer, a curing test was performed. A cast film for the evaluation was produced as follows. 0.5 g of the terminal silane-modified copolymer was charged into a 30 cm$^3$ sample bottle and then 2.0 g of dehydrated toluene was charged into the sample bottle to dissolve the terminal silane-modified copolymer in dehydrated toluene. Into the sample bottle containing the resultant solution was charged 0.0005 g of di-n-butyltin dilaurate, followed by full stirring of the contents of the sample bottle, to thereby obtain a curable polymer composition. Thereafter, a PET film was placed on a glass plate, and then a frame of a 3 cm×6 cm size was disposed on the PET film, whereupon the above-obtained curable polymer composition was cast into the frame. Then, the polymer composition in the frame was covered and allowed to stand for drying at room temperature (25° C.) for 3 days, to thereby obtain a coating. The obtained coating was peeled off from the PET film, and the resultant film was allowed to stand for 1 month in a thermo-hygrostatic room under conditions wherein the temperature was 23° C. and the humidity was 65%. Then, the film was dried at 160° C. for 8 hours to thereby obtain a cast film having a thickness of 280 μm.

The obtained cast film was visually observed, and the surface smoothness of the cast film was evaluated to be very excellent. Also, a test for evaluating the impact resistance was performed in substantially the same manner as in Example 1, and the impact resistance of the film was evaluated to be very excellent. Then, the cast film was cut into pieces, and the solubility of the film pieces in a solvent was examined. As a result, it was found that a gel-like insoluble residue remained in cyclohexane and toluene. Therefore, it was confirmed that a crosslinking of the terminal silane-modified copolymer had occurred. The results of the evaluations are shown in Table 9.

Comparative Example 6

As comparative samples for use in NMR analyses, a polystyrene and a poly-CHD were produced by anionic polymerization. With respect to the method for producing these two polymers, a detailed explanation is made below.

There were provided two pressure resistant glass bottles, each of which had a volume of 100 cm$^3$ and contained a Teflon®-coated stirrer (hereinafter, these two glass bottles were referred to as "first glass bottle" and "second glass bottle", respectively). Each of the glass bottles was treated in substantially the same manner as in Comparative Example 1. Specifically, the glass bottle was dried, sealed and capped. Then, a vacuum line was introduced into the bottle. The internal pressure of the glass bottle was lowered, and the glass bottle was purged with high purity argon gas 5 times, so that the glass bottle was fully purged with argon gas. The thus treated two glass bottles were used in this Comparative Example 6.

46.8 g of cyclohexane, 0.12 g of tetrahydrofuran and 6.0 g of styrene were charged into the first glass bottle, and the contents of the first glass bottle were mixed well. Subsequently, 0.17 cm$^3$ of a 1.06 N sec-BuLi was charged into the first glass bottle while stirring the contents of the first glass bottle at room temperature (20° C.), thereby starting a polymerization reaction. Immediately after the start of the polymerization reaction, the reaction mixture in the first glass bottle exhibited an anionic color of purplish red. The first glass bottle was immersed in a water bath at 25° C., and the reaction was performed for 24 hours. During the reaction, the polymerization reaction mixture in the first glass bottle was visually observed, and it was confirmed that there was no change in the color of the reaction mixture throughout the reaction time and, hence, it was found that the livingness of the living terminal was high. Then, the polymerization reaction in the first glass bottle was terminated by charging a 0.1 cm$^3$ of methanol into the first glass bottle, thereby obtaining a polymer solution containing a polymer (polystyrene). From the first glass bottle after the termination of the polymerization reaction, a predetermined amount of the polymerization reaction mixture (polymer solution) was taken as a sample. Using the sample, the conversion of St in the reaction mixture (polymer solution) was measured. As a result, it was found that the conversion of St was 100%. The remainder of the reaction mixture (polymer solution) in the first glass bottle was added to 500 cm$^3$ of methanol to effect precipitation of a polymer. The polymer was isolated, and the isolated polymer was washed with methanol. The washed polymer was fully dried in a vacuum dryer, to thereby obtain a dried polymer (polystyrene) in powdery form.

Figure 10:
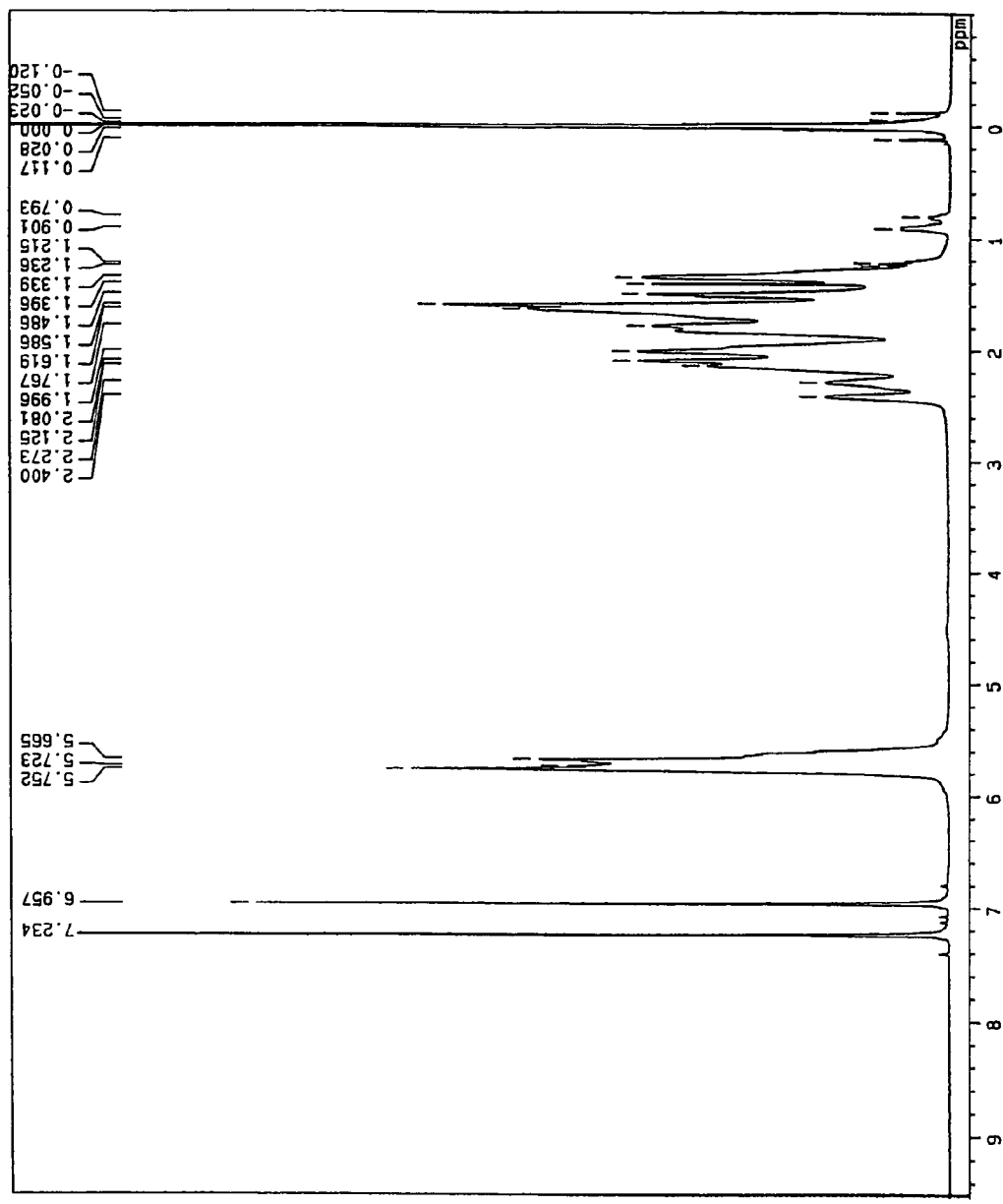
FIG. 10 is the $^1$H-NMR chart of the polystyrene obtained in Comparative Example 6.
Figure 11:
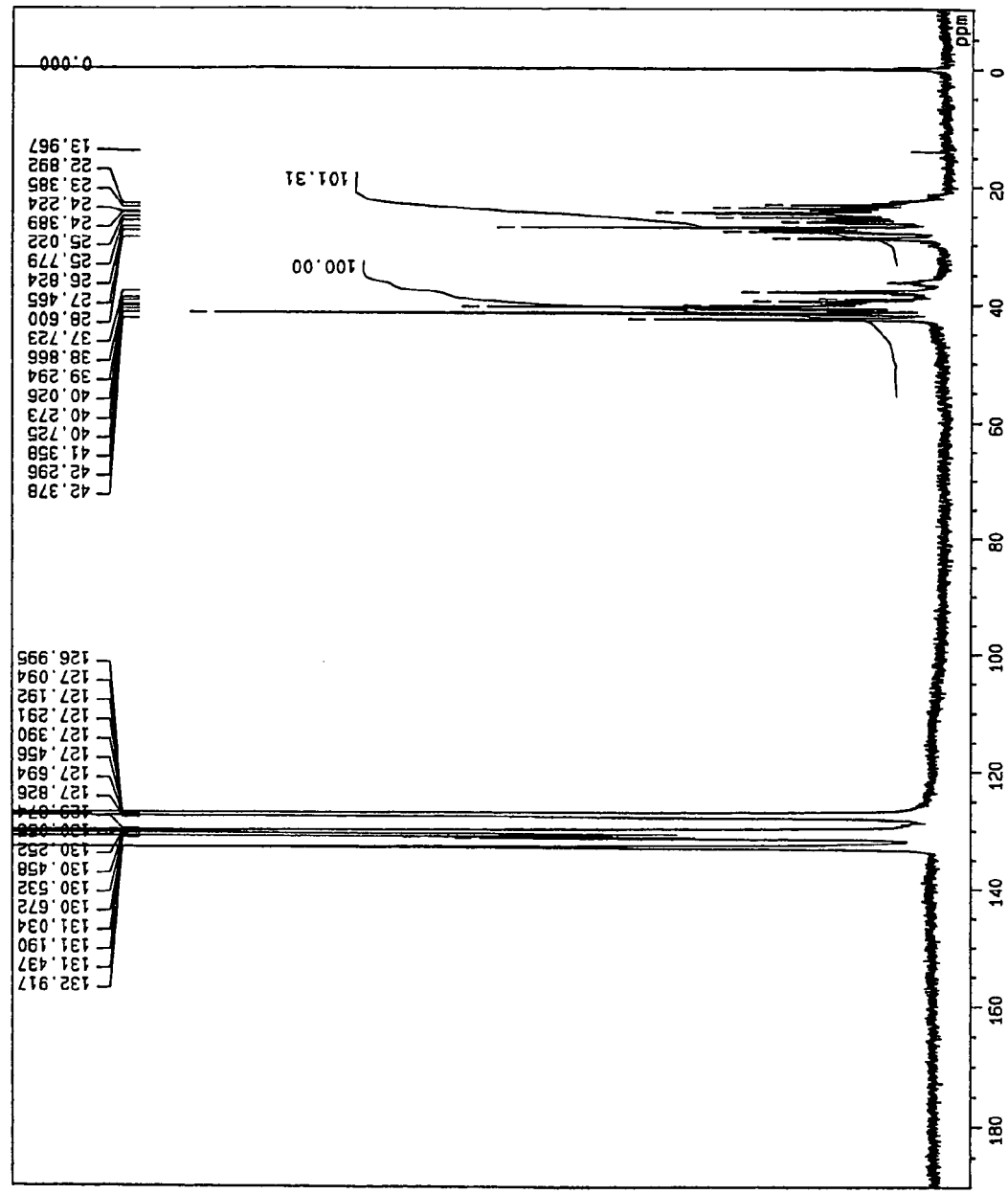
FIG. 11 is the $^{13}$C-NMR chart of the polystyrene obtained in Comparative Example 6.

The dried polymer (polystyrene) in powdery form was analyzed by GPC. As a result, it was found that the polymer had a number average molecular weight of 34,200 and a molecular distribution of 1.06, and the molecular distribution of the polymer exhibited a single peak. The $^1$H-NMR and $^{13}$C-NMR charts of the obtained polymer (polystyrene) are shown in FIGS. 10 and 11, respectively.

On the other hand, 46.8 g of cyclohexane, 0.12 g of tetrahydrofuran and 6.0 g of CHD were charged into the second glass bottle. Subsequently, 0.17 cm$^3$ of a 1.06 N sec-BuLi was charged into the second glass bottle while stirring the contents of the second glass bottle at room temperature (20° C.), thereby starting a polymerization reaction. Then, the second glass bottle was immersed in a water bath at 25° C. Immediately after the start of the polymerization reaction, the reaction mixture in the second glass bottle exhibited an anionic color of lemon yellow. At a point in time which is about 20 minutes from the start of the polymerization reaction, the reaction mixture in the second glass bottle began to be white turbid, and, at the same time, the anionic color of the reaction mixture became very weak. At a point in time which is 50 minutes from the start of the polymerization reaction, a polymer (poly-CHD) obtained by the polymerization reaction exhibited a precipitation as a gel-like mass insoluble in cyclohexane as the solvent. 24 Hours after the start of the polymerization reaction, 0.1 cm$^3$ of methanol was charged into the second glass bottle, thereby obtaining a polymer solution. The amount of unreacted CHD monomers present in the reaction mixture (polymer solution) was measured by gas chromatography. Further, the conversion of CHD in the polymer solution was calculated and found to be 55%, wherein the calculation was made, based on the assumption that, in the reaction mixture after the precipitation of the polymer, the ratio of unreacted CHD monomers in the upper layer (i.e., cyclohexane phase) was the same as the ratio of unreacted CHD monomers in the lower layer (i.e., polymer phase).

The supernatant cyclohexane in the reaction mixture was removed from the second glass bottle. Then, the polymer precipitated in the second glass bottle was taken out from the second glass bottle and added to 500 cm$^3$ of methanol to effect precipitation of a polymer. The polymer was isolated, and the isolated polymer was washed with methanol. The washed polymer was dried in a vacuum dryer, to thereby obtain a dried polymer (poly-CHD) in powdery form. The obtained dried polymer in powdery form was analyzed by GPC. As a result, it was found that the polymer had a number average molecular weight of 13,300 and a molecular weight distribution of 1.89.

Figure 12:
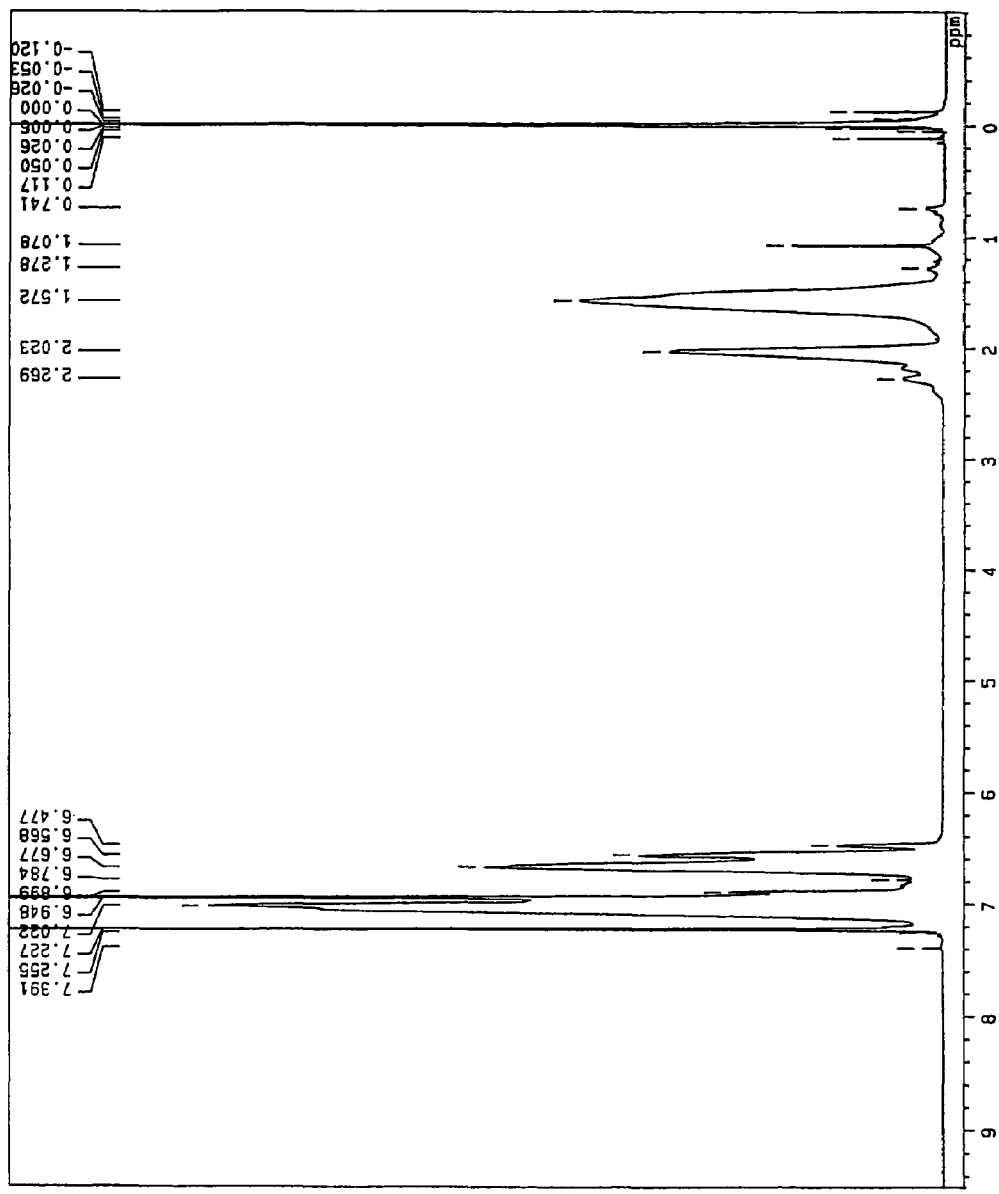
FIG. 12 is the $^1$H-NMR chart of the poly-CHD obtained in Comparative Example 6.
Figure 13:
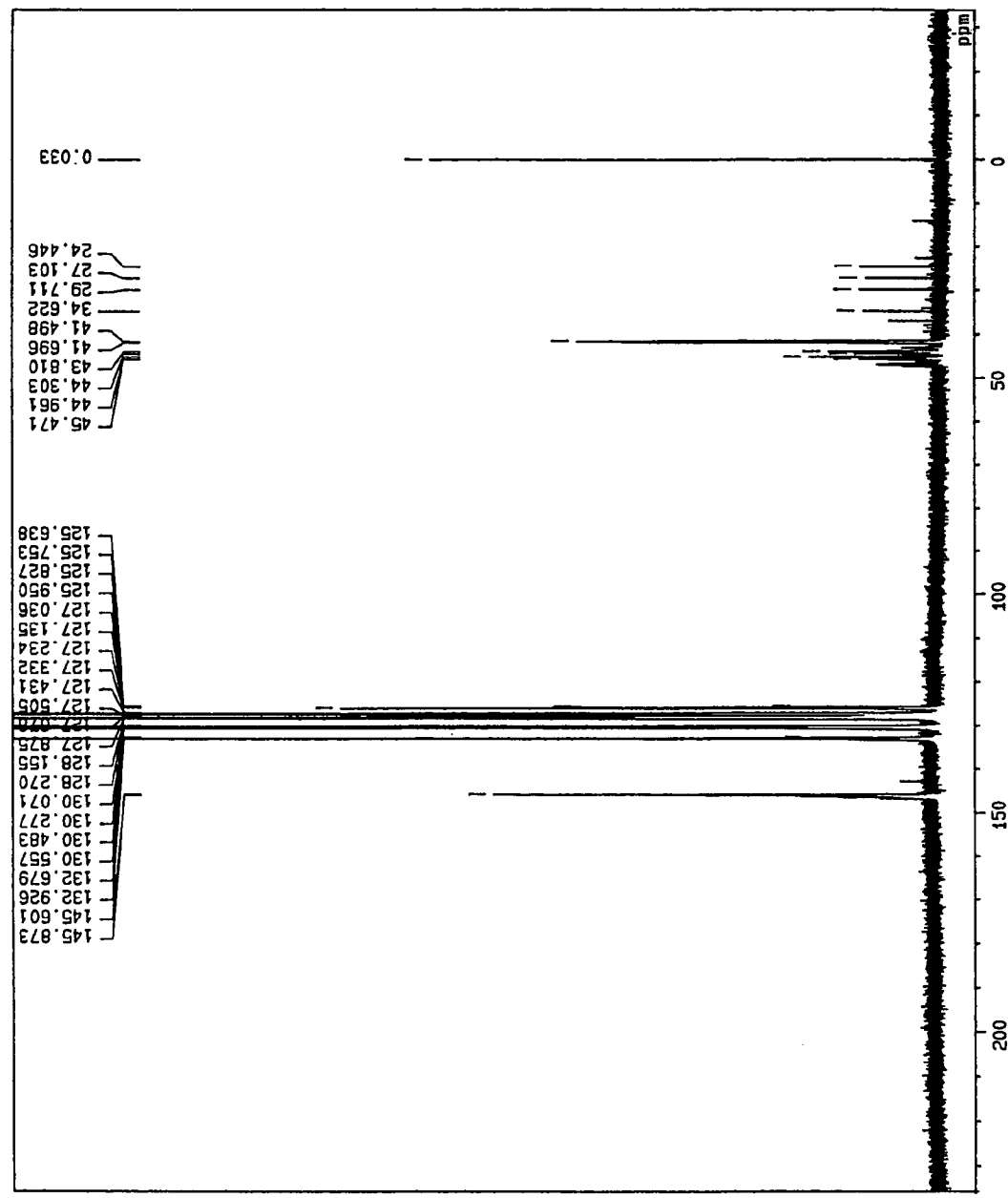
FIG. 13 is the $^{13}$C-NMR chart of the poly-CHD obtained in Comparative Example 6.

The $^1$H-NMR and $^{13}$C-NMR charts of the obtained polymer (poly-CHD) are shown in FIGS. 12 and 13, respectively.

A comparison was made between the $^1$H-NMR charts shown in FIGS. 6, 8, 10 and 12. It was found that the $^1$H-NMR chart (shown in FIG. 8) of the copolymer obtained in Comparative Example 5 is the same as a chart which can be obtained by superimposing on each other the $^1$H-NMR chart (shown in FIG. 10) of the polystyrene and the $^1$H-NMR chart (shown in FIG. 12) of the poly-CHD. It is also found that the $^1$H-NMR chart (shown in FIG. 6) of the polymer obtained in Example 2 exhibits a proton signal of the polystyrene side chain in the range of from 6.4 to 7.4 ppm; in this respect, the $^1$H-NMR chart (shown in FIG. 6) of the polymer obtained in Example 2 is clearly distinct from the $^1$H-NMR charts of the polymers other than obtained in Example 2.

A comparison was also made between the $^{13}$C-NMR charts shown in FIGS. 7, 9, 11 and 13. In FIG. 7 which shows the $^{13}$C-NMR chart of the polymer obtained in Example 2, a peak ascribed to the bond between CHD and styrene appears at 50 ppm. Such peak does not appear in any of the $^{13}$C-NMR chart (shown in FIG. 11) of the polystyrene and the $^{13}$C-NMR chart (shown in FIG. 13) of the poly-CHD. Although a peak at 50 ppm appears also in the $^{13}$C-NMR chart (in FIG. 9) of the polymer (block copolymer) obtained in Comparative Example 5, the intensity of the peak appearing at 50 ppm in the $^{13}$C-NMR chart of FIG. 9 is clearly lower than the intensity of the peak appearing at 50 ppm in the $^{13}$C-NMR chart (in FIG. 7) of the polymer obtained in Example 2.

From these results, it is apparent that the copolymer obtained in Comparative Example 5 is a block copolymer. Also, when the above-mentioned characteristics of the $^1$H-NMR chart and $^{13}$C-NMR chart of the polymer obtained in Example 2 are considered together with the data of the change in the composition of the living polymer being formed during the polymerization reaction in Example 2 (wherein the change was measured by gas chromatography) as well as the data of the results of the visual observation of the anionic color of the living polymer in the reaction mixture in Example 2, it is apparent that the polymer obtained in Example 2 is a random copolymer.

EXAMPLE 6

From the hydrogenated polymer (hydrogenated, cyclic conjugated diene copolymer) obtained in Example 1, a sheet having a thickness of 3 mm was produced using a small-sized injection molding machine (trade name: MP-2015; manufactured and sold by Chemix Machinery Japan Co., Ltd., Japan). The conditions for the injection molding were as follows: cylinder temperature: 300° C., mold temperature: 118° C., injection time: 15 seconds, and cooling time: 15 seconds. With respect to the obtained sheet of the polymer, the following properties were measured: the specific gravity, the total luminous transmittance, the flexural strength, the flexural modulus, the pencil hardness, the glass transition temperature and the heat distortion temperature. The methods for measuring these properties and the results of the measurement are shown in Table 10.

EXAMPLE 7

A hydrogenated, cyclic conjugated diene copolymer was produced in substantially the same manner as in Example 1. From the produced polymer, a film having a thickness of 100 μm was produced by the solvent cast method. This film was subjected to an embossing at a temperature of 190° C. under a pressure of 10 MPa so as to produce a lower substrate having a groove which had a length of 40 mm, a width of 100 μm and a depth of 40 μm. Using a PET film having a thickness of 0.03 mm as an upper substrate, a PE film having a thickness of 0.03 mm as an adhesion layer and the above-obtained lower substrate, a microchip was produced by a method in which the upper substrate, the adhesion layer and the lower substrate are laminated to each other so that the bonding layer are sandwiched between the upper and lower substrates, and the resultant laminate was subjected to a heat pressing at a temperature of 120° C. under a pressure of 1 MPa. With respect to the thus produced microchip, the electroosmosis flow was measured by the above-mentioned method. The microchip exhibited an electroosmosis flow of $5.11 \times 10^{-8}$ m$^2$s$^{-1}$V$^{-1}$.

TABLE 1

(Polymerization reaction performed in Example 1 and the results thereof)

| | designed composition | 0 min | 5 min | 10 min | 20 min | 30 min | 60 min | 120 min | 240 min |
|---|---|---|---|---|---|---|---|---|---|
| CHDA (g) | 305 | 346 | 346 | 339 | 332 | 325 | 318 | 311 | 304 |
| cyclohexane (g) | 1940 | 2219 | 2219 | 2174 | 2130 | 2086 | 2042 | 1997 | 1952 |
| 0.82 N DiLi (g) | 26.10 | 31.5 | 31.5 | 30.91 | 30.28 | 29.65 | 29.02 | 28.38 | 27.75 |
| CHD (g) | 530 | 600 | 600 | 588 | 576 | 564 | 552 | 540 | 528 |
| 33% St (g) | 265 | 45 | 91 | 147 | 216 | 235 | 260 | 264 | 264 |
| total weight (g) | 3068 | 3242 | 3288 | 3280 | 3285 | 3240 | 3201 | 3141 | 3078 |
| total volume ($cm^3$) | 3758 | 4017 | 4075 | 4066 | 4072 | 4017 | 3969 | 3895 | 3817 |
| MeOH (g) | 1.40 | — | — | — | — | — | — | — | 1.39 |
| $cm^3$ | 1.77 | — | — | — | — | — | — | — | 1.76 |
| sample amount (g) | — | 0 | 66 | 67 | 68 | 69 | 70 | 70 | — |
| ratio of remainder of the reaction mixture | — | 100% | 98.0% | 98.0% | 97.9% | 97.9% | 97.8% | 97.8% | — |
| conversion of CHD | — | 0% | 2.9% | 9.9% | 33.0% | 61.8% | 89.6% | 98.4% | 99.7% |
| conversion of St | — | 0% | 28.3% | 39.6% | 84.8% | 97.3% | 98.7% | 99.8% | 99.5% |
| total conversion of all monomers | — | 0.0% | 3.7% | 11.3% | 37.3% | 64.5% | 90.0% | 98.3% | 99.7% |
| ratio of CHD in the polymer (wt %) | — | — | 67% | 75% | 76% | 82% | 85% | 86% | 86% |
| Mn | — | — | 5507 | 9092 | 31673 | 44085 | 56595 | 62025 | 63603 |
| Mw/Mn | — | — | 2.87 | 2.70 | 1.63 | 1.65 | 1.73 | 1.76 | 1.81 |

TABLE 2

(Changes with time in the cumulative amount of additional feeds of 33% St and in the internal temperature of the reactor used in Example 1)

| time min | amount of 33% St (g) additional feed | cumulative amount | internal temperature ° C. | time min | amount of 33% St (g) additional feed | cumulative amount | internal temperature ° C. | time min | amount of 33% St (g) additional feed | cumulative amount | internal temperature ° C. |
|---|---|---|---|---|---|---|---|---|---|---|---|
| 0 | 45 | 45 | 21.1 | 26 | 3 | 237 | 36.5 | 52 | 0 | 266 | 37.4 |
| 1 | 0 | 45 | 21.6 | 27 | 3 | 240 | 36.4 | 53 | 1 | 267 | ↑ |
| 2 | 0 | 45 | 21.7 | 28 | 2 | 242 | 36.2 | 54 | 1 | 268 | ↑ |
| 3 | 24 | 69 | 21.8 | 29 | 2 | 244 | 36.0 | 55 | 0 | 268 | ↑ |
| 4 | 21 | 90 | 22.0 | 30 | 0 | 244 | 36.2 | 56 | 1 | 269 | 37.3 |
| 5 | 1 | 91 | 22.1 | 31 | 0 | 244 | 36.6 | 57 | 1 | 270 | 37.2 |
| 6 | 18 | 109 | 22.2 | 32 | 1 | 245 | 36.9 | 58 | 2 | 272 | 37.1 |
| 7 | 7 | 116 | 22.4 | 33 | 1 | 246 | 37.0 | 59 | 2 | 274 | ↑ |
| 8 | 14 | 130 | 23.4 | 34 | 3 | 249 | 37.2 | 60 | 0 | 274 | 37.0 |
| 9 | 19 | 149 | 24.4 | 35 | 2 | 251 | 37.3 | 90 | 6 | 280 | 39.8 |
| 10 | 0 | 149 | 25.4 | 36 | 1 | 252 | 37.5 | 120 | 4 | 284 | 39.4 |
| 11 | 6 | 155 | 26.4 | 37 | 1 | 253 | 37.6 | 150 | 6 | 290 | 39.0 |
| 12 | 13 | 168 | 27.0 | 38 | 0 | 253 | 37.7 | 240 | | | 39.1 |
| 13 | 11 | 179 | 27.8 | 39 | 1 | 254 | 37.8 | | | | |
| 14 | 8 | 187 | 28.4 | 40 | 0 | 254 | ↑ | | | | |
| 15 | 7 | 194 | 29.1 | 41 | 1 | 255 | ↑ | | | | |
| 16 | 10 | 204 | 29.6 | 42 | 1 | 256 | 37.9 | | | | |
| 17 | 4 | 208 | 30.1 | 43 | 0 | 256 | ↑ | | | | |
| 18 | 7 | 215 | 30.6 | 44 | 1 | 257 | ↑ | | | | |
| 19 | 6 | 221 | 31.0 | 45 | 1 | 258 | 37.8 | | | | |
| 20 | 0 | 221 | 31.9 | 46 | 0 | 258 | ↑ | | | | |
| 21 | 4 | 225 | 32.9 | 47 | 1 | 259 | 37.7 | | | | |
| 22 | 1 | 226 | 34.0 | 48 | 0 | 259 | ↑ | | | | |
| 23 | 3 | 229 | 35.0 | 49 | 3 | 262 | 37.6 | | | | |
| 24 | 2 | 231 | 35.7 | 50 | 3 | 265 | 37.5 | | | | |
| 25 | 3 | 234 | 36.3 | 51 | 1 | 266 | 37.5 | | | | |

Note:
the symbol "↑" shows that the value is the same as in the column just above.

TABLE 3

(Polymerization reaction performed in Example 2 and the results thereof)

|  | designed composition | 0 min | 5 min | 10 min | 20 min | 32 min | 61 min | 120 min | 240 min |
|---|---|---|---|---|---|---|---|---|---|
| CHDA (g) | 4470 | 4608 | 4608 | 4585 | 4562 | 4539 | 4516 | 4493 | 4470 |
| cyclohexane (g) | 17732 | 18278 | 18278 | 18187 | 18208 | 18117 | 18207 | 18115 | 18207 |
| 2.34 N NBL (g) | 74.63 | 76.9 | 76.9 | 76.54 | 76.16 | 75.78 | 75.39 | 75.01 | 74.63 |
| CHD (g) | 6520 | 6720 | 6720 | 6686 | 6653 | 6619 | 6586 | 6552 | 6519 |
| 33% St (g) | 8470 | 1309 | 2621 | 4347 | 6483 | 7167 | 8131 | 8514 | 8471 |
| total weight (g) | 37285 | 30992 | 32304 | 33881 | 35982 | 36518 | 37516 | 37750 | 37753 |
| total volume (cm³) | 45862 | 47249 | 39609 | 41584 | 44217 | 44891 | 46148 | 46444 | 46458 |
| MeOH (g) | 11.50 | — | — | — | — | — | — | — | 11.85 |
| cm³ | 14.55 | — | — | — | — | — | — | — | 15.00 |
| sample amount (g) | — | 0 | 162 | 170 | 181 | 185 | 190 | 192 | — |
| ratio of remainder of the reaction mixture | — | 100% | 99.5% | 99.5% | 99.5% | 99.5% | 99.5% | 99.5% | — |
| conversion of CHD | — | 0% | 22.5% | 54.1% | 89.1% | 95.3% | 96.7% | 98.9% | 99.7% |
| conversion of St | — | 0% | 75.5% | 94.1% | 98.5% | 99.2% | 98.4% | 99.5% | 100.0% |
| total conversion of all monomers | — | 0% | 22.5% | 52.0% | 84.5% | 91.5% | 95.8% | 99.1% | 99.8% |
| ratio of CHD in the polymer (wt %) | — | 0% | 70% | 73% | 74% | 73% | 71% | 70% | 70% |
| Mn |  | 11784 | 24948 | 39341 | 42558 | 45734 | 48241 | 49866 |  |
| Mw/Mn |  |  | 1.37 | 1.42 | 1.67 | 1.83 | 1.94 | 2.09 | 2.14 |

TABLE 4

(Changes with time in the cumulative amount of additional feeds of 33% St and in the internal temperature of the reactor used in Example 2)

| time min | amount of 33% St (g) additional feed | cumulative amount | internal temperature °C | time min | amount of 33% St (g) additional feed | cumulative amount | internal temperature °C | time min | amount of 33% St (g) additional feed | cumulative amount | internal temperature °C |
|---|---|---|---|---|---|---|---|---|---|---|---|
| 0 | 1309 | 1309 | 21.0 | 26 | 104 | 7085 | 44.0 | 57 | 39 | 8235 | 36.0 |
| 1 | 0 | 1309 | 21.0 | 27 | 77 | 7162 | ↑ | 61 | 0 | 8235 | ↑ |
| 2 | 0 | 1309 | — | 28 | 73 | 7235 | ↑ | 65 | 36 | 8271 | 38.0 |
| 3 | 713 | 2022 | — | 29 | 0 | 7235 | ↑ | 85 | 179 | 8450 | 41.0 |
| 4 | 599 | 2621 | 25.0 | 30 | 0 | 7235 | 41.0 | 110 | 209 | 8659 | 40.0 |
| 5 | 0 | 2621 | 27.0 | 31 | 0 | 7235 | ↑ |  |  |  |  |
| 6 | 419 | 3040 | — | 32 | 0 | 7235 | 40.0 |  |  |  |  |
| 7 | 601 | 3641 | — | 33 | 14 | 7249 | ↑ |  |  |  |  |
| 8 | 368 | 4009 | 33.0 | 34 | 41 | 7290 | ↑ |  |  |  |  |
| 9 | 351 | 4360 | 36.0 | 35 | 45 | 7335 | 38.0 |  |  |  |  |
| 10 | 0 | 4360 | — | 36 | 52 | 7387 | ↑ |  |  |  |  |
| 11 | 345 | 4705 | — | 37 | 52 | 7439 | 37.0 |  |  |  |  |
| 12 | 229 | 4934 | 42.0 | 38 | 54 | 7493 | ↑ |  |  |  |  |
| 13 | 276 | 5210 | — | 39 | 53 | 7546 | ↑ |  |  |  |  |
| 14 | 301 | 5511 | — | 40 | 47 | 7593 | ↑ |  |  |  |  |
| 15 | 290 | 5801 | 46.3 | 42 | 73 | 7666 | 34.0 |  |  |  |  |
| 16 | 189 | 5990 | — | 43 | 39 | 7705 | ↑ |  |  |  |  |
| 17 | 168 | 6158 | — | 45 | 73 | 7778 | 33.0 |  |  |  |  |
| 18 | 192 | 6350 | — | 49 | 147 | 7925 | 32.0 |  |  |  |  |
| 19 | 168 | 6518 | 49.0 | 50 | 38 | 7963 | ↑ |  |  |  |  |
| 20 | 0 | 6518 | — | 51 | 38 | 8001 | ↑ |  |  |  |  |
| 21 | 0 | 6518 | 49.0 | 52 | 38 | 8039 | ↑ |  |  |  |  |
| 22 | 193 | 6711 | 48.0 | 53 | 39 | 8078 | ↑ |  |  |  |  |
| 23 | 80 | 6791 | — | 54 | 39 | 8117 | 34 |  |  |  |  |
| 24 | 84 | 6875 | — | 55 | 39 | 8156 | ↑ |  |  |  |  |
| 25 | 106 | 6981 | — | 56 | 40 | 8196 | ↑ |  |  |  |  |

Note:
the symbol shows "↑" that the value is the same as in the column just above; and the symbol "—" shows that the measurement was not performed.

TABLE 5

(Polymerization reaction performed in Comparative Example 1 and the results thereof)

|  | No. 1 | No. 2 | No. 3 | No. 4 | No. 5 | No. 6 |
|---|---|---|---|---|---|---|
| polymerization time (min) | 2.5 | 5 | 10 | 20 | 40 | 80 |
| benzene (g) | 18.52 | 18.56 | 17.80 | 18.65 | 19.18 | 18.93 |
| St (g) | 3.50 | 3.51 | 3.45 | 3.45 | 3.45 | 3.49 |
| CHD (g) | 1.51 | 1.50 | 1.52 | 1.48 | 1.54 | 1.54 |
| 1 N sec-BuLi ($cm^3$) | 0.125 | 0.125 | 0.125 | 0.125 | 0.125 | 0.125 |
| 1 M s-BuOH ($cm^3$) | 0.200 | 0.200 | 0.200 | 0.200 | 0.200 | 0.200 |
| conversion of CHD | 14.3% | 18.3% | 20.8% | 22.8% | 27.3% | 31.4% |
| conversion of St | 6.1% | 12.8% | 15.9% | 21.3% | 23.1% | 26.1% |
| total conversion of all monomers | 8.6% | 14.4% | 17.4% | 21.7% | 24.4% | 27.7% |
| ratio of CHD in the polymer (wt %) | 50.2% | 37.8% | 36.6% | 31.4% | 34.6% | 34.7% |
| Mn | 3752 | 7489 | 12448 | 16756 | 17054 | 16989 |
| Mw/Mn | 1.41 | 1.50 | 1.79 | 2.03 | 2.25 | 2.55 |

TABLE 6

(Polymerization reaction performed in Comparative Example 2 and the results thereof)

|  | No. 1 | No. 2 | No. 3 | No. 4 | No. 5 | No. 6 |
|---|---|---|---|---|---|---|
| polymerization time (min) | 2.5 | 5 | 10 | 20 | 40 | 80 |
| benzene (g) | 19.62 | 20.47 | 20.18 | 19.40 | 21.04 | 18.95 |
| St (g) | 1.50 | 1.64 | 1.62 | 1.61 | 1.62 | 1.55 |
| CHD (g) | 3.42 | 3.43 | 3.43 | 3.43 | 3.37 | 3.47 |
| 1 N sec-BuLi ($cm^3$) | 0.150 | 0.150 | 0.150 | 0.150 | 0.150 | 0.150 |
| 1 M s-BuOH ($cm^3$) | 0.200 | 0.200 | 0.200 | 0.200 | 0.200 | 0.200 |
| conversion of CHD | 4.0% | 6.1% | 10.0% | 11.7% | 21.4% | 21.6% |
| conversion of St | 11.0% | 10.9% | 18.4% | 19.5% | 29.1% | 29.9% |
| total conversion of all monomers | 6.2% | 7.7% | 12.7% | 14.2% | 23.9% | 24.2% |
| ratio of CHD in the polymer (wt %) | 45.5% | 53.8% | 53.5% | 56.0% | 60.5% | 61.8% |
| Mn | 1789 | 3653 | 6373 | 11264 | 12389 | 11135 |
| Mw/Mn | 1.44 | 1.44 | 1.55 | 1.94 | 2.13 | 2.53 |

TABLE 7

(Polymerization reaction performed in Example 3 and the results thereof)

|  | designed composition | 50 min | 60 min | 65 min | 70 min | 80 min | 90 min | 120 min | 180 min | 300 min |
|---|---|---|---|---|---|---|---|---|---|---|
| CHDA (g) | 305 | 365 | 356 | 348 | 341 | 333 | 326 | 320 | 313 | 306 |
| cyclohexane (g) | 1689 | 2016 | 1968 | 1920 | 1881 | 1842 | 1803 | 1767 | 1727 | 1688 |
| 0.82 N DiLi (g) | 26.10 | 31.0 | 30.3 | 29.53 | 28.93 | 28.32 | 27.73 | 27.16 | 26.56 | 25.96 |
| 33% Bd (g) | 374 | 447 | 436 | 426 | 417 | 408 | 400 | 392 | 383 | 374 |
| CHD (g) | 424 | 0 | 0 | 482 | 472 | 462 | 453 | 443 | 434 | 424 |
| 33% St (g) | 212 | 0 | 0 | 74 | 118 | 171 | 194 | 207 | 212 | 212 |
| total weight (g) | 3032 | 2860 | 2792 | 3280 | 3259 | 3246 | 3205 | 3157 | 3096 | 3031 |
| total volume ($cm^3$) | 3761 | 3568 | 3532 | 4113 | 4087 | 4071 | 4019 | 3959 | 3883 | 3801 |
| MeOH (g) | 1.40 | — | — | — | — | — | — | — | — | 1.42 |
| $cm^3$ | 1.77 | — | — | — | — | — | — | — | — | 1.80 |
| sample amount (g) | — | 68 | 68 | 66 | 69 | 68 | 65 | 70 | 70 | 71 |
| ratio of remainder of the reaction mixture | — | 98% | 97.6% | 98.0% | 97.9% | 97.9% | 98.0% | 97.8% | 97.7% | 97.7% |
| conversion of Bd | — | 100% | 100% | 100% | 100% | 100% | 100% | 100% | 100% | 100% |
| conversion of CHD | — | 0% | 0% | 3.4% | 11.2% | 38.2% | 63.1% | 90.0% | 98.0% | 99.7% |
| conversion of St | — | 0% | 0% | 26.9% | 38.5% | 85.6% | 96.9% | 98.0% | 99.5% | 99.8% |

TABLE 7-continued (Polymerization reaction performed in Example 3 and the results thereof)

|  | designed composition | 50 min | 60 min | 65 min | 70 min | 80 min | 90 min | 120 min | 180 min | 300 min |
|---|---|---|---|---|---|---|---|---|---|---|
| ratio of cumulative amount of additionally fed St to all St to be fed | — | 0% | 0% | 30.7% | 49.8% | 74.1% | 86.0% | 93.7% | 97.8% | 100.0% |
| conversion of St, based on all St to be fed | — | 0% | 0% | 8.3% | 19.2% | 63.4% | 83.3% | 91.8% | 97.3% | 99.8% |
| total conversion of all monomers | — | 0% | 0% | 4.1% | 12.3% | 41.8% | 66.0% | 90.3% | 97.9% | 99.7% |
| ratio of CHD in the CHD/St random copolymer block (wt %) | — | — | — | 71% | 78% | 78% | 82% | 86% | 86% | 86% |
| Mn | — | 13910 | — | 14528 | 15505 | 31298 | 43211 | 58100 | 60964 | 62660 |
| Mw/Mn | — | 1.10 | — | 2.42 | 2.23 | 1.65 | 1.51 | 1.47 | 1.47 | 1.43 |

TABLE 8

(Changes with time in the cumulative amount of additional feeds of 33% St and in the internal temperature of the reactor used in Example 3)

| time min | amount of 33% St (g) additional feed | amount of 33% St (g) cumulative amount | internal temperature ° C. | time min | amount of 33% St (g) additional feed | amount of 33% St (g) cumulative amount | internal temperature ° C. | time min | amount of 33% St (g) additional feed | amount of 33% St (g) cumulative amount | internal temperature ° C. |
|---|---|---|---|---|---|---|---|---|---|---|---|
| 60 | 64 | 65 | 20.5 | 86 | 171 | 172 | 33.2 | 112 | 194 | ↑ | — |
| 61 | ↑ | ↑ | 21.0 | 87 | 173 | 175 | 33.9 | 113 | 195 | ↑ | — |
| 62 | ↑ | ↑ | 21.2 | 88 | 175 | 178 | 34.4 | 114 | ↑ | ↑ | — |
| 63 | 79 | 79 | 21.6 | 89 | 177 | 182 | 34.4 | 115 | 196 | 196 | 38.5 |
| 64 | 83 | 83 | 21.8 | 90 | ↑ | ↑ | 35.3 | 116 | 197 | 197 | ↑ |
| 65 | 87 | 86 | 22.0 | 91 | 178 | ↑ | 35.7 | 117 | ↑ | 198 | ↑ |
| 66 | 91 | 91 | 22.2 | 92 | 179 | ↑ | 35.9 | 118 | 198 | ↑ | — |
| 67 | 95 | 95 | 22.5 | 93 | 180 | ↑ | 36.1 | 119 | 199 | ↑ | — |
| 68 | 99 | 99 | 22.9 | 94 | 181 | ↑ | 36.3 | 120 | ↑ | ↑ | — |
| 69 | 106 | 105 | 23.6 | 95 | 182 | ↑ | 36.4 | 150 | 204 | 204 | 38.5 |
| 70 | ↑ | ↑ | 24.3 | 96 | 183 | 183 | 36.5 | 180 | 208 | 207 | 38.7 |
| 71 | 118 | 116 | 25.1 | 97 | 184 | 184 | 36.6 | 210 | 212 | 212 | ↑ |
| 72 | 124 | 120 | 25.8 | 98 | 185 | 185 | 36.5 | 300 | ↑ | ↑ | 39.0 |
| 73 | 130 | 128 | 26.5 | 99 | 185 | ↑ | 36.6 |  |  |  |  |
| 74 | 136 | 136 | 26.8 | 100 | 186 | 186 | 36.5 |  |  |  |  |
| 75 | 141 | 141 | 27.5 | 101 | 187 | 187 | 36.4 |  |  |  |  |
| 76 | 146 | 146 | 28.0 | 102 | ↑ | 188 | 36.6 |  |  |  |  |
| 77 | 151 | 151 | 28.5 | 103 | 188 | 189 | 36.8 |  |  |  |  |
| 78 | 155 | 154 | 28.9 | 104 | 189 | 190 | ↑ |  |  |  |  |
| 79 | 159 | 156 | 29.4 | 105 | ↑ | ↑ | 37.3 |  |  |  |  |
| 80 | ↑ | ↑ | 30.1 | 106 | 190 | ↑ | ↑ |  |  |  |  |
| 81 | 161 | 159 | 30.5 | 107 | 191 | 191 | ↑ |  |  |  |  |
| 82 | 163 | 161 | 31.0 | 108 | ↑ | 192 | — |  |  |  |  |
| 83 | 165 | 164 | 31.6 | 109 | 192 | 193 | — |  |  |  |  |
| 84 | 167 | 167 | 32.0 | 110 | 193 | 194 | — |  |  |  |  |
| 85 | 169 | 170 | 32.5 | 111 | ↑ | 195 | — |  |  |  |  |

Note:
the symbol "↑" shows that the value is the same as in the column just above; and the symbol "—" shows that the measurement was not performed.

TABLE 9

| | | Example No. | | | | | Comp. Ex. 1 | Comp. Ex. 2 | Comp. Ex. 3 | Comp. Ex. 4 | Comp. Ex. 5 |
|---|---|---|---|---|---|---|---|---|---|---|---|
| | | Ex. 1 | Ex. 2 | Ex. 3 | Ex. 4 | Ex. 5 | | | | | |
| composition of polymer | CHD | 86% | 70% | 69% | 70% | 69% | 35% | 62% | 100% | 69% | 32% |
| | St | 14% | 30% | 11% | 30% | 11% | 65% | 38% | 0% | 31% | 68% |
| | Bd | 0% | 0% | 20% | 0% | 20% | 0% | 0% | 0% | 0% | 0% |
| | number average molecular weight | 63600 | 49900 | 62660 | 49900 | 62660 | 12500 | 10000 | 40000 | 31000 | 39100 |

TABLE 9-continued

| | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|---|
| solubility of polymer | in cyclohexane | Δ | Δ | ◉ | Δ | ◉ | ◉ | ◉ | X | X | X |
| | in toluene | ◉ | ◉ | ◉ | ◉ | ◉ | ◉ | ◉ | X | Δ | Δ |
| | in decalin | ◯ | ◯ | ◯ | ◯ | ◯ | ◯ | ◯ | Δ | Δ | Δ |
| | in tetrahydrofuran | ◉ | ◉ | ◉ | ◉ | ◉ | ◉ | ◉ | X | X | X |
| | in chloroform | ◯ | ◯ | ◉ | ◯ | ◉ | ◉ | ◉ | X | Δ | Δ |
| properties of cast film | surface smoothness | excellent | excellent | excellent | excellent | excellent | excellent | excellent | rough | rough | rough |
| | impact resistance | excellent | excellent | excellent | excellent | excellent | cracked | cracked | — | — | — |
| hydrogenation ratio | hydrogenation ratio with respect to CHD moiety | 98.2% | 99.7% | 99.5% | 96.1% | — | — | — | 98.0% | 98.0% | — |
| | hydrogenation ratio with respect to St moiety | 96.8% | 98.6% | 99.8% | 9.8% | — | — | — | — | 97.5% | — |
| solubility of polymer after hydrogenation | in cyclohexane | ◉ | ◉ | ◉ | ◉ | — | — | — | X | X | — |
| | in toluene | ◉ | ◉ | ◉ | ◉ | — | — | — | X | Δ | — |
| | in decalin | ◉ | ◉ | ◉ | ◉ | — | — | — | Δ | Δ | — |
| | in chloroform | Δ | Δ | ◯ | ◯ | — | — | — | X | X | — |
| Properties of cast film | surface smoothness | excellent | excellent | excellent | excellent | — | — | — | rough | rough | — |
| | impact resistance | excellent | excellent | excellent | excellent | — | — | — | — | — | — |
| modification ratio | epoxidation ratio | — | — | — | 100%[1] | — | — | — | — | — | — |
| | terminal silane modification ratio | — | — | — | — | 100%[2] | — | — | — | — | — |
| solubility of polymer prior to curing | in cyclohexane | — | — | — | ◯ | Δ | — | — | — | — | — |
| | in toluene | — | — | — | ◉ | ◯ | — | — | — | — | — |
| properties of cast film prior to curing | surface smoothness | — | — | — | excellent | excellent | — | — | — | — | — |
| | impact resistance | — | — | — | excellent | excellent | — | — | — | — | — |
| solubility of polymer after curing | in cyclohexane | — | — | — | X | X | — | — | — | — | — |
| | in toluene | — | — | — | X | X | — | — | — | — | — |
| properties of cast film after curing | surface smoothness | — | — | — | excellent | excellent | — | — | — | — | — |
| | impact resistance | — | — | — | excellent | excellent | — | — | — | — | — |

Notes:
[1] Modification ratio with respect to the 3.9% residual double bonds in the CHD monomer units in the hydrogenated polymer.
[2] Modification ratio with respect to the living Li terminal of the polymer.

TABLE 10

| Item | Unit | Measuring method | Example 6 |
|---|---|---|---|
| Specific gravity | | ASTM D792 | 1.00 |
| Total luminous transmittance | % | ASTM D1003 | ≥90 |
| Flexural strength | MPa | ASTM D790 | 85 |
| Flexural modulus | MPa | ASTM D790 | 2450 |
| Pencil hardness | | JIS K5401 | H |
| Glass transition temperature | °C | DSC | 190 |
| Heat distortion temperature | °C | ASTM D648 | 193 |

INDUSTRIAL APPLICABILITY

The cyclic conjugated diene copolymer of the present invention has excellent properties with respect to heat resistance, transparency, nonhygroscopicity, chemical resistance and molding processability. The modified, hydrogenated, cyclic conjugated diene copolymer and the crosslinked, hydrogenated, cyclic conjugated diene copolymer which are obtained by subjecting the cyclic conjugated diene copolymers to a hydrogenation/modification treatment and a hydrogenation/crosslinking treatment, respectively, are extremely advantageous in that the copolymers can be used as a high performance resin which exhibits improved properties with respect to adhesion to various materials, solvent resistance, scratch resistance and the like.

What is claimed is:

1. A cyclic conjugated diene copolymer comprising a main chain represented by the following formula (1):

(1)

wherein A, B and C are monomer units constituting said main chain in which monomer units A, B and C are arranged in any order, and l, m and n are, respectively, weight percentages of monomer units A, B and C, based on the total weight of monomer units A, B and C;
wherein:
each A is independently selected from the group consisting of cyclic conjugated diene monomer units,
each B is independently selected from the group consisting of monomer units obtained from vinyl aromatic monomers each having a hydrogen atom at the α-position thereof, and
each C is independently selected from the group consisting of monomer units obtained from comonomers which are other than the monomers used for obtaining said monomer units A and B and which are copolymerizable with at least one of the monomers used for obtaining said monomer units A and B;
wherein said cyclic conjugated diene copolymer has a side chain; and wherein:

l, m and n satisfy the following requirements:

$l+m+n=100$, $0.1 \leq l/m \leq 9$, and $0 \leq n \leq 90$, with the proviso that all monomer units A and said monomer units B together form one or more polymer chains each having an A/B random sequence, said one or more polymer chains each having an A/B random sequence containing at least one polymer chain having a number average molecular weight of from 20,000 to 500,000 and containing no polymer chain having a number average molecular weight of more than 500,000.

2. The cyclic conjugated diene copolymer according to claim 1, wherein said one or more polymer chains each having an A/B random sequence contain at least one polymer chain having a number average molecular weight of from more than 30,000 to 500,000.

3. The cyclic conjugated diene copolymer according to claim 1 or 2, wherein said monomer units A are comprised of at least one cyclic conjugated diene monomer unit selected from the group consisting of units each independently represented by the following formula (2):

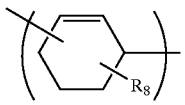

(2)

wherein each R independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5- to 10-membered heterocyclic group having at least one nitrogen, oxygen or sulfur atom as a heteroatom.

4. A hydrogenated, cyclic conjugated diene copolymer obtained by partially or completely hydrogenating at least one of the main chain and side chain of the cyclic conjugated diene copolymer of claim 1 or 2.

5. The hydrogenated, cyclic conjugated diene copolymer according to claim 4, which is partially hydrogenated.

6. A modified, hydrogenated, cyclic conjugated diene copolymer obtained by partially or completely modifying the non-conjugated double bonds present in at least one of the main chain and side chain of the partially hydrogenated, cyclic conjugated diene copolymer of claim 5.

7. The modified, hydrogenated, cyclic conjugated diene copolymer according to claim 6, wherein said modification is selected from the group consisting of an epoxidation modification by oxidation and a silane modification by hydrosilylation.

8. A hydrogenated, modified, cyclic conjugated diene copolymer obtained by subjecting the cyclic conjugated diene copolymer of claim 1 or 2 to a modification/hydrogenation treatment, wherein said modification/hydrogenation treatment comprises:

performing at least one modification selected from the group consisting of:

partial or complete modification of the non-conjugated double bonds present in at least one of the main chain and side chain of the cyclic conjugated diene copolymer, and modification of at least one terminal of the main chain of the cyclic conjugated diene copolymer, to thereby obtain a modified, cyclic conjugated diene copolymer, and partially or completely hydrogenating at least one of the main chain and side chain of the modified, cyclic conjugated diene copolymer to thereby obtain a hydrogenated, modified, cyclic conjugated diene copolymer.

9. The hydrogenated, modified, cyclic conjugated diene copolymer according to claim 8, wherein:

said partial or complete modification of the non-conjugated double bonds present in at least one of the main chain and side chain of the cyclic conjugated diene copolymer is selected from the group consisting of an epoxidation modification by oxidation and a silane modification by hydrosilylation, and said modification of at least one terminal of the main chain of the cyclic conjugated diene copolymer is a silane modification by a silyl group introduction reaction which is performed on a living terminal of a cyclic conjugated diene copolymer produced by living anionic polymerization.

10. A crosslinked, hydrogenated, cyclic conjugated diene copolymer obtained by crosslinking the hydrogenated, cyclic conjugated diene copolymer of claim 4.

11. A crosslinked, modified, hydrogenated, cyclic conjugated diene copolymer obtained by crosslinking the modified, hydrogenated, cyclic conjugated diene copolymer of claim 6.

12. A crosslinked, hydrogenated, modified, cyclic conjugated diene copolymer obtained by crosslinking the modified, hydrogenated, cyclic conjugated diene copolymer of claim 8.

13. A shaped article obtained by shaping the hydrogenated, cyclic conjugated diene copolymer of claim 4.

14. A microchip comprising the shaped article of claim 13.

15. A process for producing the cyclic conjugated diene copolymer of claim 1 or 2, which comprises reacting a cyclic conjugated diene monomer with a vinyl aromatic monomer having a hydrogen atom at the α-position thereof in the presence of a polymerization initiator in a hydrocarbon solvent, wherein said polymerization initiator comprises:

an organometallic compound containing a metallic element of Group 1 of the Periodic Table, and an ether compound represented by the following formula (3):

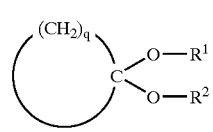

(3)

wherein q is an integer of from 4 to 7, and each of —O—$R^1$ and —O—$R^2$ independently represents an alkoxy group having 1 or more carbon atoms.

* * * * *